US006965867B1

United States Patent
Jameson

(12) United States Patent
(10) Patent No.: US 6,965,867 B1
(45) Date of Patent: *Nov. 15, 2005

(54) METHODS AND APPARATUS FOR ALLOCATING, COSTING, AND PRICING ORGANIZATIONAL RESOURCES

(76) Inventor: Joel Jameson, 1932 Bryant St., Palo Alto, CA (US) 94301

( * ) Notice: Subject to any disclaimer, the term of this patent is extended or adjusted under 35 U.S.C. 154(b) by 0 days.

This patent is subject to a terminal disclaimer.

(21) Appl. No.: 09/645,998

(22) Filed: Dec. 13, 1999

Related U.S. Application Data

(63) Continuation of application No. 09/070,130, filed on Apr. 29, 1998, now Pat. No. 6,032,123.

(51) Int. Cl.⁷ .............................................. G06F 17/60
(52) U.S. Cl. .............................. 705/8; 700/90; 700/97; 700/99; 700/100; 705/7; 705/9; 705/400
(58) Field of Search .............................. 700/90, 97, 99, 700/100; 705/7, 8, 9, 400

(56) References Cited

U.S. PATENT DOCUMENTS

| | | |
|---|---|---|
| 3,090,557 A | 5/1963 | Levi |
| 4,797,839 A | 1/1989 | Powell |
| 5,101,352 A | 3/1992 | Rembert |
| 5,189,606 A | 2/1993 | Burns |
| 5,241,621 A | 8/1993 | Smart |
| 5,249,120 A | 9/1993 | Foley |
| 5,255,181 A | 10/1993 | Chapman |
| 5,255,345 A | 10/1993 | Shaefer |
| 5,295,065 A | 3/1994 | Chapman |
| 5,311,438 A | 5/1994 | Sellers |
| 5,321,605 A | 6/1994 | Chapman |
| 5,381,332 A | 1/1995 | Wood |
| 5,404,516 A | 4/1995 | Georgiades |

(Continued)

FOREIGN PATENT DOCUMENTS

| | | |
|---|---|---|
| EP | 0306965 | 3/1989 |
| EP | 0672990 | 9/1995 |
| EP | 0732650 A2 * | 9/1996 |

OTHER PUBLICATIONS

Ossella: "A turnpike property of optimal programs for a class of simple linear models of production"; Economic Theory, Nov. 1999, vol. 14, No. 3, pp. 597–607 (Abstract Only).*

(Continued)

*Primary Examiner*—Edward R. Cosimano
(74) *Attorney, Agent, or Firm*—Adam K. Sacharoff; Much Shelist

(57) ABSTRACT

This invention is a means both to allocate all types of resources for commercial, governmental, or non-profit organizations and to price such resources. A linear programming process makes fulfillment allocations used to produce product units. A Resource-conduit process governs the linear programming process, uses two-sided shadow prices, and makes aperture allocations to allow Potential-demand to become Realized-demand. A strict opportunity cost perspective is employed, and the cost of buyable resources is deemed to be the opportunity cost of tying up cash. Resource available quantities, product resource requirements, and Potential-demand as a statistical distribution are specified in a database. The invention reads the database, performs optimization, and then writes allocation directives to the database. Also determined and written to the database are resource marginal (incremental) values and product marginal costs. The database can be viewed and edited through the invention's Graphical User Interface. Monte Carlo simulation, along with generation of supply and demand schedules, is included to facilitate analysis, explore "what if," and interact with the user to develop product offering, product pricing, and resource allocation strategies and tactics.

19 Claims, 31 Drawing Sheets

U.S. PATENT DOCUMENTS

| | | | | |
|---|---|---|---|---|
| 5,586,219 A | * | 12/1996 | Yufik | 706/14 |
| 5,615,109 A | | 3/1997 | Eder | |
| 5,790,862 A | * | 8/1998 | Tanaka et al. | 717/159 |
| 5,794,224 A | * | 8/1998 | Yufik | 706/14 |
| 5,884,276 A | | 3/1999 | Zhu et al. | |
| 5,884,300 A | | 3/1999 | Brockman | |
| 5,978,771 A | * | 11/1999 | Vandivier, III | 705/8 |
| 6,032,123 A | * | 2/2000 | Jameson | 705/8 |
| 6,035,277 A | * | 3/2000 | Anbil et al. | 705/8 |

OTHER PUBLICATIONS

Aardal, Karen and Torbjörn Larsson, "A Benders decomposition based heuristic for the hierarchical production planning problem," *European Journal of Operational Research*, 45, p. 4–14, 1990.

Aucamp, Donald C., "On the Use of Pseudo Shadow Prices in a Multiperiod Formulation of the Production Planning Problem.", *Journal of the Operational Research Society*, 40, p. 1109–1119, 1989.

Benders, J.F., "Partitioning procedures for solving mixed–variables programming problems", *Numerische Mathematik*, 4, p. 238–252, 1962.

Collaud, Gerald and Jacques Pasquier–Boltuck, "gLPS: A graphical tool for the definition and manipulation of linear problems", *European Journal of Operational Research*, 72, p. 277–286, 1994.

Dantzig, George B. and Philip Wolfe, "Decomposition principle for linear programs," *Operations Research*, vol. 8, p. 101–111, 1960.

Dantzig, George B., "Linear Programming and Extensions—Chapter 22", *Programs With Variable Coefficients*, Princeton U Press, Princeton, 1963.

Dorfman, Robert, Paul Samuelson, and Robert Solow, "Linear Programming and Economic Analysis—Chapter 7" In: *Applications to the Firm; Valuation and Duality*, McGraw–Hill, New York, 1958.

Gal, Tomas and Josef Nedoma, "Multiparametric Linear Programming", *Management Science*, 18, p. 406–422, 1972.

Gal, Tomas, "RIM multiparametric linear programming", *Management Science*, 21, p. 567–575, 1975.

Gal, Tomas, *Post–optimal Analysis, Parametric Programming and Related Topics*, 2nd ed., Walter de Gruyter, Berlin, 1995.

Geoffrion, A.M., "Generalized Benders decomposition", *Journal of Optimization Theory and Applications*, 10, p. 237–260, 1972.

Greenberg, Harvey J., "Syntax–directed report writing in linear programming using ANALYZE", *European Journal of Operational Research*, 72, p. 300–311. 1994.

Harper, Robert M. Jr., "Linear Programming in Managerial Accounting: A Misinterpretation of Shadow Prices", *Journal of Accounting Education*, 4, p. 123–130, 1986.

Nemhauser, G. L., A. H. G. Rinnooy Kan, and M. J. Todd (ed), *Handbooks in Operations Research and Management Science Vol. 1: Optimization*, North–Holland Publishing Co., Amsterdam, 1989.

Roy, Asim, Leon Lasdon, and Donald Plane, "End–User optimization with spreadsheet models", *European Journal of Operational Research*, 39, p. 131–137, 1989.

Wakahara, Tatsuro, Masao Fukushima, and Toshihide Ibaraki, "A practical approach to decomposable nonlinear programming problems", *Journal of the Operations Research Society of Japan*, 36, p. 1–12, 1993.

Wets, Roger J–B, "The Aggregation Principle in Scenario Analysis and Stochastic Optimization", In: *Algorithms and Model Formulations in Mathematical Programming* (S.W. Wallace Ed.), Springer–Verlag, Berlin, 1989, p. 91–113.

Ohmae, Kenichi, The Mind of the Strategist: The Art of Japanese Business, 1982, McGraw–Hill Book Company, United States.

* cited by examiner

FIG. 3

Resource Table

```
| resourceName
  availQuant
  meanUse*
  marginalValue*
``` nRes rows

Group Table

```
| groupName
  resourceName
  structure
      {
        allocation
        effectiveness
      } atoeFnPt[nir+1]
  meanAlloc*
  marginalValue*
```

Group Association Table

```
| groupName
| productName
```

Product Table

```
| productName
  price
  potentialDemand
  meanSupply*
  marginalCost*
``` mProd rows

UnitReq Table

```
| productName
| resourceName
  reqQt
```

◥— 101

| = Table key
* = Determined by invention

FIG. 6

Group Head

```
allocation
allocationHold
structure
      {
      allocation
      effectiveness
      }   atoeFnPt[nir+1]
ir
maxSub
maxAdd
dedaSub
dedaAdd
gmcSub
gmvAdd
twmcSub
twcRow
twcCol
twcsRow
effectivenessHold subBlk
effectiveness
emcSub
emvAdd
```

Group Element

```
subBlk
effectiveness
emcSub
emvAdd
```

AxisWalk

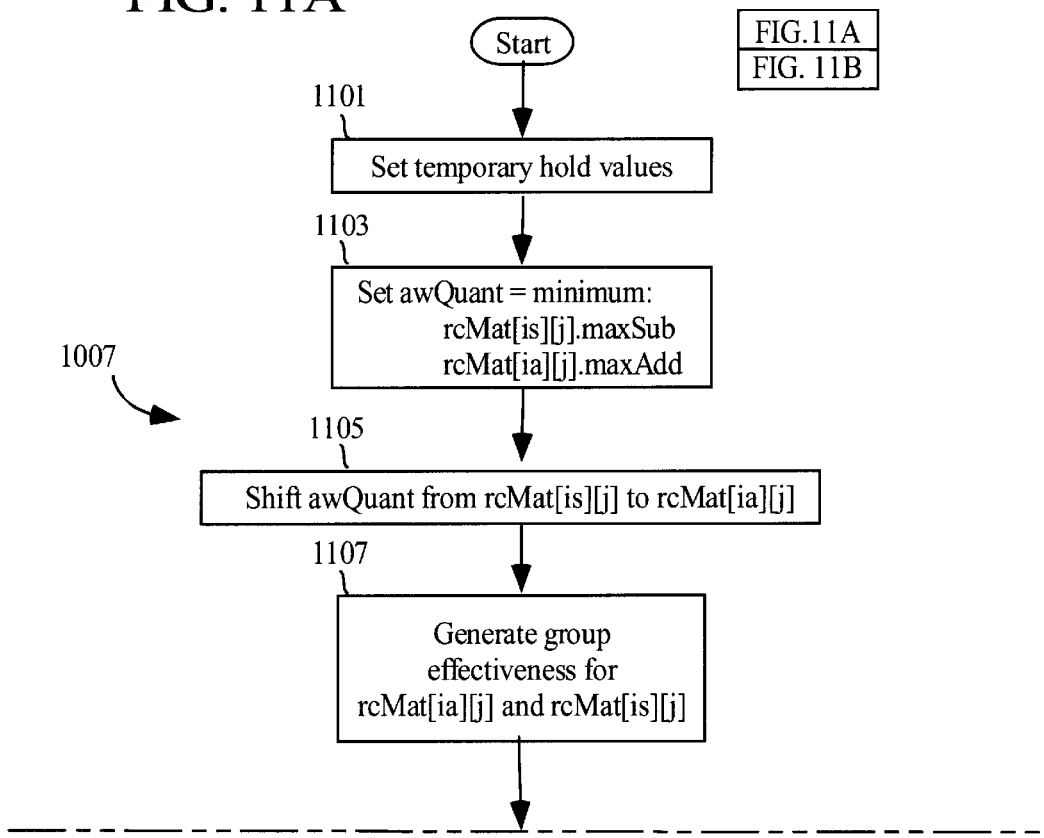

TopWalk

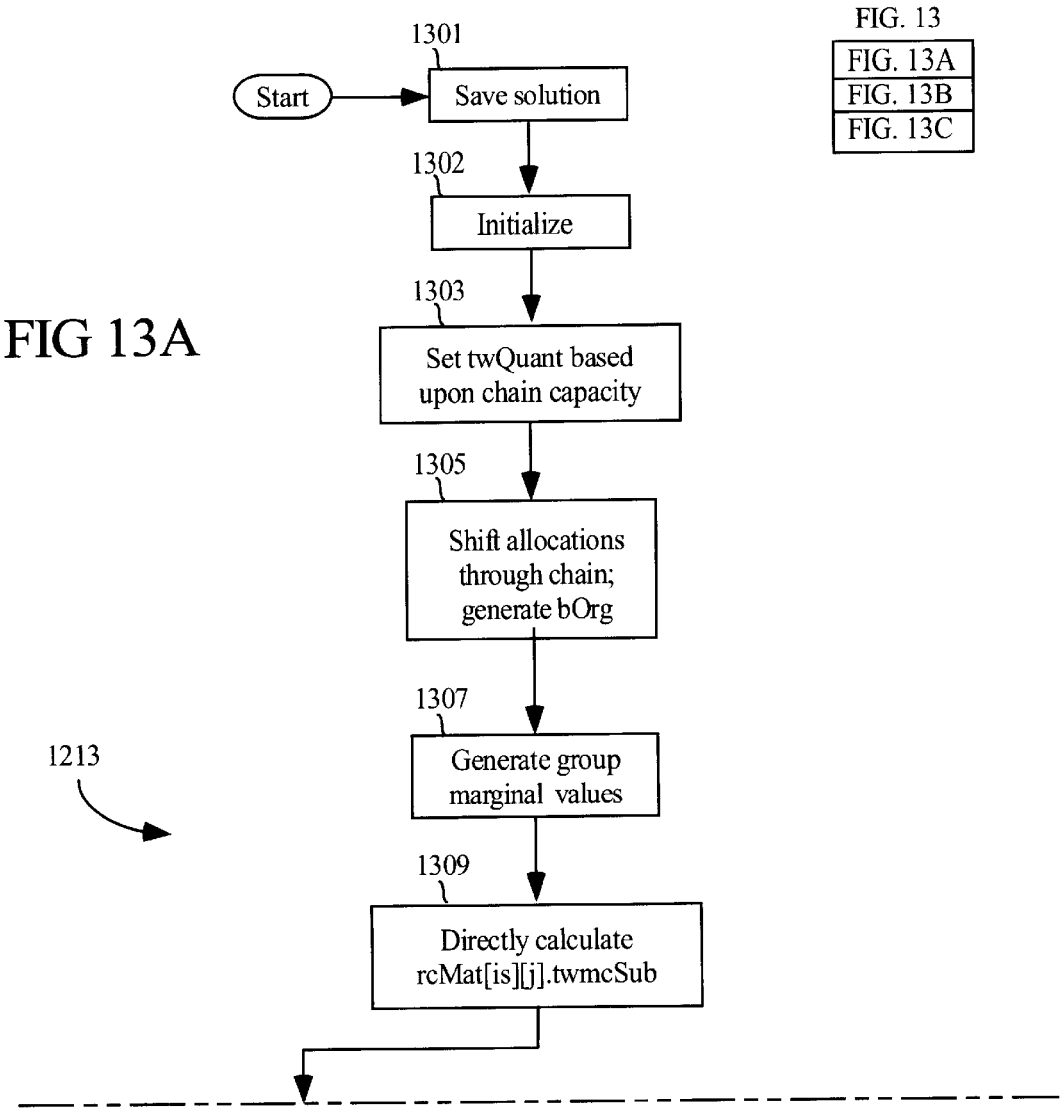

LateralWalk

RidgeWalk

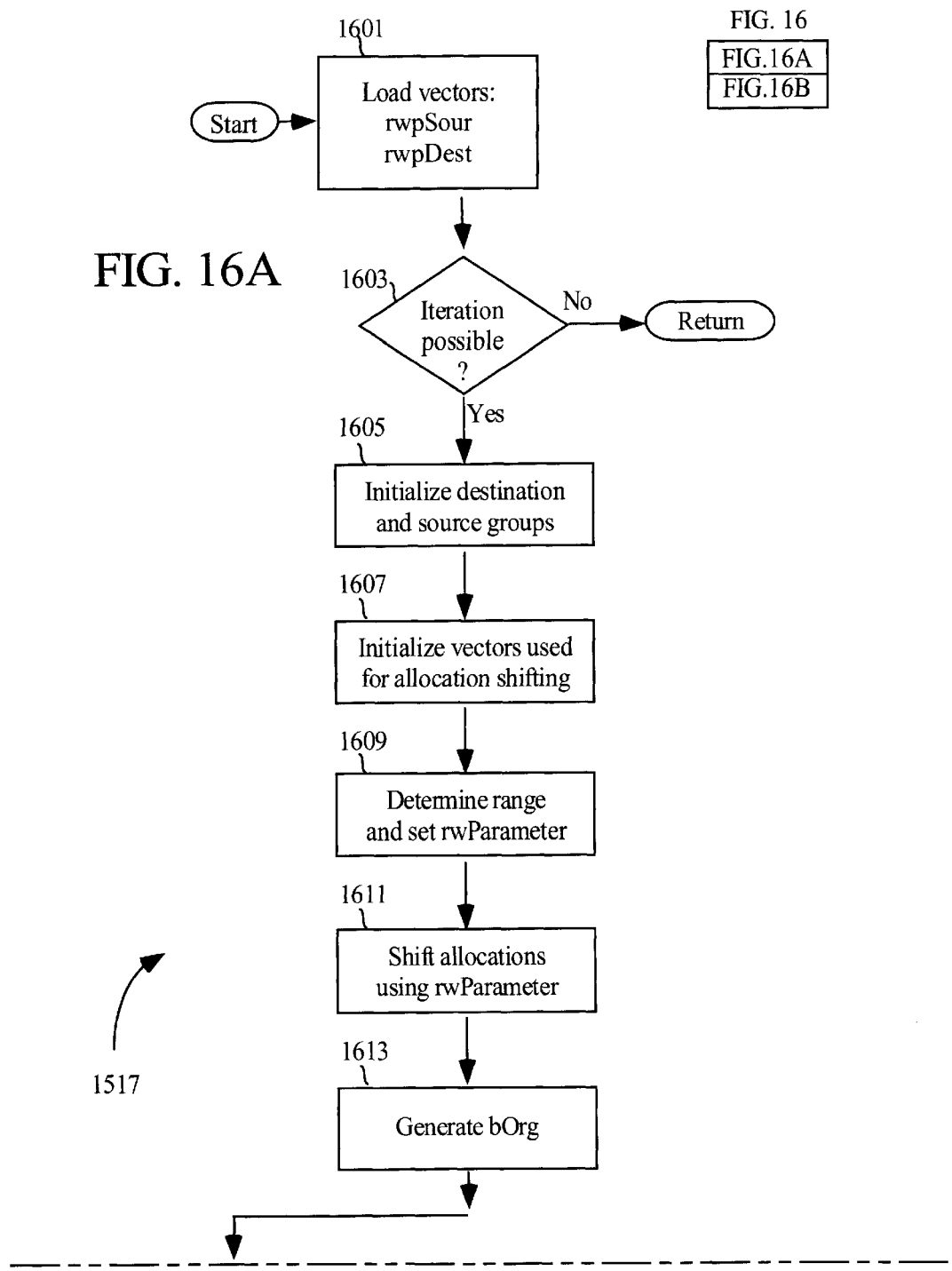

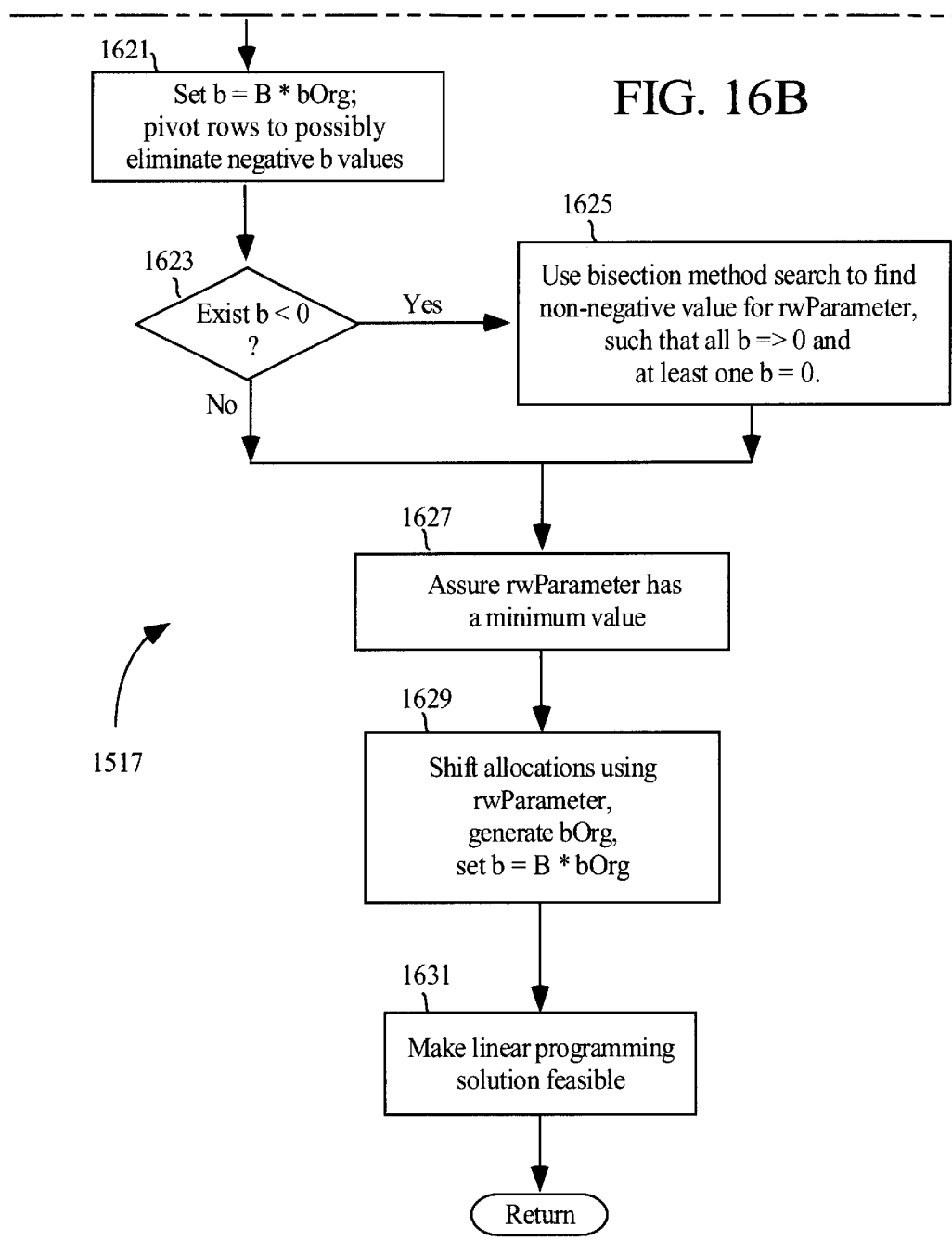

FIG. 18

| distName | distType | distObject | meanGen | marginalValue |
|---|---|---|---|---|
| Uniform | Uniform | Low: 5, High: 10 | 8 | $0 |
| Normal100 | Normal | Mean: 5, S.D.: 1 | 5 | $0 |
| Triangle100 | Triangular | Low: 1, Mode: 10, High: 12 | 8 | $850 |

FIG. 19

| FIG. 19A | FIG. 19B |

FIG. 19A

| resourceName | unit | availability | availQuant | WTMD | payPrice |
|---|---|---|---|---|---|
| groupName | | fixedAlloc | fxAlQt | | | atoeObject |
| WI Cash | | Fixed | | $1000 | | |
| Building Space | 1000 sq ft day | Fixed | | 10 | | |
| Designer | days | Fixed | | 20 | | |
| Service Design | No | | | | Quantity / Effectiveness(%): 0 → 0%, 15 → 20%, 20 → 100% | graph 0.0%–100.0% vs $0.00–$25.00 |
| Overnight Air | package | Buyable | | | | $20 |

| productName | resourceName | price | filValue | distName | dist% | carryOver |
|---|---|---|---|---|---|---|
| | | reqQt | periodsToCash | | | |
| Widget | | $5000 | $0 | Normal100 | 100% | 20% |
| | Manager | 0.2 | | | | |
| | Building Space | 4.0 | | | | |
| | Associate/Labor/Staff | 1.0 | | | | |
| | Rail | 1.0 | | | | |
| | Widget Design | | | | | |
| | Equipment | 5.0 | | | | |
| Service-- Non Profit | | $50 | $1600 | Uniform | 100% | 90% |
| | Manager | 0.4 | | | | |
| | Building Space | 1.0 | | | | |
| | Associate/Labor/Staff | 5.0 | | | | |
| | Service Design | | | | | |

FIG. 21

|  | Next | Previous (0) | Current |
|---|---|---|---|
| Internal Producer's Surplus |  | $21719.34 | $21916.67 |
| Standard Error |  | 173.35 | - |
|  |  |  |  |
| Change in WI Cash |  | $18114.56 | $18683.33 |
| Standard Error |  | 399.27 | - |
|  |  |  |  |
| WI Cash (Beginning) |  | $1000.00 | $1000.00 |
| Marginal Value |  | $0.00 | $0.00 |
| Standard Error |  | 0.00 | - |
|  |  |  |  |
| Sum Fill Value |  | $4104.78 | $3733.33 |
| Standard Error |  | 254.75 | - |
|  |  |  |  |
| Sum WTMD |  | $500.00 | $500.00 |
| Standard Error |  | 0.00 | - |
|  |  |  |  |
| Parameters |  |  |  |
| Allocation | Direct | Indirect | Direct |
| Maximization | IPS | IPS | IPS |
| WI Cash Type | Spread Out | Spread Out | Spread Out |
| Rand Seed |  | 1 |  |
| N Sample |  | 200 |  |
| MC/MV Display | Partial | Partial | Partial |
| Base |  |  |  |
| Max RW Iterations | 3 | 3 | 3 |
| Max RW Time (sec) | 20.000 | 20.000 | 20.000 |
| Supply/Demand |  |  |  |
| Max RW Iterations | 3 | 3 | 3 |
| Max RW Time (sec) | 20.000 | 20.000 | 20.000 |

US 6,965,867 B1

METHODS AND APPARATUS FOR ALLOCATING, COSTING, AND PRICING ORGANIZATIONAL RESOURCES

CROSS-REFERENCE TO RELATED APPLICATIONS

This application is a Continuation Application of U.S. patent application Ser. No. 09/070,130 filed Apr. 29, 1998, U.S. Pat. No. 6,032,123.

BACKGROUND TECHNICAL FIELD

This invention relates to methods and systems for allocating resources, specifically to allocating resources in an optimized or near-optimized manner to best serve an organization's goals.

A portion of the disclosure of this patent document contains material that is subject to copyright protection. The copyright owner has no objection to facsimile reproduction by anyone of the patent documentation or the patent disclosure, as it appears in the Patent & Trademark Office patent file or records, but otherwise reserves all copyright rights whatsoever.

BACKGROUND DESCRIPTION OF PRIOR ART

As economic theory teaches, every organization—commercial, non-profit, or governmental—has limited resources, i.e., money, raw materials, personnel, real estate, equipment, etc. These limited resources need to be used to best serve an organization's goals. To do otherwise constitutes waste. The business that wastes its resources forgoes profits and risks eventually closing; the non-profit and governmental organizations that waste their resources fail in their missions, fail as institutions, and/or cost their society more than is necessary. As the increasingly competitive world-market develops, and as citizens increasingly question the actions of non-profits and governments, the importance of resource allocation intensifies.

Known methods for allocating organizational resources can be classified as either subjective, accounting, operations research/management science, or miscellany. All of these methods address the same fundamental issue faced by all organizations: which products to make, which services to perform, which projects to undertake, which resources to acquire, and which resources to divest—i.e. all-in-all, which resources to allocate for which purposes. As organizations implement these decisions, physical transformations are made in the physical world. Prices and costs are clearly key factors driving such decisions. As economic theory teaches, given the desires of the populous and the availability of resources, prices and costs are measurements of relative scarcity and serve as a means to direct resources to where they are best used; this is named "the pricing mechanism" in economics and is a keystone of the free market philosophy.

Under the subjective method, one or more people decide upon allocations in the ways that individuals and groups subjectively decide any matter. This is not objective, nor scientific, and carries with it additional well-known risks and limitations of subjective decision making.

Under accounting methods, so called "costs" are determined and used for deciding issues at hand. As has been well-known for decades, these costs are not economic costs, i.e., the costs that should be used in decision making and that are recognized by economists. By using such invalid costs, undesirable allocations can be made.

The problem with the accountant's cost, as is best known by economists and people with MBAs, is that it:

1. inappropriately includes the price paid for resources, even though such prices are frequently irrelevant to the decision at hand, which is how best to use resources.
2. does not include opportunity cost, which is the loss or waste resulting from not using a resource in its best use.

There is also the famous dilemma of whether cost, as determined by an accountant, should include fixed, sunken, and/or overhead costs. There are strong practical arguments pro and con. Resolution of this issue would significantly affect how organizations calculate costs, and in turn allocate resources. This issue has never been resolved, other than through the dictates of current fashion.

Part of the dilemma of including fixed, sunken, and/or overhead costs is how best to allocate such costs, assuming that such an allocation is going to be made. As is well known, such allocations are largely arbitrary and necessarily distort resulting "costs."

Further, the accounting approach to allocating organizational resources is unable to fine-tune allocation quantities. A priori, it is known that the more of a resource an organization has, the less the resource's marginal (or incremental) value. Accounting offers no means to determine such a marginal value, which is necessary to optimally trade-off resource cost for resource value.

In the 1980s, Activity Based Costing (ABC) was developed to handle some problems resulting from overhead becoming an ever larger component of costs. It is essentially traditional accounting, but with a refined method of allocating overhead costs. It fails to address the above-mentioned problems. ABC is contingent upon all overhead costs being allocated, even though the academic community has for decades argued against such an allocation.

The most important operations research/management science method for allocating organizational resources is linear programming. It was originally formulated by economists in the 1940s and 50s. Part of its promise was both to displace accounting as a method for allocating organizational resources and to resolve the above mentioned accounting problems. For various reasons to be discussed below, linear programming mostly failed to displace accounting as a method for allocating organizational resources. It has largely been confined to use by engineers to solve engineering problems, some of which are organizational allocation problems.

As is well known by practitioners in the field, linear programming is used to allocate some resources for organizations such as oil companies, public utilities, transportation companies, manufacturers, and military units. Though as a method of allocating organizational resources linear programming is very important to some types of organizations for some types of allocations, overall, its use for allocating organizational resources has been limited.

The linearity requirement of linear programming is obviously its most significant deficiency. It cannot handle allocations when economies of scale, economies of scope, or synergistic properties exist; nor can it mix allocating volume and non-volume correlated resources. This means, most importantly, that what are usually known as overhead resources frequently cannot be allocated using linear programming. For example, for a mass market widgets manufacture, linear programming cannot handle the allocation of design resources: a design can be shared by multiple widgets models (economies of scope) and each design used for however many units are sold (economies of scale); further, linear programming cannot: 1) allocate design resources while also considering the effects of design on manufacturing efficiency (synergy), nor 2) simultaneously allocate resources to produce widget units (mix non-volume and volume correlated resources respectively). Practically, this means that linear programming cannot usually be used to allocate some of the most important organizational resources: management time, marketing resources, research and development, product design, product engineering, etc. Linear programming is not well understood by people likely to make organizational resource allocation decisions. Many of the textbooks published in the mid-1980s contained errors in their explanation of a key concept for using linear programming, even though the concept dates back to the 1950s. See Harper, Robert M. Jr. "Linear Programming in Managerial Accounting: A 'Misinterpretation of Shadow Prices-'"*Journal of Accounting Education* 4 (1986) p 123–130.

Some work has been done to facilitate the use of linear programming, but such work has focused on making linear programming easier to use, presuming the user has some general understanding of linear programming. See:

Gerald Collaud and Jacques Pasquier-Boltuck "gLPS: A graphical tool for the definition and manipulation of linear problems"*European Journal of Operational Research* 72 (1994) p. 277–286

Harvey J. Greenberg, "Syntax-directed report writing in linear programming using ANALYZE"*European Journal of Operational Research* 72 (1994) p. 300–311

Asim Roy, Leon Lasdon, and Donald Plane "End-User optimization with spreadsheet models"*European Journal of Operational Research* 39 (1989) p. 131–137

The final problem with using linear programming for allocating organizational resources is that it implicitly assumes a static future in terms of allocations. In other words, once an allocation is made, it is presumed fixed—at least until a new formulation is made and the linear programming process is repeated. This final problem is not addressed by attempts to extend linear programming to handle stochastic or chance-constrained considerations, with or without recourse. Such attempts are focused on making fixed allocations that best endure eventualities. For many organizations, opportunities, available resources, and commitments are in constant flux—there is never a moment when all can be definitively optimized; nor is it generally administratively or technically possible to update formulations and repeat the linear programming process continuously.

What is needed by organizations whose environments are in constant flux is a means to somehow use a single linear programming optimization to make multiple ongoing ad-hoc resource allocations without repeating or resuming the linear programming optimization.

Linear programming has been extended in several overlapping directions: generalized linear programming, parametric analysis/programming, and integer programming. These extensions have concentrated mainly on broadening the theoretical mathematical scope. See:

Karen Aardal and Torbjörn Larsson, "A Benders decomposition based heuristic for the hierarchical production planning problem", *European Journal of Operational Research* 45 (1990) p. 4–14.)

J. F. Benders, "Partitioning procedures for solving mixed-variables programming problems", *Numerische Mathematik* 4 (1962) p. 238–252

George B. Dantzig, *Linear Programming and Extensions*—Chapter 22: "Programs With Variable Coefficients", Princeton University Press, Princeton (1963)

George B. Dantzig and Philip Wolfe, "Decomposition principle for linear programs", *Operations Research* 8 (1960) p. 101–111

Tomas Gal, *Post-optimal Analysis, Parametric Programming and Related Topics*, 2nd ed., Walter de Gruyter, Berlin (1995) (Particularly chapters 4 and 7)

Tomas Gal, "RIM multiparametric linear programming", *Management Science* 21 (1975) p. 567–575

Tomas Gal and Josef Nedoma, "Multiparametric Linear Programming", *Management Science* 18 (1972) p. 406–422

Other than integer programming's capability to handle integer variables within a linear programming construct, these extensions are of limited utility and are only for special cases. A general, practical, and useful formulation that utilizes these extensions for allocating organizational resources has not been developed.

Other operations research/management science techniques that might be used as a general means of allocating organizational resources include quadric programming, convex programming, dynamic programming, nonlinear programming, and nondifferentiable optimization. For purposes of allocating organizational resources, these techniques too are of limited utility, and only for special cases. A general, practical, and useful formulation that utilizes these techniques for allocating organizational resources has not been developed.

(For an excellent survey of the techniques of operations research/management science, see:

G. L. Nemhauser, A. H. G. Rinnooy Kan, and M. J. Todd (ed) *Handbooks in Operations Research and Management Science Volume 1: Optimization* North-Holland Publishing Co., Amsterdam (1989.))

Sometimes standard operations research techniques are adopted, or special techniques developed, to allocate organizational resources. Such techniques and uses are most common in military, public utility, transportation, and logistic applications. Such methods of allocation are far too specialized to be used outside the areas for which they are specifically developed.

Under the miscellany methods of allocating organizational resources, there is Cobb-Douglas, sequential decision models, the "Theory of Constraints," and internal organizational pricing. The Cobb-Douglas method, used by economists since the 1930s, entails using statistical regression to estimate the following equation:

$$\log q = b_0 + b_1 \log x_1 + b_2 \log x_2 + \ldots + b_n \log x_n$$

where:

q=quantity of product produced $b_i$=estimated coefficient $x_i$=resource quantity used This estimated equation is then used for economic analysis, including determining whether aggregate resource quantities (typically on a national level) should be changed. The problem with this approach is that many data points are required and that it entails a gross aggregation. Furthermore, the formulation, because it completely lacks any linearity, is frequently unrealistic.

For marketing, selling, and advertising purposes, a sequential decision model is sometimes used. A potential buyer is presumed to make a purchase decision in stages, and the goal of the seller is to be able to pass each stage. By depicting the purchase decision as a sequence of stages, such a model helps identify where effort should be focused. Such models are usually qualitative, though they may have probabilities of passage assigned to each stage. Because of its perspective and limited quantification however, the applicability of this method of allocating organizational resources has been limited to only focusing efforts within the marketing, selling, and advertising areas.

"The Theory of Constraints" focuses on identifying a single organizational constraint and then managing that constraint. The problem with this method is its presumption of a single constraint, its qualitative nature, and, to the extent to which it is quantified, its not yielding results or insights any different from applying accounting (variable costing mode) or linear programming.

Sometimes, in some organizations for some resources, an internal price is set by using the above allocation techniques and/or open market prices. (Dorfinan, p. 184, mentions using linear programming for such internal pricing.) Such internal prices are then used with the above allocation techniques to determine when and where internally priced resources should be used. When internal prices are set by, and then used in, the above allocation techniques, the techniques' flaws and limitations as previously discussed remain.

All of these methods for allocating organizational resources—subjective, accounting, operations research/management science, and miscellany—are frequently used to allocate resources across several, time periods. i.e. used for scheduling. Again, the techniques' flaws and limitations as previously discussed remain. These techniques themselves are frequently deficient, because they are unable to fully optimize resources allocations, given the various dependencies.

In conclusion, these deficiencies have come about because of various unrelated reasons. Traditional accounting reflects the problems, capabilities, and knowledge of the time it was first developed—the first third of this century—prior to most modern theoretic economic understanding. Activity Based Costing limited itself to addressing only some of the most serious problems of traditional accounting. It ignored modern theoretic economic understanding, because practical attempts to use such knowledge were frequently incorrectly done, and, consequently, undesirable allocations were made. Activity Based Costing also ignored modern economic understanding because the economic profession had not sufficiently bridged the gap between theory and practice. Linear programming never even moderately displaced accounting, because it was not sufficiently theoretically and practically known how to extend and adapt it. Other operations research techniques also never displaced accounting, partly because they were developed to solve special engineering problems and/or as academic exercises.

Hence, today, organizations are without the tools to best allocate resources; and as a consequence, their abilities to reach goals are hindered, the allocation of humanity's resources is sub-optimal, and humanity's living standard is less than what it could be. It is the solution of this problem to which the present invention is directed.

Objects and Advantages

Accordingly, besides the objects and advantages of the present invention described elsewhere herein, several objects and advantages of the invention are to:

1. Optimally, or near optimally, allocate all types of resources belonging to any type of organization to best serve its goals.
2. Provide a means that leads an organization to optimally, or near optimally, allocate all types of resources to best serve its goals.
3. Provide costs, including opportunity costs, that reflect all factors necessary for optimal decisions.
4. Provide resource marginal, or incremental, values that can be used to optimally determine whether additional resources should be acquired or resource levels reduced.
5. Resolve the decades-old dilemma of whether and how to allocate fixed, sunken, and overhead costs.
6. Handle uncertainty when allocating resources and calculating costs and values.
7. Provide an objective means for allocating all types of organizational resources.
8. Adapt and extend linear programming to displace accounting as a means for allocating organizational resources.
9. Unify existing methods of allocating organizational resources.
10. Provide a means to facilitate an analyst in applying economic theory when analyzing organizational resource allocations.
11. Provide a simple means of use that shields the user from complexity.

Still further objects and advantages will become apparent from a consideration of the ensuing description and drawings.

SUMMARY OF THE INVENTION

The foundational procedure for achieving these objects and advantages, which will be rigorously defined hereinafter, can be pictured by considering FIGS. 1 and 2.

FIG. 1 illustrates a typical computer configuration: a database 101, a bus 103, one or more user IO devices 105, one or more processors 107, linear programming memory 109, a linear programming process 111 (hereafter, LPP), Resource-conduit memory 113, and a Resource-conduit process 115 (hereafter, RCP). (FIG. 1 is explanatory and should not be construed to limit the type of computer system on which the present invention operates.)

FIG. 2 shows the Resource-conduit memory 113 in some detail. In this figure, a vector or one-dimensional array resQuant contains the available quantities of each resource. A matrix, structure, or two-dimensional array rcMat contains what are here called (resource-utilizing) groups, such as group 201. Each resource in each element of vector resQuant is allocated to the groups in the corresponding column of rcMat. The allocation to each group determines what is here called an effectiveness, which is typically both between 0.0 and 1.0 and represents a probability. For each row of rcMat, the effectivenesses of each group are multiplied together to determine the elements of vector rowEffectiveness. Vector potentialDemand contains the maximum conceivable Potential-demand for each of an organization's products; this is what could be sold if the organization had unlimited resources. Each element of vector rowEffectiveness times the corresponding element in vector potentialDemand determines constraint values (commonly known as original b values) fed into linear programming memory 109. Conceptually, these constraint values are termed here Realized-demand.

Once initial linear programming constraint values are determined, the LPP is executed and the following is iterated:

1. the results of the LPP are used to shift or adjust group allocations.
2. new linear programming constraint values are determined.
3. the linear programming memory 109 is updated.

The RCP mainly performs "aperture" allocations, while the LPP mainly performs "fulfillment" allocations. These two types of allocations are defined below. The LPP is a slave of the RCP.

Numerous other advantages and features of the invention will become readily apparent from the following detailed description of the invention and the embodiments thereof, from the claims, and from the accompanying drawings.

Theory of the Invention

Part of the underlying theory of the present invention is that all organizational allocations can be divided into either fulfillment or aperture allocations. Fulfillment allocations use resources to directly make individual product units. Using resources in this way is commonly deemed to generate so-called direct or variable costs that vary with production volume. Aperture allocations are made to keep an organization viable and able to offer its products. These types of allocations are commonly deemed to generate so called indirect, overhead, or fixed costs that do not vary by production volume. Conceivably, a resource can be used for both fulfillment and aperture purposes.

The term "aperture" reflects how the present invention deems certain allocations: as allowing Potential-demand to manifest and become Realized-demand. The fundamental purpose of a group is to transform an allocation into an effectiveness. The higher the allocation to a group, the higher the effectiveness, which results in a higher percentage of Potential-demand becoming Realized-demand. For instance, the allocation to:

- Group 201 might be research and development people months; effectiveness is the percentage of Potential-demand that finds the resulting product functionality desirable.
- Group 203 might be product-design months; effectiveness is the percentage of Potential-demand that finds the resulting product design desirable.
- Group 205 might be advertising dollars; effectiveness is awareness bought by such dollars.

For a unit of Potential-demand to become Realized-demand, it must find the functionality desirable, it must find the design desirable, and it must be aware of the product—it must survive a series of probabilities. This sequential process is modeled here by multiplying the effectivenesses of the groups to obtain rowEffectiveness, which is in turn multiplied by potentialDemand to obtain the constraint value (Realized-demand) used in the LPP.

A group can span several rows of rcMat, and thus the group's effectiveness used for determining the values of several elements of rowEffectiveness. This row spanning means that a single aperture allocation can apply to several products simultaneously. For instance, the application of design resources might apply to, and benefit, several products simultaneously.

The rows spanned by groups in one column of rcMat can be independent of the rows spanned by groups in another column. This independence of row spanning means that products can share and not share resources in arbitrary patterns. For instance, product groupings to share and not share design resources can be independent of the product groupings to share and not share advertising resources.

The relationship between group allocation and effectiveness can be empirically determined by experience, judgment, statistical analysis, or using a coefficient of a Cobb-Douglas function. Because of the independence of the groups, the relationship between group allocation and effectiveness can be determined independently for each group. The relationship can be determined by answering the following question: "Presuming that a group's allocation is the only factor determining whether a product will be purchased, and made available for purchase, how does the probability of purchase vary as the allocation varies?" Presenting this question and being able to work the answer is a major advantage of the present invention. Heretofore, it has usually been very difficult, if not impossible, to individually and collectively analytically consider and evaluate what are here termed "aperture allocations."

(Management time is one of the most important resources an organization has. Groups can also handle such a resource: the allocation of such a resource to a group yields, as before, an effectiveness, which is the percentage of Potential-demand that survives to become Realized-demand, given that management time has been used to make the product available and desirable.)

Each resource is considered either fixed or buyable. A fixed resource is one that is available on-hand and the on-hand quantity cannot be changed. A buyable resource is one that is purchased prior to use; its availability is infinite, given a willingness and ability to pay a purchase price. A fixed resource named Working Inventory Cash (WI-cash) (loosely, working capital) is used to finance the purchase of such buyable resources. It is the lost opportunity of tying up of that cash that is the real cost of buyable resources—and not the purchase price per se.

For example, owned office space is typically a fixed resource: an organization is not apt to continuously buy and sell office space as "needs" vary. Public utility services are buyable resources, since they are frequently, if not continuously, purchased. Employees can be considered either fixed or buyable resources. If an organization generally wants to retain its employees through ups and downs, then employees are fixed resources. If an organization wants employees strictly on a day-to-day as-needed basis, then they are buyable resources. Note that for all fixed resources, including employees, periodic payments, such as salaries, are not directly considered by the present invention: the invention optimally allocates fixed resources presuming their availability is fixed; current payments for such resources is irrelevant to the decision of optimal allocation. Whether the quantities of fixed resources are increased or decreased is decided exogenously of the invention by the user. To help the user, the invention generates marginal values and demand curves that help anticipate the effects of changing fixed resource quantities.

Though this description is written using a terminology suitable for a commercial manufacturing concern, the present invention is just as applicable for commercial service, non-profit, and government entities. From the invention's perspective, a commercial service is tantamount to a commercial product—both require resources to fulfill a sale. Products and services provided by non-profits and governments also require resources, but are handled slightly differently: because such an organization doesn't usually receive a full price (value) for its products and services, the "price" used in the allocation process needs to include an estimated value to society of providing a unit of the service or product.

As will be explained, the present invention can make allocations to either maximize internal producer's surplus (IPS) or maximize cash. The first term derives from the economist's term "producer's surplus." It's called internal here because the economist's "producer's surplus" is technically a societal surplus. A strict opportunity cost perspective is employed here—IPS is profit as compared with a zero profit of doing nothing. For non-profits and government entities, IPS is a measurement of fulfilling their missions. IPS both includes non-monetary benefits received by the organization when its products are purchased and includes wear-and-tear market depreciation on equipment. When an organization's survival is at stake, non-monetary benefits and wear-and-tear market depreciation on equipment becomes irrelevant: the only thing that is relevant is increasing cash. For such situations, maximizing cash is the appropriate allocation objective.

As will be explained, the present invention can make allocations either directly or indirectly. In the direct method, the invention explicitly allocates resources. In the indirect method, the invention uses Monte Carlo simulation to estimate the opportunity cost, or value, of each resource. This opportunity cost is then used to price each resource, which determines when and where it should be used.

The major advantage of the present invention is to, for the first time, optimally allocate all types of organizational resources for all types of organizations.

DRAWING FIGURES

In the drawings, closely related Figures have the same number but different alphabetic suffixes:

FIG. 3 shows a basic database schema.

FIG. 6 shows group head and group element data fields.

FIG. 16 is a combination of FIGS. 16A and 16B, which shows the Ridge-walk allocation shift in detail.

FIG. 18 shows the top portion of the Graphical User Interface (GUI) distribution window.

FIG. 21 shows the GUI results window.

DETAILED DESCRIPTION-BASIC EMBODIMENT

Figure 1:
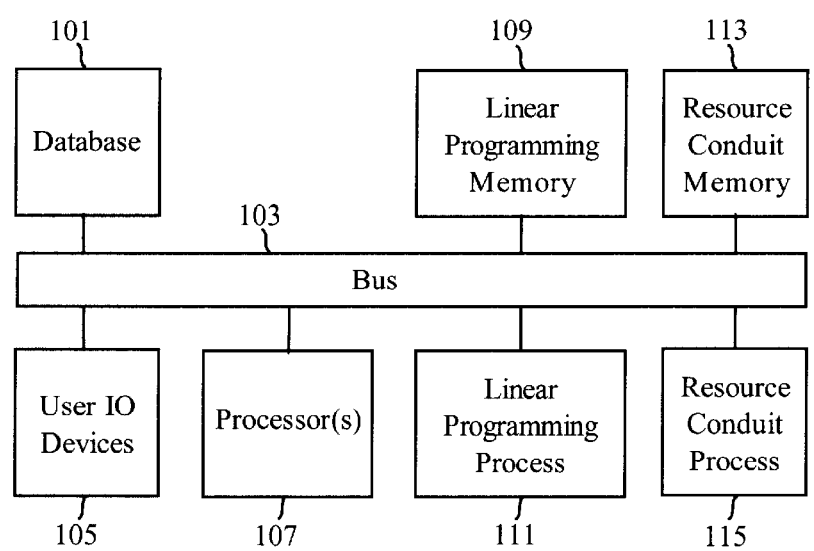
FIG. 1 illustrates an explanatory computer configuration.
Figure 2:
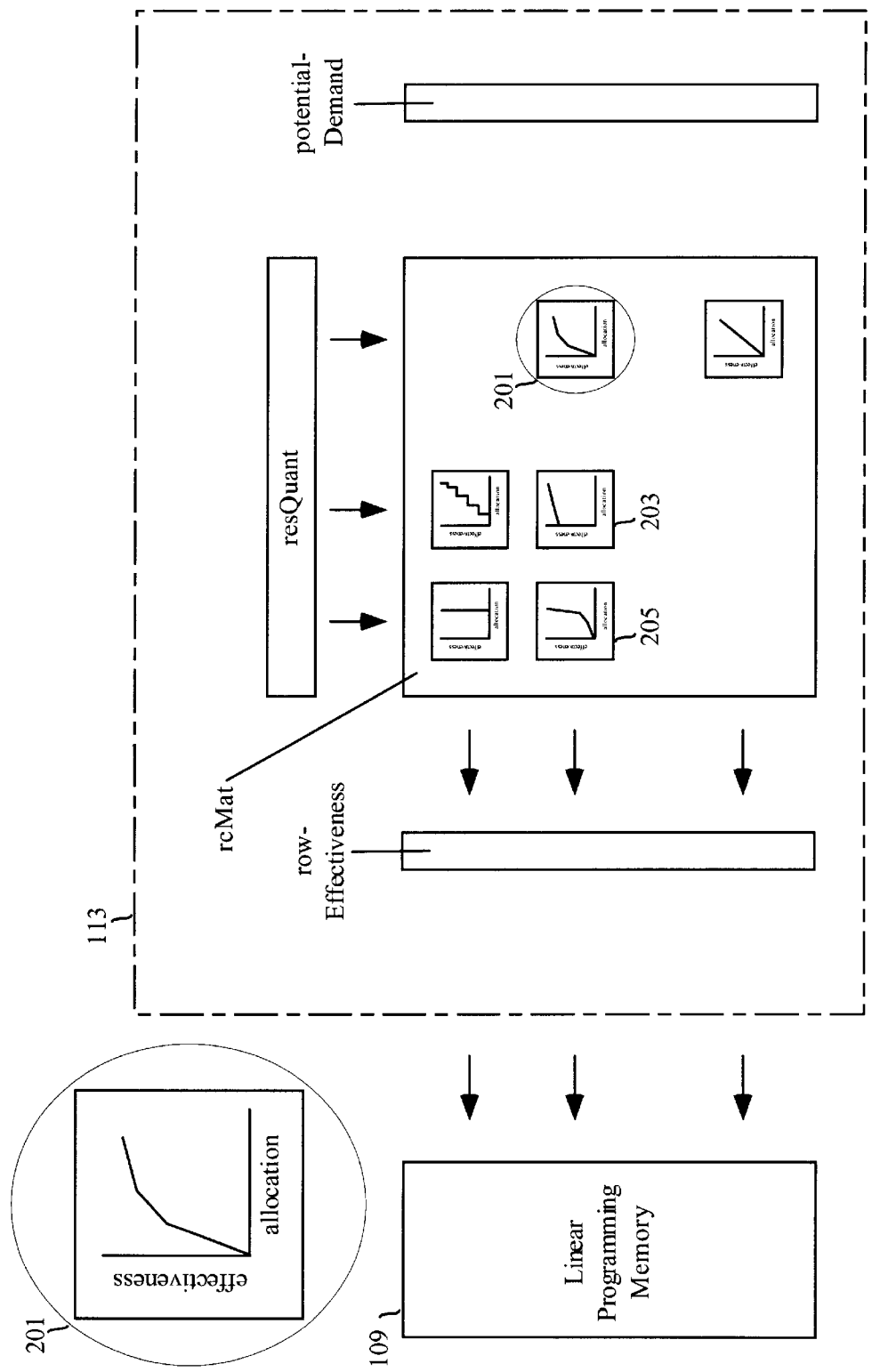
FIG. 2 shows a conceptual memory layout.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

The basic embodiment of the present invention will be discussed first. Afterwards, the preferred embodiment, with its extensions of the basic embodiment, will be presented.

With one exception, all costs mentioned in the present invention refer to opportunity costs, which are derived from the in-progress or finalized allocations. The one exception is expenditures for buyable resources that are written to the database and shown in the GUI windows. Here, the words "cost" and "value" are almost synonymous: cost will tend to be used when a subtraction orientation is appropriate and value will tend to be used when an addition orientation is appropriate. The economist's word "marginal" means incremental or first functional derivative. Pseudo-code syntax is loosely based on 'C', C++, SQL and includes expository text. Vectors and arrays start at element 0. Indentation is used to indicate a body of code or a line continuation. Pseudo-code text overrules what is shown in the figures. Floating-point comparisons are presumed done with a tolerance that is not explicit in the figures or pseudo-code. The expression "organizational resources" refers to resources that are directly or indirectly controlled, or are obtainable, by an organization and that can be used to serve its goals.

Database

The basic embodiment of Database 101 is shown in FIG. 3. A simple quasi-relational schema is used here to facilitate understanding. It should be understood that the present invention can easily work with other schemata and database technologies, whether relational or not. There are five tables: Resource, Group, Group Association, Product, and UnitReq. The Resource Table has nRes rows and describes available resources: name (resourceName), available quantity (availQuant), used quantity (meanUse) and marginal, or incremental, value (marginalValue). The Group Table describes groups: name (groupName), resource (resourceName), the allocation-to-effectiveness function (structure atoeFnPt), allocation (meanAlloc), and marginal value. The allocation-to-effectiveness function is described using nir+1 points, which determine nir continuous line segments. These points have only non-negative coordinates and are ordered such that atoeFnPt[i].allocation<atoeFnPt[i+1].allocation, where 0<=i and i<nir−1. (To facilitate exposition, the allocation-to-effectiveness function is presumed to pass through the origin, where atoeFnPt[0] is the origin point. Also to facilitate exposition, each group is presumed to have the same number (nir) of line segments. Relaxation of these two presumptions requires several small obvious changes throughout the exposition.) The Product Table has mProd rows and describes products: name (productName), price, Potential-demand, quantity-to-produce as the result of the optimized allocation process (meanSupply), and marginal cost. The UnitReq Table describes the fulfillment quantities of resources needed to produce each product unit. The Group Association Table maps a many-to-many association relationship between the Group and the Product Tables.

Memory

Figure 4:
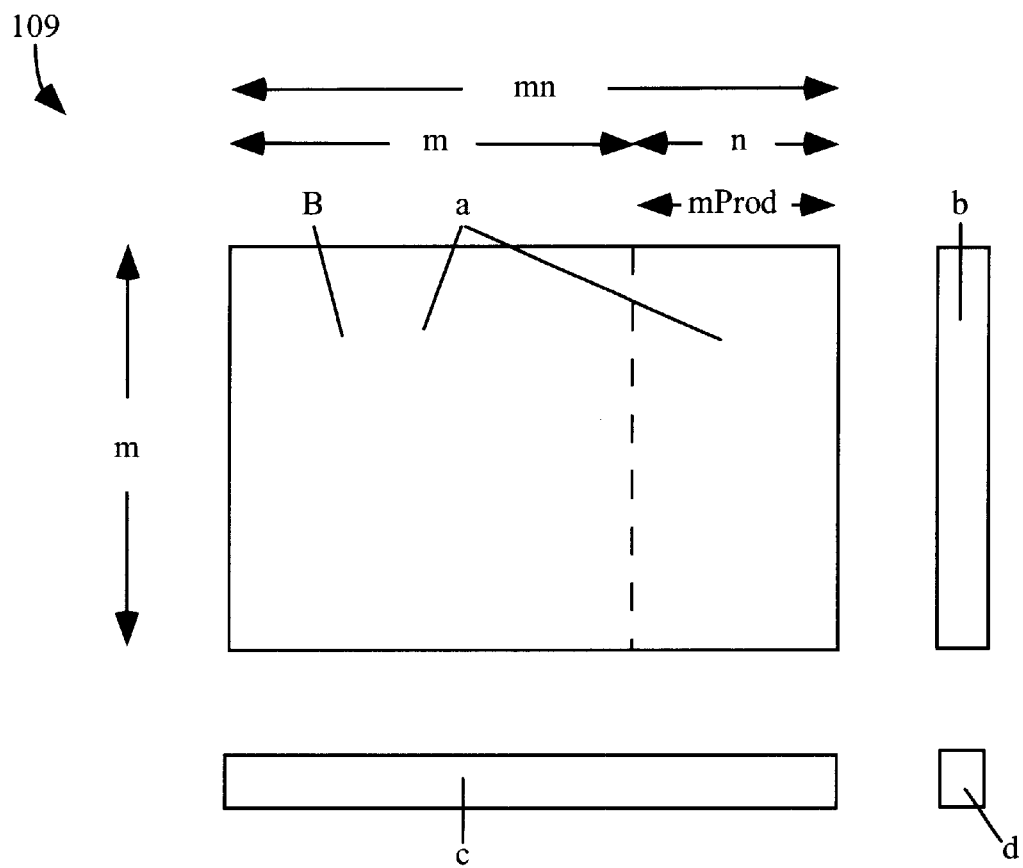
FIG. 4 shows prior-art linear-programming memory.

FIG. 4 shows prior-art linear programming memory 109 in some detail, using standard notation: initially the m by mn matrix a contains constraint coefficients; vector b contains constraint bounds; vector c contains object coefficients; and scalar d contains the value of optimization. (The absolute value of d, i.e., |d|, is utilized here to avoid awkward wording.) Within matrix a is the standard rectangular matrix B, which, initially is an identity matrix. In the right-hand portion of matrix a are n (mProd) columns, each initially containing product resource-requirement coefficients.

Figure 5:
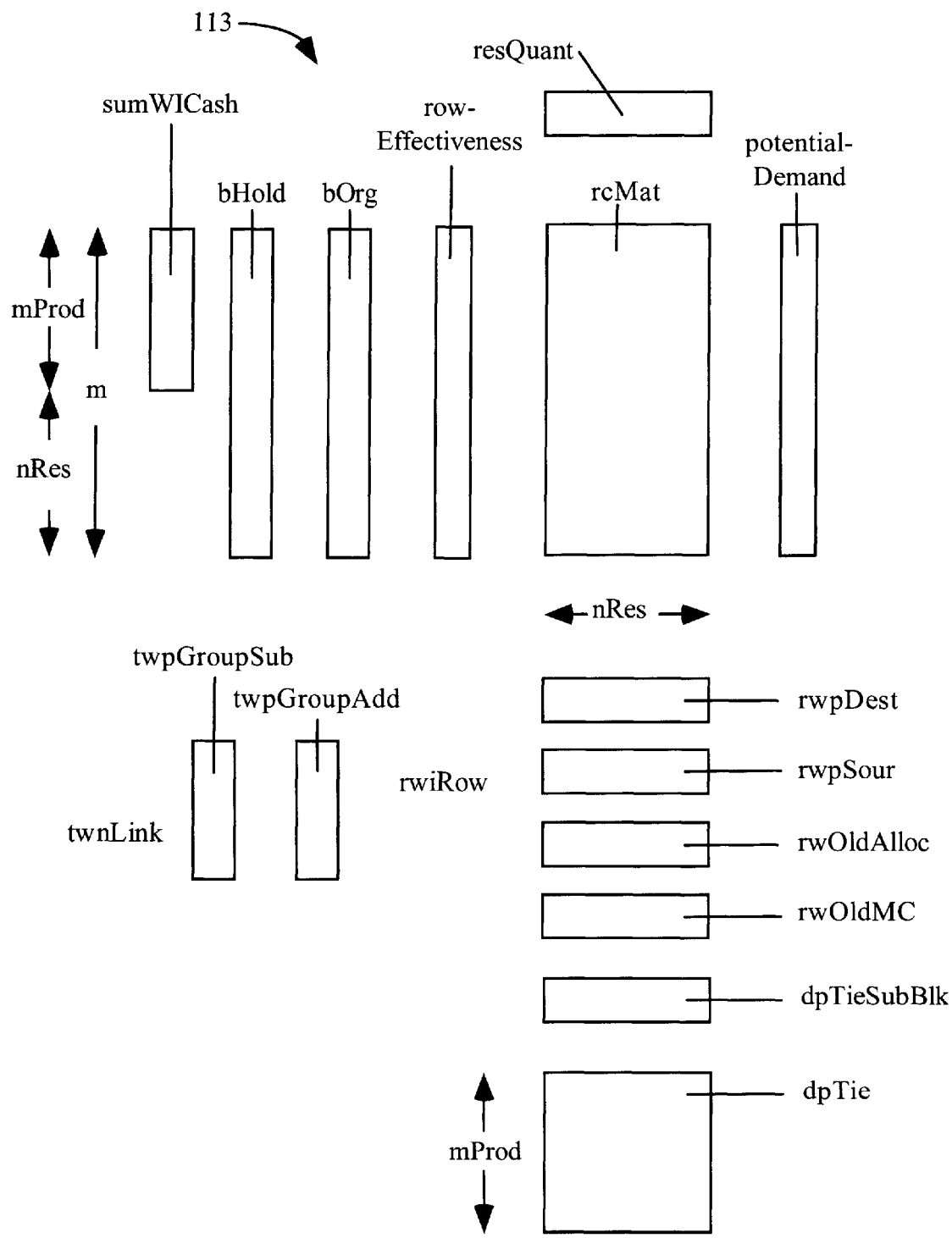
FIG. 5 shows Resource-conduit memory.

Resource-conduit memory 113 is shown in further detail in FIG. 5. Matrix rcMat has m rows and nRes columns. The number of products (mProd) plus the number of resources (nRes) equals m. The vectors bHold, bOrg, rowEffectiveness, and potentialDemand each have m elements. Vector bHold holds temporary copies of vector b. The vector bOrg contains the current linear programming problem's original b vector values—the product of each element in vectors rowEffectiveness and potentialDemand. The vectors resQuant, rwpDest, rwpSour, rwOldAlloc, rwOldMC and dpTieSubBlk each have nRes elements, and each element of these vectors applies only to the corresponding column in matrix rcMat. As explained previously, vector resQuant contains the available resource quantities. The Ridge-walk process, to be described later, entails simultaneously shifting allocations from several groups to several groups. Conceptually, the source and destination groups are in separate rows of rcMat. The vector rwpDest contains pointers to the destination groups; rwpSour contains pointers to source groups; and vectors rwOldAlloc and rwOldMC contain pre-allocation-shifting destination allocations and source marginal costs respectively. For each of the mProd products, matrix dpTie has a row containing indexes of Direct-put groups, which are defined below. Vector dpTieSubBlk contains boolean values indicating whether the Direct-put groups referenced in matrix dpTie should not be used in vector rwpSour.

The Top-walk process, also to be described later, entails simultaneously transferring resources from several groups to several groups. These groups constitute a chain. The vectors twpGroupSub and twpGroupAdd identify this chain by containing pointers to groups for which the allocation is decreasing and increasing respectively. The variable twnLink contains the number of links in the chain.

The Ridge-walk process uses rwiRow as an iterator. Both Axis-walk and Top-walk avoid allocation shifts that result in rowEffectiveness[rwiRow] changing. The vector sumWICash, with mProd elements, contains the required expenditures for buyable resources to produce one unit of each of the mProd products.

A group consists of one or more of what are here termed group elements. For each group, one element is a group head, that, besides containing element data, contains data applicable to the entire group. Each row-column position of matrix rcMat is empty or contains either a group head or a group element. For any group, all elements, including the head, are in the same column of rcMat. There is at least one group head in each column of rcMat. Rows mProd through m−1 each contain a single group head; these groups have only a single element and they are termed Direct-put groups. Here, groups will be named and referenced by their locations in rcMat.

FIG. 6 shows the data contained in group heads and elements. A group head contains all the data fields of a group element; references to elements of a group implicitly include the group's head. A group head contains an allocation and a variable to hold working-temporary allocation values (allocationHold). As in the Group Table in Database 101, a group head contains an atoeFnPt structure that defines the allocation-to-effectiveness function with nir+1 points that determine nir continuous line segments. These points have only non-negative coordinates and are ordered such that atoeFnPt[i].allocation<atoeFnPt[i+1].allocation, where 0<=i and i<nir−1. Variables dedaSub and dedaAdd contain directional derivatives of the allocation-to-effectiveness function. Structure atoeFnPt is indexed by ir. Variables maxSub and maxAdd, respectively, contain the maximum decrement and increment to the allocation that can be made, such that the directional derivative of the allocation-to-effectiveness function remains the same. Variable gmcSub (group marginal cost subtract) contains the marginal cost of decreasing the group's allocation; gmvAdd (group marginal value add) contains the marginal value of increasing the group's allocation. Variable twmcSub (Top-walk marginal-cost subtract) contains the marginal cost of decreasing the group's allocation, while simultaneously: 1) making a compensatory allocation increase to the group with a head at row twcRow and column twcCol in rcMat, and 2) making a compensatory allocation decrease to the group with a head at row twcsRow in column twcCol. The variable effectiveness is the result of applying the allocation-to-effectiveness function using the current allocation; its value is copied to each group element. The variable effectivenessHold holds working-temporary effectiveness values. The variable emcSub, which is found in both group heads and elements, is the single-row marginal cost of decreasing the group's allocation; the sum of emcSub for each element in a group equals the group's gmcSub. Similarly, emvAdd is the single-row marginal value of increasing the group's allocation. The variable subBlk, found in both group heads and elements, is a boolean value indicating whether a reduction in the group's allocation should be blocked (i.e. prevented) by setting emcSub to a very large value. A group head is also a group element.

Basic Embodiment Processing Steps

Figure 7:
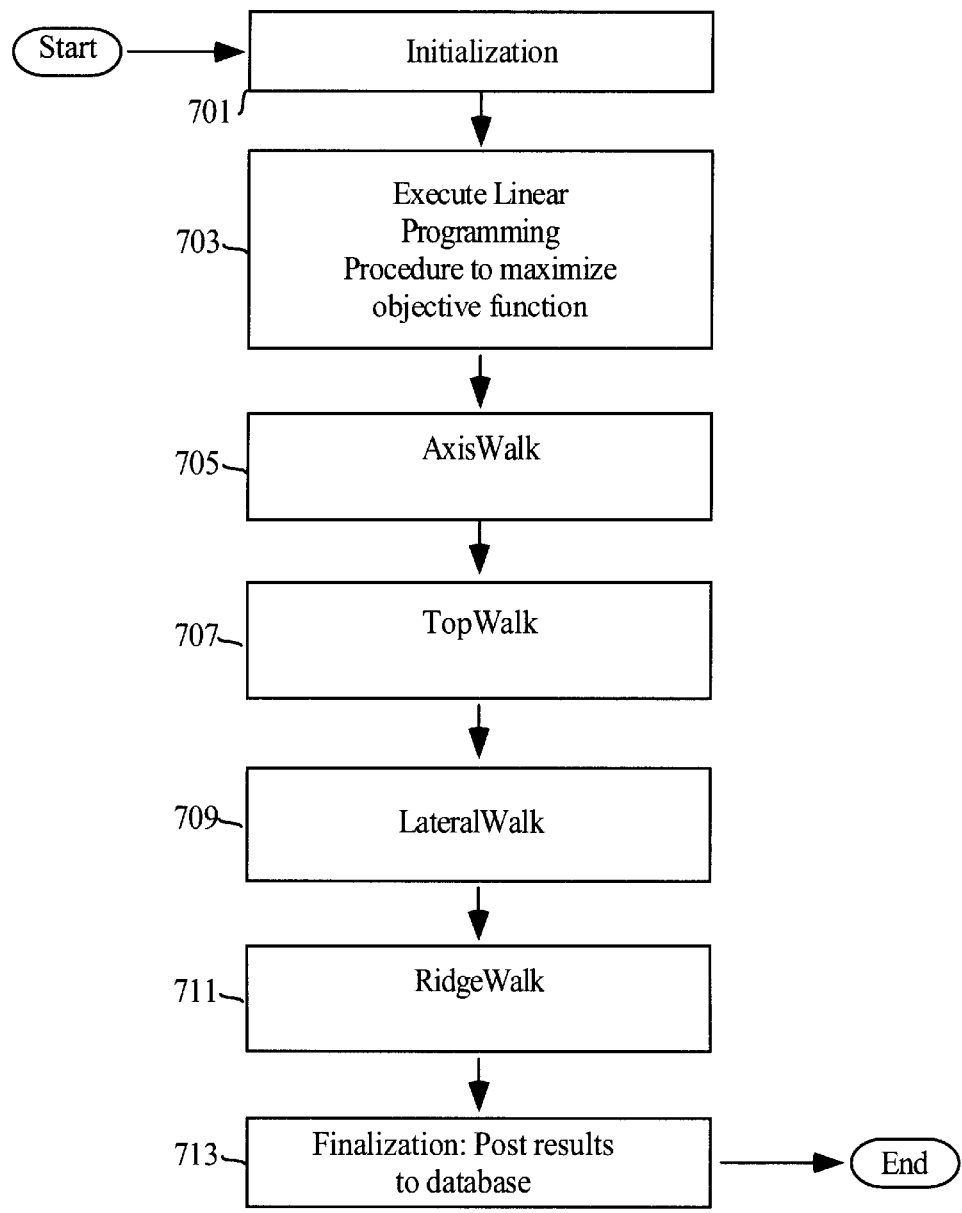
FIG. 7 shows the basic allocation process.

The basic embodiment processing steps are shown in FIG. 7. The initialization process 701 entails loading Database 101 data into both linear programming memory 109 and Resource-conduit memory and doing initial allocations. Process 703 entails executing the LPP. Axis-walk process 705 entails iteratively shifting part of an allocation from one group to another within each column of rcMat. Top-walk process 707 entails shifting part of an allocation from one group to another, while simultaneously making a chain of compensatory allocation shifts. Lateral-walk process 709 entails performing modified Top-walk, and in turn possibly Axis-walk, iterations. Ridge-walk process 711 entails attempting to move from a local to a better, if not global, optimum. The finalization process 713 posts the results to Database 101.

Graphical Depiction

Figure 8A:
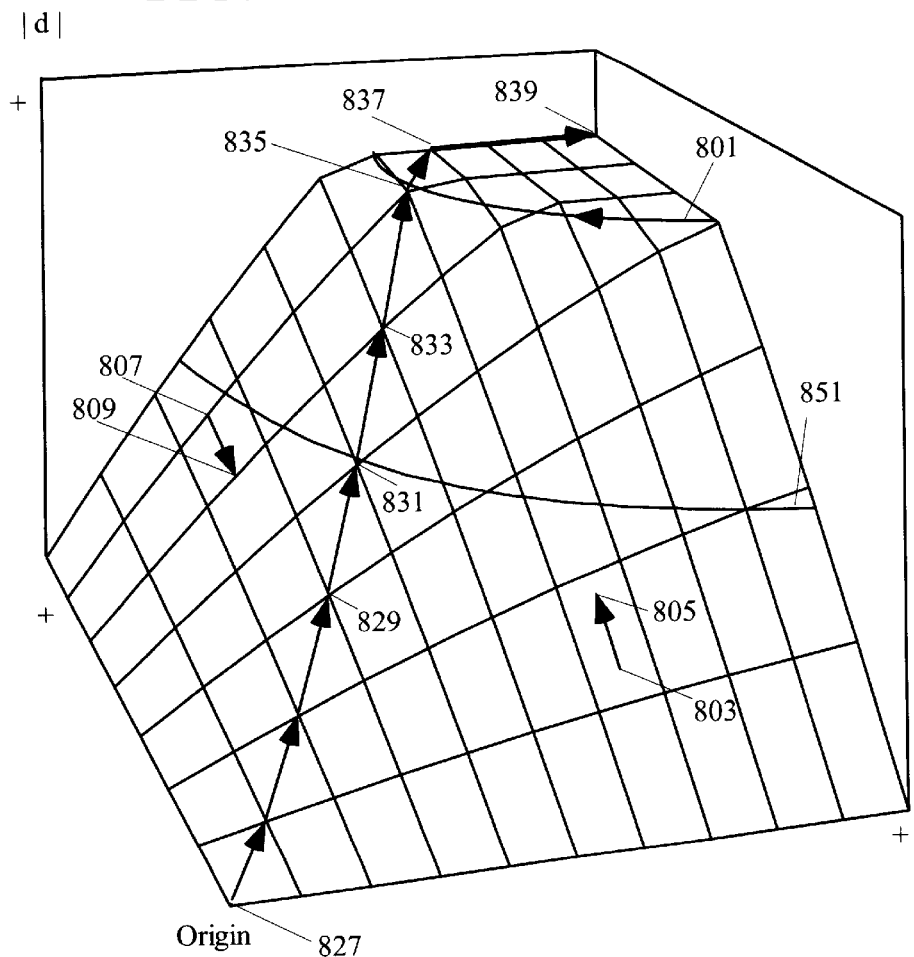
FIG. 8A shows a graphical depiction of allocation movements.
Figure 8B:
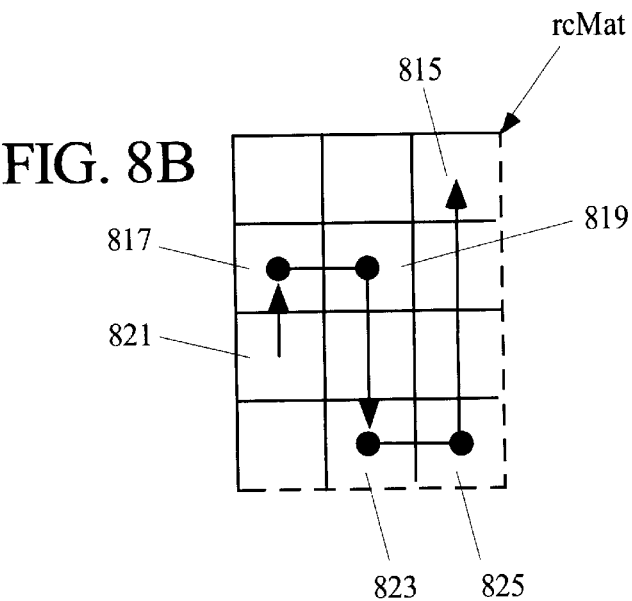
FIG. 8B shows corresponding allocation shifts in matrix rcMat.

Graphical depictions of the Axis-walk, Top-walk, Lateral-walk, and Ridge-walk processes are shown in FIG. 8A. This figure shows the optimization surface holding everything constant, except: 1) the allocations to two single-element groups in the same row k of rcMat (where 0<=k and k<mProd) and 2) c[k], which is either, depending on the surface point, 0 or a constant negative value. (Note that this constancy is being pretended. In actual operation, the surface represented in FIG. 8A frequently changes as movements take place.) The horizontal axis is the allocation of one resource to one group; the backward axis is the allocation of the other resource to the other group; the vertical axis is |d|, the value being optimized. The value of |d| increases as long as either or both allocations increase, up to a saturation level, which once reached, results in no further increase in |d|. Such a saturation level is depicted by a contour curve 801, which passes through a point 835. FIG. 8B shows the upper left-hand portion of an example rcMat matrix, where each matrix element contains a group head. (FIGS. 8A and 8B and associated descriptions are used here to facilitate understanding, and should not be construed to define or bound the present invention.)

Axis-walk process 705 entails increasing the allocation of one group, as shown in the Figure by moving from a point 803 to a point 805, while decreasing the allocation of another group, which would be similar to moving on that row's surface from a point 807 to a point 809. Such a movement is done until a directional derivative changes. In terms of rcMat, such a movement corresponds to shifting an allocation from one group to another group within the same column, e.g., shifting some of the allocation of Group 821 to Group 817.

In addition to moving parallel to an axis as in Axis-walk, Top-walk process 707 also entails moving along a contour curve such as contour curve 801. Such a movement has one group's allocation increasing, while another group's allocation decreases, such that the mathematical product of the two group's effectivenesses remains constant. With the mathematical product being constant, from the perspective shown in FIG. 8A, |d| also remains constant. In terms of rcMat, this might entail, for example, shifting the allocation from Groups 821 to 817, 819 to 823, and 825 to 815. The allocation increase in Group 817 and the decrease in Group 819 leaves the product of the two groups' effectivenesses constant and corresponds to movement along contour 801. (The same is also true for the 823 and 825 group pair.) The decrease in |d|, because of the decrease in the allocation of Group 821, is more than offset by the increase in |d|, resulting from the increase allocation in Group 815.

Each Axis-walk and Top-walk shift (movement) is done until a directional derivative changes. Such a change occurs when the end-point of an allocation-to-effectiveness line segment, or the edge of a linear programming facet, is reached. The size of each shift is determined by whittling-down an entertained shifting quantity. (The word "shift" refers to shifting an allocation from one group to another group in matrix rcMat; the word "movement" refers to moving on the geometric surface. Any shift can be pictured as a movement; any movement pictured as a shift.)

Lateral-walk process 709 determines a surface just below the surface depicted in FIG. 8A, and then applies and evaluates Top-walk, and indirectly Axis-walk, iterations. This stratagem is needed because the directional derivatives used individually by both Top-walk and Axis-walk may be inter-dependent and result in an instantaneous quantum change upon starting a shift or movement.

The Ridge-walk process 711 entails serially considering each of the mProd products, and transferring, at minimum cost, allocations to groups of the considered product (rcMat row) in order to force an increase in the product's rowEffectiveness. This is done to explore the possibility of moving from one local to a higher, if not global, maximum. As FIG. 8A depicts, for the row being increased, this entails moving along a ridge or path such as that indicated by points 827, 829, 831, 833, 835, 837, and 839. (Point 831 shows an orthogonal crossing with contour line 851.) For the row or rows being decreased, this entails either moving along a similar ridge or path but in the opposite direction, or moving parallel to an axis, e.g., from a point such as point 807 to a point such as point 809.

As the Ridge-walk process proceeds, Direct-put allocations are also increased to raise the planar portion of the surface depicted in FIG. 8A.

Initialization

Figure 9:
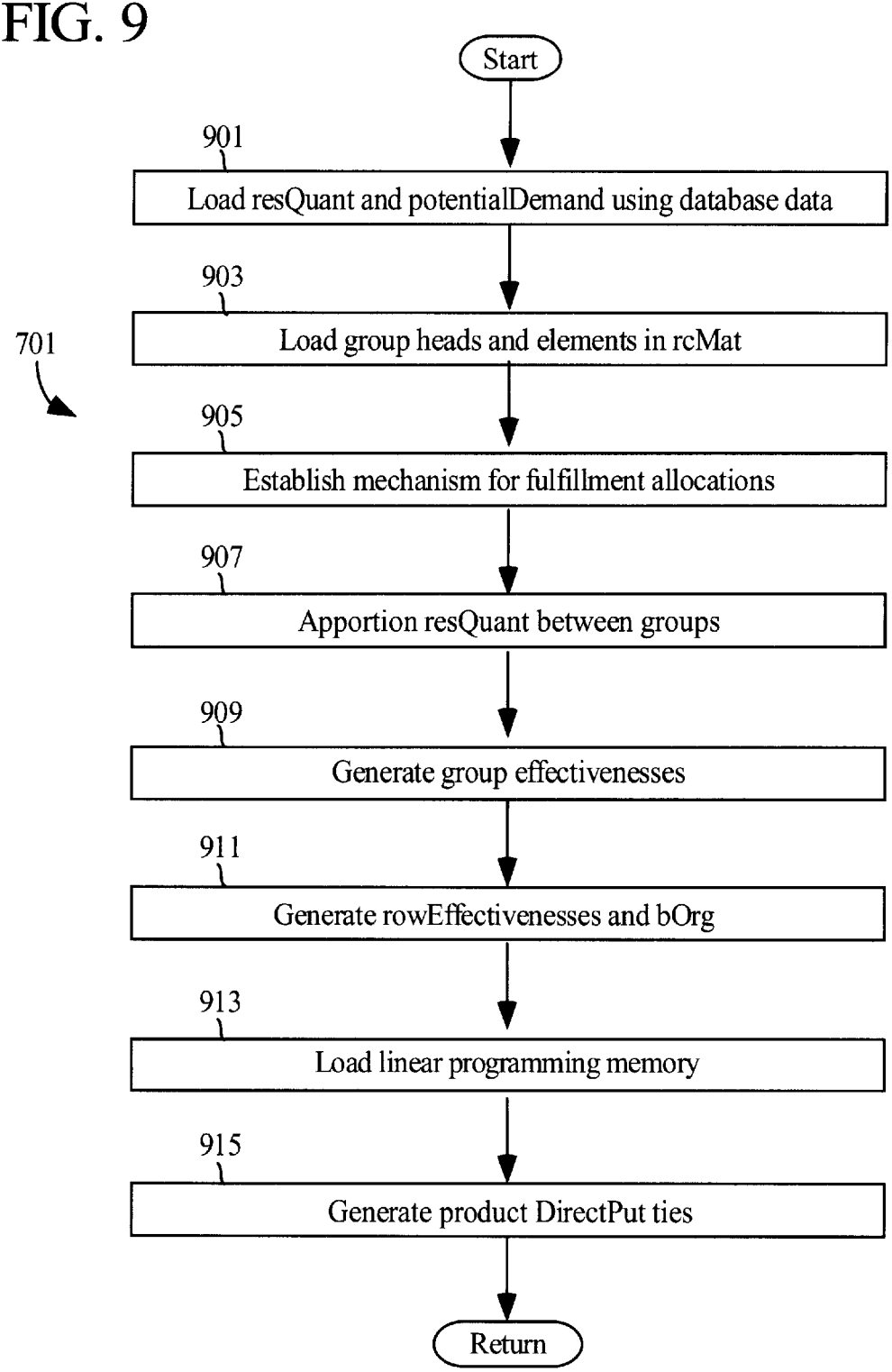
FIG. 9 shows the basic initialization process.

Initialization process 701 is shown in detail in FIG. 9 and consists of the following steps:

1. In Box 901, for each resource/row of the Database 101 Resource Table, load each availQuant into an element of vector resQuant. The first row's availQuant goes into resQuant[0], etc. For each of the mProd products/rows of the Product Table, load potentialDemand into the first mProd elements of the vector potentialDemand.

2. In Box 903, join Database 101 tables Group and Group Association, using groupname for the join. For each row of joined table, place either a group head or group element in the rcMat matrix: productName determines the row; resourceName determines the column. Place a group head in rcMat the first time each groupname is encountered; place a group element in rcMat each subsequent time a groupname is encountered. Load each group head with atoeFnPt structure data.

3. In Box 905, place Direct-put groups: place group heads along the diagonal of rcMat[mProd][0] through rcMat[m-1][nRes-1]. For these heads, set atoeFnPt[0].allocation and atoeFnPt[0]. effectiveness equal to 0; set atoeFnPt[1].allocation and atoeFnPt[1].effectiveness equal to the same very large value. Place ones (1.0) in elements mProd through m-1 of the potentialDemand vector.

4. In Box 907, for each column of rcMat, apportion the resQuant quantity to each of the group heads, i.e.,

```
for (j = 0; j < nRes; j++)
    for (i = each group head in column j)
        set rcMat[i][j].allocation = resQuant[j]/(number of group heads in
            column j of rcMat)
```

5. In Box 909, iterate through each column of rcMat and each element of the enumerated column that contains a group head. In other words, iterate through all group heads of rcMat. For each group head,

```
if (atoeFnPt[nir].allocation < allocation)
    set dedaSub = 0
    set dedaAdd = 0
    set effectiveness = atoeFnPt[nir].effectiveness
    set maxSub = allocation – atoeFnPt[nir].allocation
    set maxAdd = 0
else
    find ir such that:
        atoeFnPt[ir].allocation <= allocation and
        atoeFnPt[ir + 1].allocation > allocation
        (Conceptually, atoeFnPt[nir+1].allocation, if it existed, would be
            infinity and atoeFnPt[nir+1].effectiveness would be
            atoeFnPt[nir].effectiveness.)
    if (ir < nir)
        set dedaAdd = the slope of line segment ir, i.e., the line
            determined by points atoeFnPt[ir] and atoeFnPt[ir+1]
        set maxAdd = atoeFnPt[ir+1].allocation – allocation
    else
        set dedaAdd = 0
        set maxAdd = 0
    if (atoeFnPt[ir].allocation not = allocation)
        set dedaSub = dedaAdd
        set maxSub = allocation – atoeFnPt[ir].allocation
    else
        if (ir not = 0)
            set dedaSub = the slope of line segment ir–1
            set maxSub = allocation – atoeFnPt[ir–1].allocation
        else
            set dedaSub = BIG_M
            set maxSub = 0
    set effectiveness = atoeFnPt[ir].effectiveness +
        dedaAdd * (allocation – atoeFnPt[ir].allocation)
set each group element effectiveness = group head effectiveness
```

(BIG_M is an extremely large positive number. It should be set greater than any conceivable relevant applicable number generated by this invention.)

6. In Box 911,

```
for (i = 0; i < m; i++)
    if (group heads or elements exist in row i of rcMat)
        set rowEffectiveness[i] = mathematical product of the
            effectivenesses of each group head or group element in row i
    else
        set rowEffectiveness[i] = 1
    set bOrg[i] = rowEffectiveness[i] * potentialDemand[i]
```

7. In Box 913,

```
clear a, b, c, d
set B as an identity matrix
Place ones along diagonal a[0][m] through a[mProd-1][mn-1] of
matrix a.
For each row of the UnitReq table, set the appropriate element in matrix
    a equal to the value of reqQt: the field resourceName determines the
    appropriate row, with the first resource of the Resource Table
    corresponding to row mProd; productName determines the column, with
    the first product of the Product Table corresponding to column m.
set (vector) b = (vector) bOrg
set c[m] through c[mn-1] = prices of the mProd products as indicated in
    the product Table of Database 101
```

8. In Box 915,

```
set all elements of matrix dpTie = -1
for (jProd = 0; jProd < mProd; jProd++)
    for (i = mProd; i < m; i++)
        if (0 < a[i][m+jProd])
            set dpTie[jProd][i- mProd] = i
set rwiRow = -1
For each group element (including group heads) in rcMat
    set subBlk = FALSE;
```

Initial Linear Programming Process

Once Initialization process 701 is completed, process 703 calls the LPP to maximize the formulated linear programming problem.

Axis-Walk Process

Figure 10:
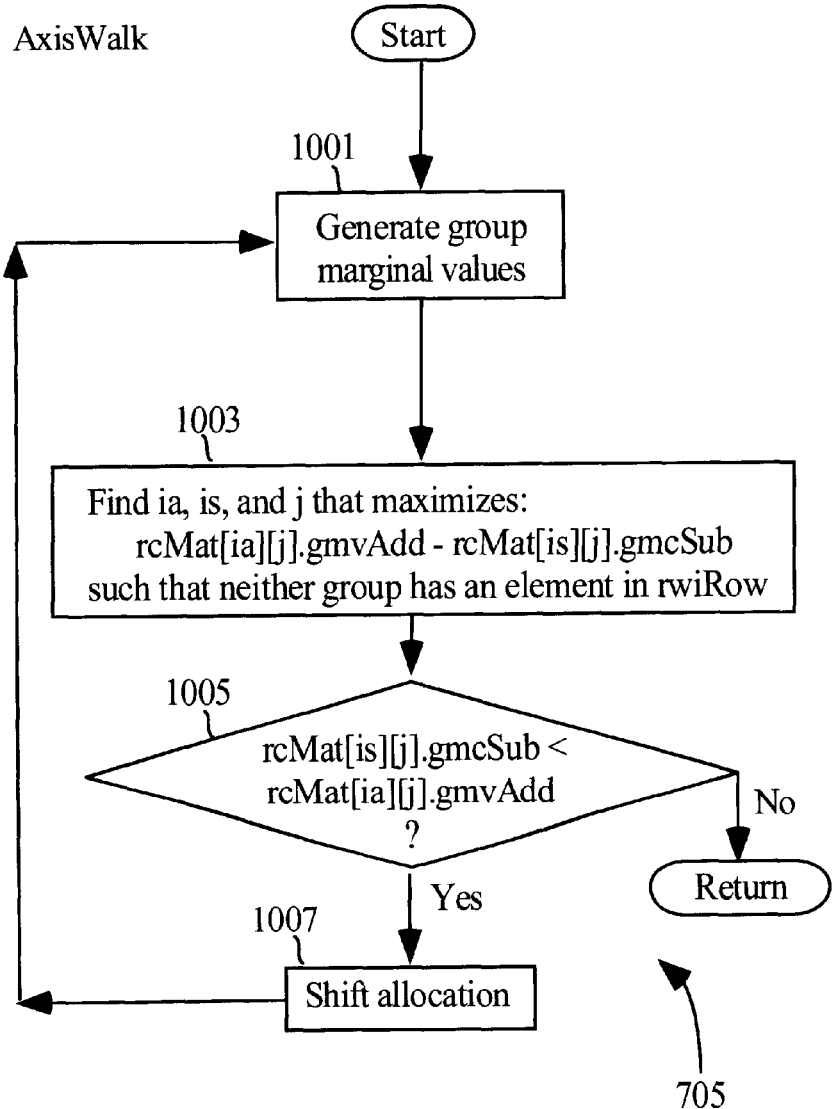
FIG. 10 shows the Axis-walk process.

Axis-walk process 705 is shown in FIG. 10, and entails the following steps:

1. In Box 1001, iterate through each column of rcMat and each element of the enumerated column that contains a group head. For each group under consideration:

```
for (i = rcMat row of each group element, including the group head)
    while found (find ii such that:
        • b[ii] = 0
        • B[ii][i] > 0
        • there exists a jj such that:
            c[jj] < 0 and a[ii][jj] < 0)
        if (ii found)
            Pivot row ii as described below in Box 1117
    endwhile
    set emcSub = - c[i] * (bOrg[i]/effectiveness) * dedaSub
    if ((ir = 0 and allocation = 0) or subBlk)
        set emcSub = BIG_M
    while found (find ii such that:
        • b[ii] = 0
        • B[ii][i] < 0
        • there exists a jj such that:
            c[jj] < 0 and a[ii][jj] < 0)
        if (ii found)
            Pivot row ii as described below in Box 1117
    endwhile
    set emvAdd = - c[i] * (bOrg[i]/effectiveness) * dedaAdd
    if (ir = nir)
        set emvAdd = 0
set gmcSub = sum of the emcSub values for each group element
set gmvAdd = sum of the emvAdd values for each group element
```

2. In Box 1003, find the two groups that maximize rcMat[ia],[j].gmvAdd minus rcMat[is],[j].gmcSub, where j ranges from 0 to nRes-1, and ia and is reference group heads in column j of rcMat. Exclude from consideration groups that have elements in row rwiRow of rcMat.
3. In Diamond 1005, test whether an allocation shift from group rcMat[is][j] to group rcMat[ia][j] is worthwhile. If the answer is "Yes", proceed to Box 1007; if the answer is "No", return to calling routine.
4. In Box 1007, shift allocation as shown in FIGS. 11A and 11B and explained below.

Axis-Walk Allocation Shift

Figure 11B:
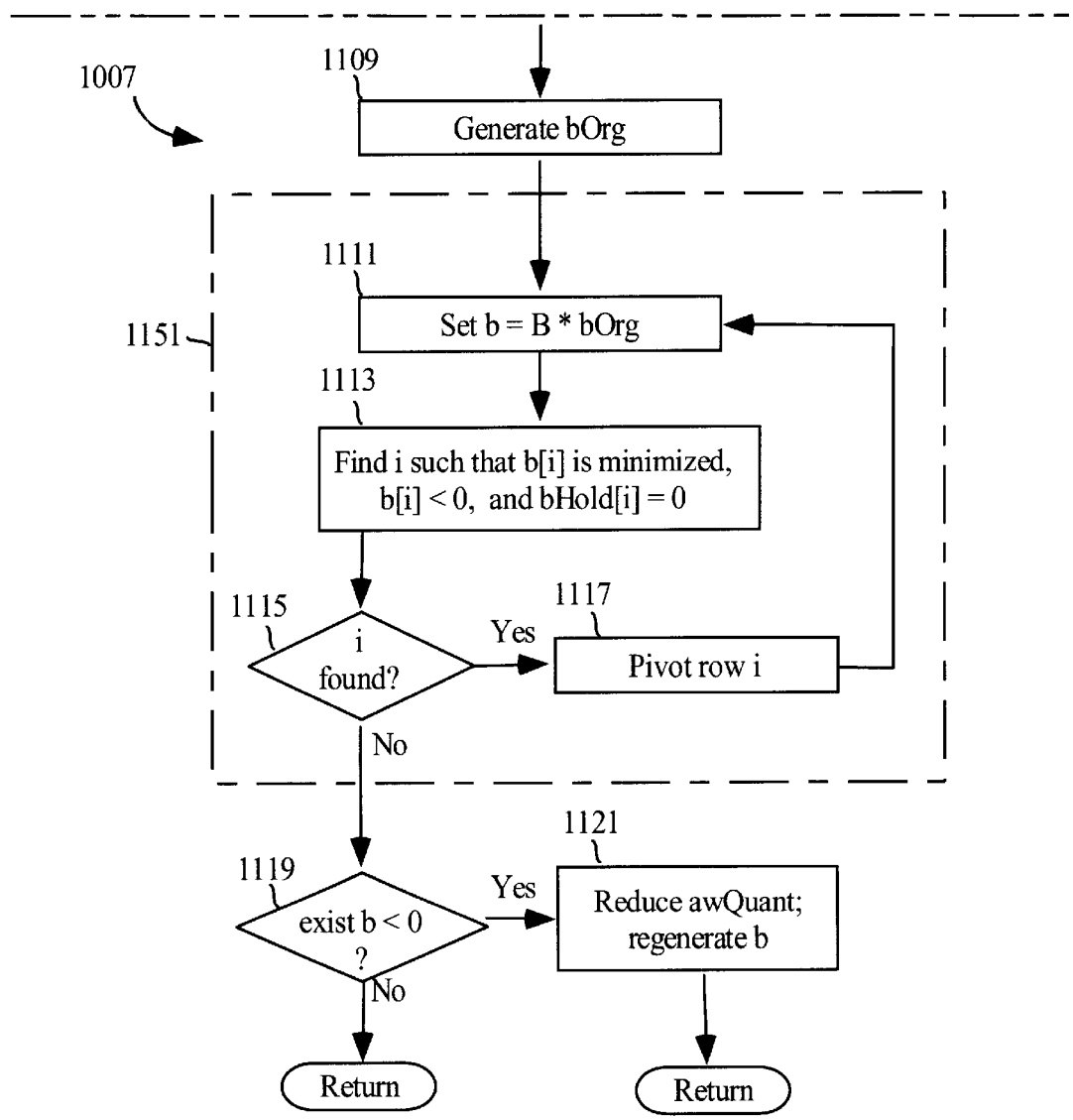
FIG. 11 is a combination of FIGS. 11A and 11B, which shows the Axis-walk allocation shift in detail.

FIGS. 1A and 11B show an enlargement of Box 1007, which entails the following steps.

Steps 6 through 9 define a Box 1151.

1. In Box 1101,

```
set vector bHold = vector b
set rcMat[is][j].allocationHold = rcMat[is][j].allocation
set rcMat[ia][j].allocationHold = rcMat[ia][j].allocation
```

2. In Box 1103,

```
set awQuant = minimum(rcMat[is][j].maxSub, rcMat[ia][j].maxAdd)
```

3. In Box 1105,

```
set rcMat[is][j].allocation = rcMat[is][j].allocationHold - awQuant
set rcMat[ia][j].allocation = rcMat[ia][j].allocationHold + awQuant
```

4. In Box 1107, apply Box 909 to groups rcMat[is][j] and rcMat[ia][j] to generate group effectivenesses.
5. In Box 1109, apply Box 911 to generate bOrg.
6. In Box 1111, set vector b equal to the product of matrix B and vector bOrg.
7. In Box 1113, if possible, find i such that:
   b[i] is minimized,
   b[i]<0, and
   bHold[i]=0.
8. In Diamond 1115, test whether an i was found in Box 1113. If the answer is "Yes", proceed to Box 1117; if the answer is "No", proceed to Diamond 1119.
9. In Box 1117, pivot row i as described immediately below, then go to Box 1111.

```
set irow = row to be pivoted
Find jcol such that
    • a[irow][jcol] < 0
    • c[jcol] < 0
    • c[jcol]/a[irow][jcol] is minimized
if (jcol found)
    apply prior art to pivot the simplex tableau (matrix a, vectors b and
        c, and scalar d) using a[irow][jcol] as the pivot element
```

10. In Diamond 1119, test whether any element of vector b is less than 0. If the answer is "Yes", proceed to Box 1121; if the answer is "No", return to calling routine.

11. InBox 1121,

```
Find i, such that
    b[i] < 0 and
    bHold[i]/(bHold[i] −b[i]) is minimized
set awQuant = awQuant * bHold[i]/(bHold[i] −b[i])
Generate vector b by reapplying Boxes 1105, 1107, 1109, and 1111
```

(Because an infinite loop may occur in Box 1151, a limit to the number of times branching from Diamond 1115 to Box 1117 is required. Once this limit is reached, Box 1151 should be exited. If Box 1151 was entered as a result of an Axis-walk, Top-walk, or Lateral-walk call, then the rcMat [is][j] and rcMat[ia][j] pair that led to the infinite loop should be directionally blocked so as to prevent a re-entrance into Box 1151. (Directional blocking is explained as part of the Top-walk process.))

Top-Walk Process

The Top-walk process considers shifting allocations from every group to every other group in each rcMat column. Because of inherent numerical accuracy limitations on most computers, it is necessary to test whether a Top-walk shift actually increased |d|, and if not, reverse the shift and block the considered group-pair shift possibility from further consideration. Such blocking can be accomplished by use of a three dimensional array of size mProd by mProd by nRes. The first index is the rcMat row of the subtraction group-head; the second index is the rcMat row of the addition group-head; and the third index is the rcMat column of the two group heads. Initially all elements of this array are set to 0; when a group pair is blocked, the appropriate element in the array is set to 1.0. Blocking is directional.

Also, because of numerical accuracy limitations, essentially a single Top-walk shift may be accomplished by many, similar, infinitesimally-small shifts; to avoid such a possibility and the associated "waste" of CPU cycles, a minimum shifting tolerance can be used. This tolerance (twQuantMin) needs to be set to a non-negative value. The smaller the value of twQuantMin, the more accurate the solution, but the more CPU cycles required.

Top-walk works with a chain of group heads, many of which are paired into uv pairs. For each pair, the u-group has its allocation increasing and the v-group has its allocation decreasing. In FIG. 8B, for example, for the 817-819 pair, group 817 is the u-group while group 819 is the v-group. Similarly for the 823-825 pair, group 823 is the u-group and 825 the v-group.

Figure 12:
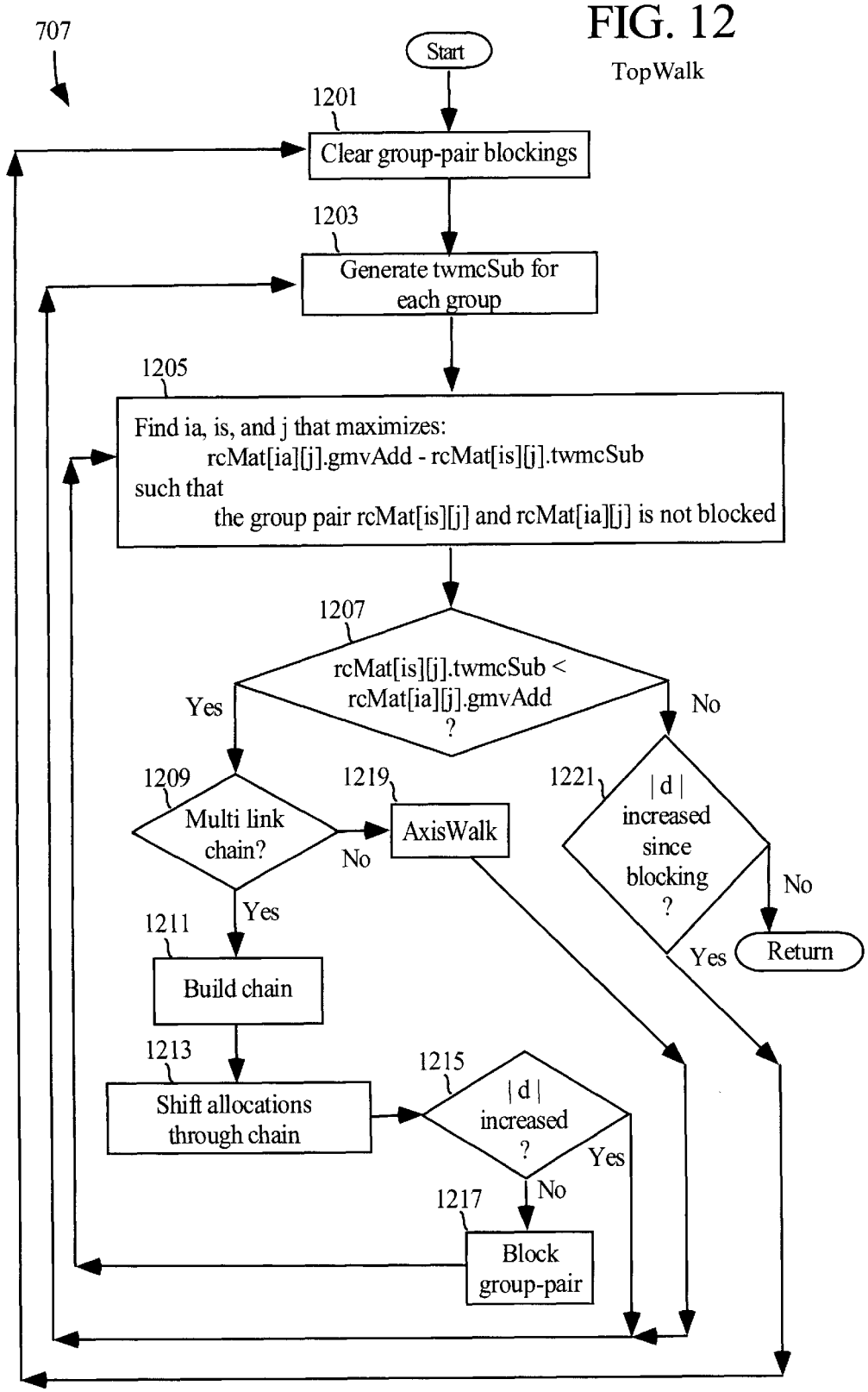
FIG. 12 shows the Top-walk process.

Top-walk process 707 is shown in FIG. 12, and entails the following steps:

1. In Box 1201, clear all group-pair blocking for all rcMat columns.
2. In Box 1203,

```
apply Box 1001
for each group element in row rwiRow of rcMat
    set emcSub = BIG_M
    set emvAdd = −BIG_M
    in element's group head
        set gmcSub = BIG_M
        set gmvAdd = −BIG_M
for (each group head in rcMat)
    set twmcSub = gmcSub
    set twcCol = −1
    set twcRow = −1
    set twcsRow = −1
```

*-continued*

```
set reCycle = TRUE
while (reCycle)
    set reCycle = FALSE
    for (irow = 0; irow < mProd; irow++)
        if (b[irow] = 0 or irow = rwiRow)
            for (jcolu = 0; jcolu < nRes; jcolu++)
                if (rcMat[irow][jcolu] is a group head or group element)
                    set irowuh = group-head row index of the group that has an
                        element at rcMat[irow][jcolu]
                    if (rcMat[irowuh][jcolu].ir not = nir)
                        find the group head in column jcolu that has the minimum
                            twmcSub value, that has a positive allocation, and that
                            is not rcMat [irowuh][jcolu]; set irowcs = the row index
                            of the found group head
                        for (jcolv = 0; jcolv < nRes; jcolv++)
                            if (rcMat[irow][jcolv] is a group head or element and
                                jcolu not = jcolv)
                                set irowvh = group-head row index of the group
                                    that has an element at rcMat[irow][jcolv]
                                if (rcMat[irowvh][jcolv].allocation not = 0)
                                    set lkqt = TWufvEpsilon(
                                        rcMat[irowuh][jcolu],
                                        rcMat[irowuh][colu].allocation,
                                        rcMat[irowvh][jcolv],
                                        rcMat[irowvh][jcolv].allocation)
                                    set mc = rc[irowcs][jcolu].twmcSub * lkqt
                                    for (i = each rcMat row of group
                                        rcMat [irowuh][jcolu])
                                            if (rcMat[i][jcolv] is not an element of
                                                group rcMat[irowvh][jcolv])
                                                set mc = mc −
                                                    rcMat[i][jcolu].emvAdd * lkqt
                                    for (i = each rcMat row of group
                                        rcMat[irowvh][jcolv])
                                            if (rcMat[i][jcolu] is not an element of
                                                group rcMat [irowuh][jcolu])
                                                set mc = mc +
                                                    rcMat[i][jcolv].emcSub
                                    if (mc < rcMat[irowvh][jcolv].twmcSub)
                                        set rcMat[irowvh][jcolv].twmcSub = mc
                                        set rcMat[irowvh][jcolv].twcRow = irowuh
                                        set rcMat[irowvh][jcolv].twcCol = jcolu
                                        set rcMat[irowvh][jcolv].twcsRow = irowcs
                                        set reCycle = TRUE
```

3. In Box 1205,

```
find the group pair that maximizes:
    rcMat[ia][j].gmvAdd − rcMat[is][j].twmcSub,
such that:
    • j ranges from 0 to nRes−1,
    • ia and is reference group heads in column j of rcMat,
    • the group-pair with the subtraction head at rcMat[is][j] and
        addition head at rcMat[ia][j] is not blocked
```

4. In Diamond 1207, test whether an allocation shift from group rcMat[is][j] to group rcMat[ia][j] is possibly worthwhile. If the answer is "Yes", proceed to Diamond 1209; if the answer is "No", proceed to Diamond 1221.

5. In Diamond 1209, test whether a transfer chain would have more than a single link. Specifically,

```
if (rcMat[is][j].twcCol = −1) then
    chain has only one link.
```

If transfer chain would have more than a single link, proceed to Box 1211; otherwise proceed to Box 1219.

6. In Box 1211, construct a chain for shifting allocations as follows:

```
set twpGroupSub[0] = address of rcMat[is][j]
set twpGroupAdd[0] = address of rcMat[ia][j]
   set twnLink = 1
   set xj = j
   set xis = is
   set xia = ia
   set crossOver = FALSE
   while (not crossOver and rcMat[xis][xj].twcCol not = -1)
      set xj = rcMat[xis][j].twcCol
      set xia = rcMat[xis][j].twcRow
      set xis = rcMat[xis][j].twcsRow
      set twpGroupSub[twnLink] = address of rcMat[xis][xj]
      set twpGroupAdd[twnLink] = address of rcMat[xia][xj]
      for (i = 0; i < twnLink; i++)
         if (twpGroupSub[i] = twpGroupSub[twnLink] or
            twpGroupSub[i] = twpGroupAdd[twnLink] or
            twpGroupAdd[i] = twpGroupSub[twnLink] or
            twpGroupAdd[i] = twpGroupAdd[twnLink])
               set crossOver = TRUE
      set twnLink = twnLink + 1
   set iSplitVer = -1
   set iSplitHor = -1
   if (crossOver)
      for (i = 0; i < twnLink - 1; i++)
      {
         if (twpGroupAdd[i] = twpGroupAdd[twnLink - 1])
            set twnLink = twnLink - 1
            goto endLoop1
         else if (twpGroupSub[i] = twpGroupSub[twnLink - 1])
            set iSplitVer = i
            goto endLoop1
         else if (twpGroupAdd[i] = twpGroupSub[twnLink - 1])
         {
            if (twpGroupSub[i] not = twpGroupAdd[twnLink - 1])
               twpGroupSub[twnLink - 1] = twpGroupSub[i]
               set iSplitVer = i
               goto endLoop1
            else
               set twnLink = twnLink - 1
               goto endLoop1
         }
         else if (twpGroupSub[i] = twpGroupAdd[twnLink - 1])
            set twnLink = twnLink - 1
            goto endLoop1
      }
      endLoop1:
      for (i = 0; i < twnLink-1; i++)
         if (exactly one of the following is true:
               CrossHAT(twpGroupSub[i])
               CrossHAT(twpGroupAdd[i+1]))
            goto Box 1217
         if (CrossHAT (twpGroupSub[twnLink-1]) and iSplitVer = -1)
         {
            for (i = 0; i < twnLink; i++)
               if (CrossHAT(twpGroupSub[i]))
               {
                  if (iSplitHor = -1)
                     set iSplitHor = i + 1
                  else
                     set twnLink = i + 1
                     goto endLoop2
               }
            goto Box 1217
         }
endLoop2:
```

Function definition:

```
CrossHAT(pointer group head (pGH))
   if (the group whose head is pointed to by pGH has an element in row
      rwiRow of rcMat)
      return TRUE
   else
      return FALSE
```

7. In Box 1213, determine quantities and shift allocations through the chain. This is shown in detail FIG. 13 and explained below.
8. In Diamond 1215, test whether the allocation shifts through the chain proved worthwhile. If the answer is "Yes", proceed to Box 1203; if the answer is "No", proceed to Box 1217.
9. In Box 1217, block the shift group-pair with a subtraction head at rcMat[is][j] and an addition head at rcMat[ia][j] (both group heads were determined in Box 1205) from further consideration.
10. In Box 1219, apply Box 705 (Axis-walk).
11. In Diamond 1221, test whether |d| has increased since any group-pair was blocked in Box 1217. If the answer is "Yes", proceed to Box 1201; if the answer is "No", return to calling routine.

Top-Walk Allocation Shift

Figure 13B:
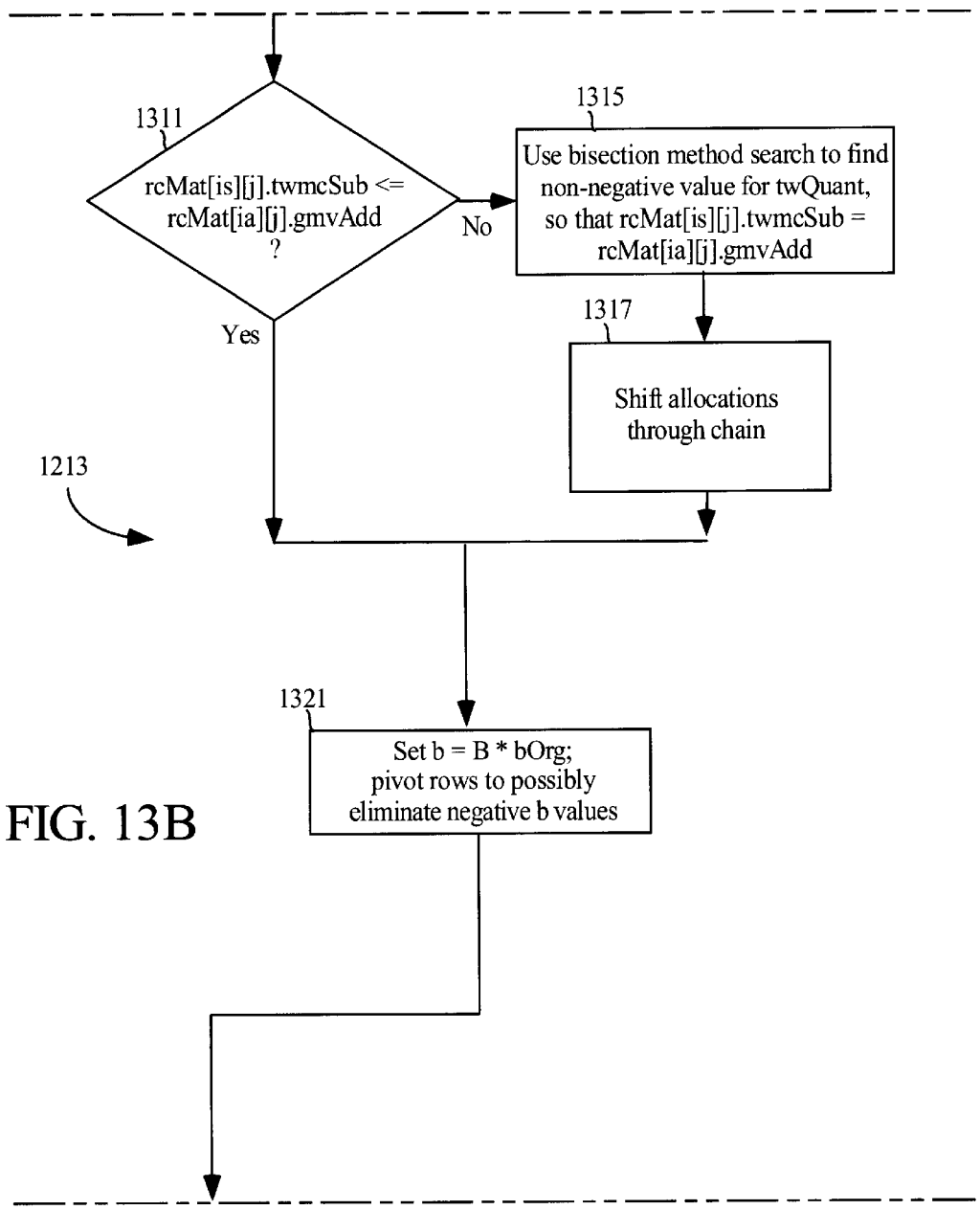
FIG. 13 is a combination of FIGS. 13A, 13B, and 13C, which shows the Top-Walk allocation shift in detail.
Figure 13C:
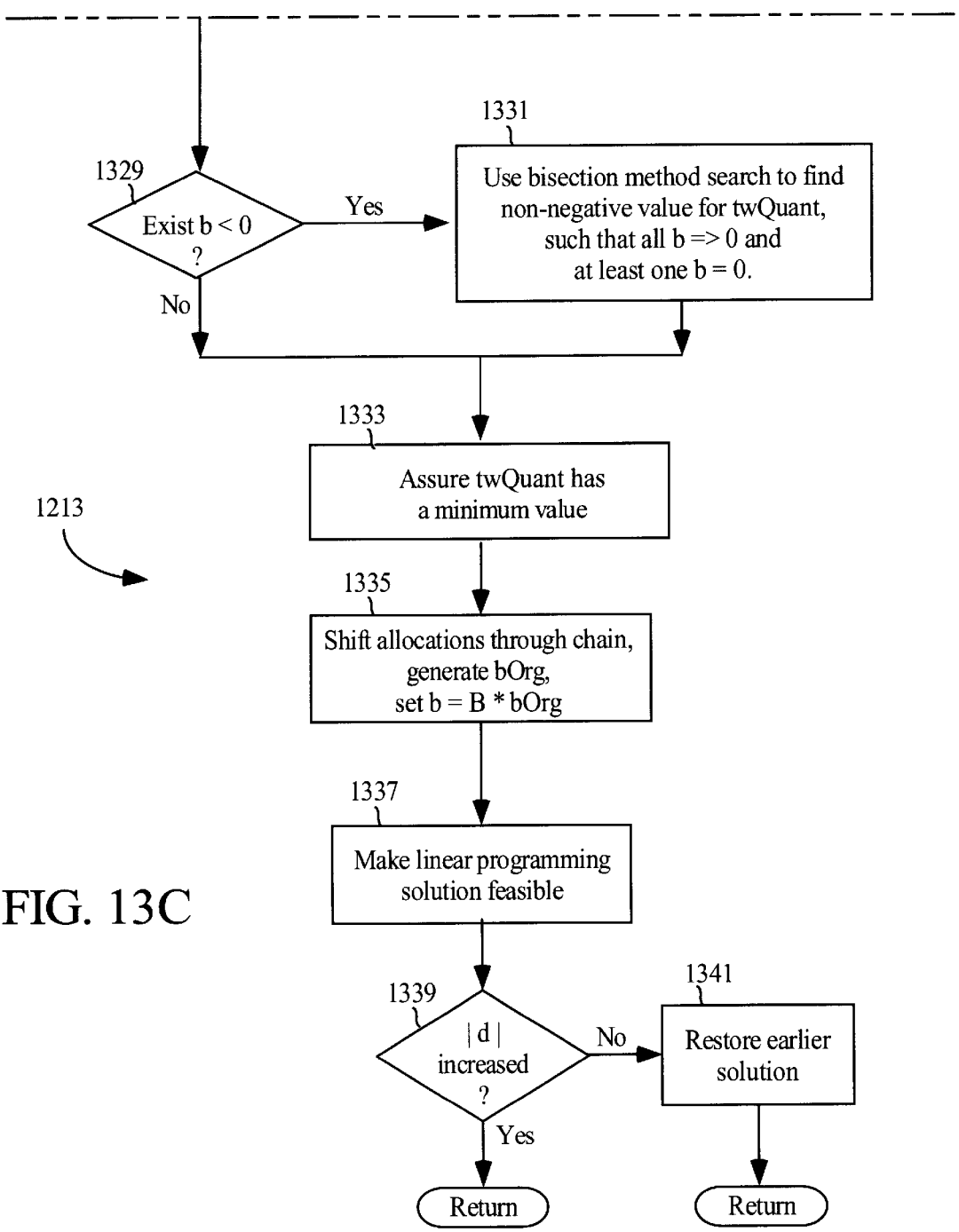

FIGS. 13A, 13B, and 13C show Box 1213 in detail:
1. In Box 1301, save the following to a temporary memory location that is specific to this Top-walk process:
   matrix a, vectors b and c, and scalar d
   matrix rcMat and all contained group head and group elements
   vectors bOrg and rowEffectiveness
2. In Box 1302,

```
set vector bHold = vector b
   for (i = 0; i < twnLink; i++)
      apply to group pointed to by twpGroupSub[i]
         set allocationHold = allocation
         set effectivenessHold = effectiveness
      apply to group pointed to by twpGroupAdd[i]
         set allocationHold = allocation
         set effectivenessHold = effectiveness
```

3. In Box 1303, set twQuant, the initial shift quantity:

```
set twQuant = twpGroupAdd[0]->maxAdd
for (i = 0; i < twnLink-1; i++)
   set twQuant = minimum (twQuant, twpGroupSub[i]->maxSub)
   set twQuant = TWufv( twpGroupAdd[i+1],
                        twpGroupAdd[i+1]->allocation,
                        twpGroupSub[i],
                        twpGroupSub[i]->allocation,
                        twQuant)
   set twQuant = minimum (twQuant, twpGroupAdd[i+1]->maxAdd)
set twQuant = minimum (twQuant, twpGroupSub[twnLink-1]->maxSub)
```

The following functions are used in Box 1303 and in other Boxes of the Top-walk process. TWufv accepts a quantity being shifted out of a group v and determines the compensating quantity to shift into a group u; TWvfu does the reverse. TWufvEpsilon is the same as TWufv, except the quantity being shifted out of group v, in the mathematical limit sense, is assumed to be an infinitesimally small unit of one, while the compensatory quantity shifted into group u is a multiple of the same infinitesimally small unit.

```
GenEffectiveness(pointerGroup, newAllocation)
   set net = pointerGroup->effectivenessHold
   set diff = newAllocation - pointerGroup->allocationHold
   if (0 < diff)
      set net = net + pointerGroup->dedaAdd * diff
   else
```

-continued

```
    set net = net + pointerGroup->dedaSub * diff
    return net
TWufv(pointerUGroup, uAllocation, pointerVGroup, vAllocation, shift)
    set ue = GenEffectiveness(pointerUGroup, uAllocation)
    set ud = pointerUGroup->dedaAdd
    set ve = GenEffectiveness(pointerVGroup, vAllocation)
    set vd = pointerVGroup->dedaSub
    set vi = vd * shift
    return (ue * vi/(ud * (ve − vi)))
TWvfu (pointerUGroup, uAllocation, pointerVGroup, vAllocation, shift)
    set ue = GenEffectiveness(pointerUGroup, uAllocation)
    set ud = pointerUGroup->dedaAdd
    set ve = GenEffectiveness(pointerVGroup, vAllocation)
    set vd = pointerVGroup->dedaSub
    set ui = ud * shift
    return (ve * ui/(vd * (ue + ui)))
TWufvEpsilon (pointerUGroup, uAllocation, pointerVGroup, vAllocation)
    set ue = GenEffectiveness(pointerUGroup, uAllocation)
    set ud = pointerUGroup->dedaAdd
    set ve = GenEffectiveness(pointerVGroup, vAllocation)
    set vd = pointerVGroup->dedaSub
    return (ue*vd/ud*ve)
TWvfuEpsilon (pointerUGroup, uAllocation, pointerVGroup, vAllocation)
    set ue = GenEffectiveness(pointerUGroup, uAllocation)
    set ud = pointerUGroup->dedaAdd
    set ve = GenEffectiveness(pointerVGroup, vAllocation)
    set vd = pointerVGroup->dedaSub
    return (ud*ve/ue*vd)
```

4. In Box 1305, shift allocations as follows:

```
set shift = twQuant
for (i = twnLink−1; 0 <= i; i−−)
    set twpGroupSub[i]->allocation =
        twpGroupSub[i]->allocationHold − shift
    if (i = iSplitVer)
        set shift = shift − twQuant
    set twpGroupAdd[i]->allocation =
        twpGroupAdd[i]->allocationHold + shift
    if (i = iSplitHor)
        set debt = TWufv(  twpGroupAdd[iSplitHor],
                           twpGroupAdd[iSplitHor]->allocation,
                           twpGroupSub[twnLink−1],
                           twpGroupSub[twnLink−1]->allocation,
                           twQuant)
        set shift = shift − debt
    else
        set debt = 0
    if (0 < i)
        set shift = TWvfu(  twpGroupAdd[i],
                            twpGroupAdd [i]− >allocationHold+debt,
                            twpGroupSub[i−1],
                            twpGroupSub[i−1]->allocationHold,
                            shift)
    generate group effectivenesses for the groups pointed to by
        twpGroupSub[i] and twpGroupAdd[i] by applying Box 909
regenerate vectors rowEffectiveness and bOrg by applying Box 911
```

5. In Box 1307, apply Box 1001 to generate group marginal values for each group pointed to by vectors twpGroupSub and twpGroupAdd. (Note that the linear programming problem and solution is the same as it was in Box 1301.)

6. In Box 1309, do the following to determine rcMat[is][j].twmcSub, given the shifts done in Box 1305:

```
set mc = twpGroupSub[twnLink−1]->gmcSub
set shift = 1.0 //(infinitesimal unit)
for (i = twnLink−1; 1 <= i; i−−)
    set jj = rcMat column of group pointed to by twpGroupAdd[i]
    for (ii = each rcMat row of group pointed to by twpGroupAdd[i])
```

```
        if (group pointed to by twpGroupSub[i−1] does not have group
                element in row ii of rcMat)
            set mc = mc − rcMat[ii][jj].emvAdd * shift
    if (i = iSplitVer)
        set shift = shift − 1.0
    if (i = iSplitHor)
        set debt = TWufvEpsilon(  twpGroupAdd[iSplitHor],
                                   twpGroupAdd[iSplitHor]->allocation,
                                   twpGroupSub[twnLink−1],
                                   twpGroupSub[twnLink−1]->allocation)
        set shift = shift − debt
    set shift = shift * TWufvEpsilon(  twpGroupAdd[i],
                                        twpGroupAdd[i]->allocation,
                                        twpGroupSub[i−1],
                                        twpGroupSub[i−1]->allocation)
    set jj = rcMat column of group pointed to by twpGroupSub[i−1]
    for (ii = each rcMat row of group pointed to by twpGroupSub[i−1])
        if (group pointed to by twpGroupAdd[i] does not have group
                element in row ii of rcMat)
            set mc = mc + rcMat[ii][jj].emcSub * shift
set rcMat[is][jj].twmcSub = mc
```

7. In Diamond 1311, test whether the shifting done in Box 1305 is marginally worthwhile, i.e., whether, rcMat[is][j].twmcSub<=rcMat[ia][j].gmvAdd. If the answer is "Yes", proceed to Box 1321; if the answer is "No", proceed to Box 1315.

8. In Box 1315, use bisection method search to find a new value for twQuant so that:

it is between 0 and the values set in Box 1303 and after reapplying Boxes 1305, 1307, and 1309 the following condition is met:

rcMat[is][j]. twmcSub=rcMat[ia][j].gmvAdd

9. In Box 1317, apply Box 1305.

10. In Box 1321, apply Box 1151 to generate vector b.

11. In Diamond 1329, test whether any element of vector b is less than an infinitesimal negative value. If the answer is "Yes", proceed to Box 1331; if the answer is "No", proceed to Box 1333.

12. In Box 1331, use bisection method search to find a new value for twQuant, so that:

it is between 0 and the smaller of the values as set in Boxes 1303 and 1315.

after reapplying Box 1317 and setting b=B*bOrg, the smallest element in vector b is 0 or infinitesimally smaller than 0.

14. In Box 1333,

```
if (twQuant < twQuantMin)
    set twQuant = minimum of twQuantMin and twQuant as set in
        Box 1303
```

15. In Box 1335, apply Box 1305 using the current twQuant and set b=B*bOrg.

16. In Box 1337, make the current linear programming solution feasible, by, for instance, applying the well known Dual Simplex Method.

17. In Diamond 1339, test whether |d| has increased since it was saved in Box 1301. If the answer is "Yes", return to calling routine; if the answer is "No", proceed to Box 1341.

18. In Box 1341, restore the earlier solution by restoring the data saved in Box 1301.

Lateral-Walk Process

Figure 14:
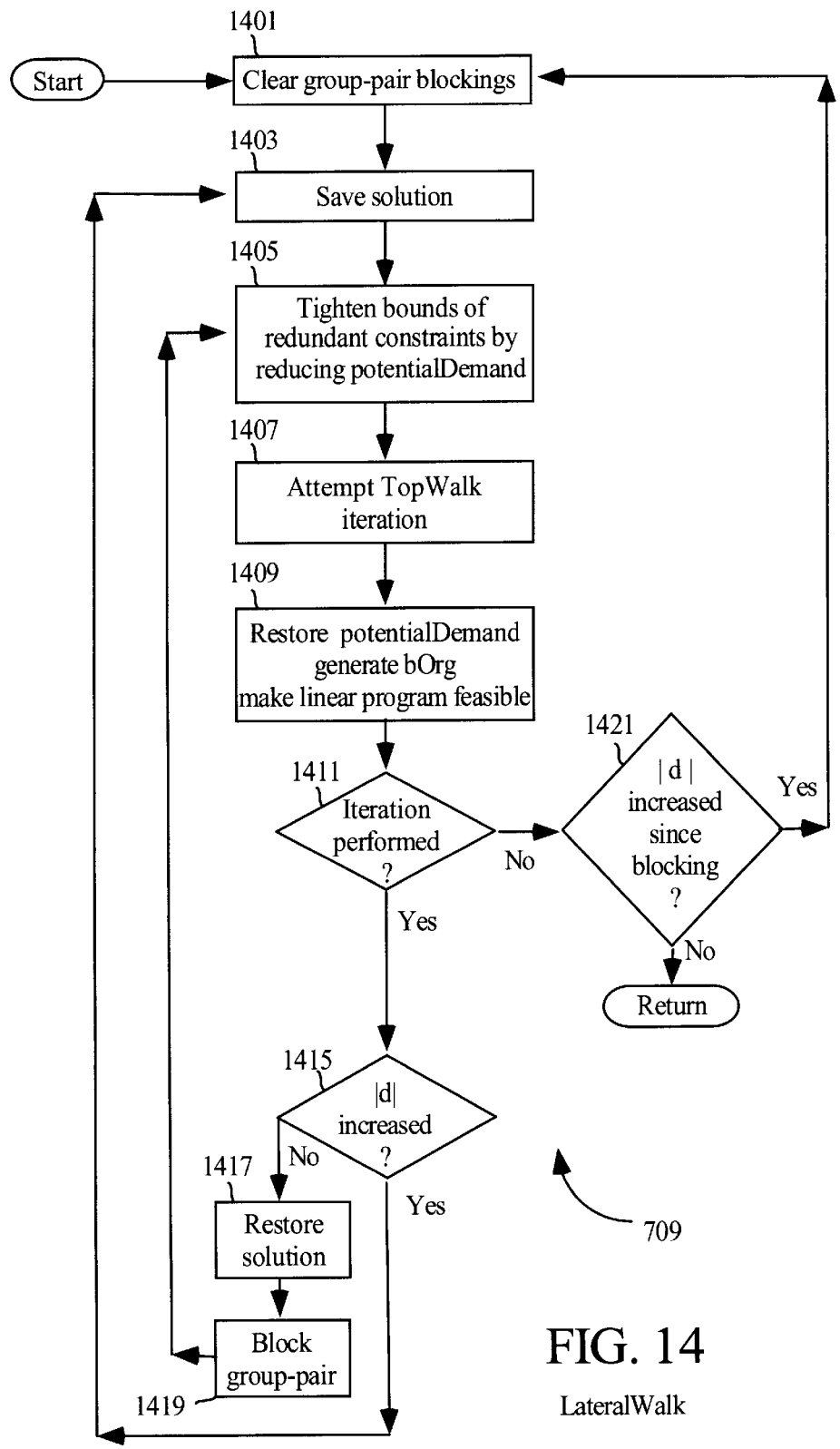
FIG. 14 shows the Lateral-walk process.

Lateral-walk process 709 uses facReduce as a programmer-set tolerance, which needs to be slightly less than 1.0. The closer facReduce is to 1.0, the more accurate the solution, but the more CPU cycles required. Like the Top-walk process, the Lateral-walk process tracks which group-pair shifts proved undesirable and then avoids repeat consideration of such shifts. Process 709 is shown in detail in FIG. 14 and entails the following steps:

1. In Box 1401, clear all group-pair blockings.
2. In Box 1403, apply Box 1301, but use storage that is specific to this Lateral-walk process.
   Also make a copy of vector potentialDemand.
3. In Box 1405,

```
for (i = 0; i < m; i++)
   set limitLoop = a positive integer limit value
   while (b[i] = 0 and 0 < limitLoop and
      (exists j and jj such that
         B[i][j] not = 0
         B[i][jj] not = 0
         j not = jj))
      {
      set potentialDemand[i] = potentialDemand[i] * facReduce
      apply Box 911
      set b = b * bOrg
      apply box 1337
      set limitLoop = limitLoop - 1
      }
```

4. In Box 1407, apply Boxes 1203, 1205, 1207, 1209, 1211, 1213, and 1219. Exit before applying Boxes 1215 and 1221. When doing Box 1205, respect any pair-blocking done in Box 1419. When doing Box 1213, skip Diamond 1339 and Box 1341. Immediately exit Box 1219, after doing Box 1007.
5. In Box 1409, restore vector potentialDemand that was stored in Box 1403. Also

```
apply Box 911
set b = B * bOrg
apply box 1337
```

6. In Diamond 1411, test whether a Top-walk allocation shift was done in Box 1407 i.e., if the answer to the condition of Diamond 1207 was "Yes." If the answer is "Yes", proceed to Diamond 1415; if the answer is "No", proceed to Diamond 1421.
7. In Diamond 1415, test whether $|d|$ increased from its value saved in Box 1403. If the answer is "Yes", proceed to Box 1403; if the answer is "No", proceed to Box 1417.
8. In Box 1417, restore the solution saved in Box 1403.
9. In Box 1419, block the group-pair with group heads at rcMat[is ][j] and rcMat[ia][j] (as determined in Boxes 1407 and 1205) from further consideration.
10. In Diamond 1421, test whether $|d|$ has increased since any group-pair was blocked in Box 1419. If the answer is "Yes", proceed to Box 1401; if the answer is "No", return to calling routine.

Ridge-Walk Process

Ridge-walk process 711 uses three programmer-set tolerances: rwATLrefresh, rwShiftMin, and rwShiftMax. These tolerances need to be positive. Once the increase in rowEffectiveness is greater than rwATLrefresh, the Axis-walk, Top-walk, and Lateral-walk processes are called. Tolerances rwShiftMin and rwShiftMax, with rwShiftMin<= rwShiftMax, determine the minimum and maximum allocation shift per iteration. The smaller each of these three tolerances, the more accurate the solution, but the more CPU cycles required.

Figure 15A:
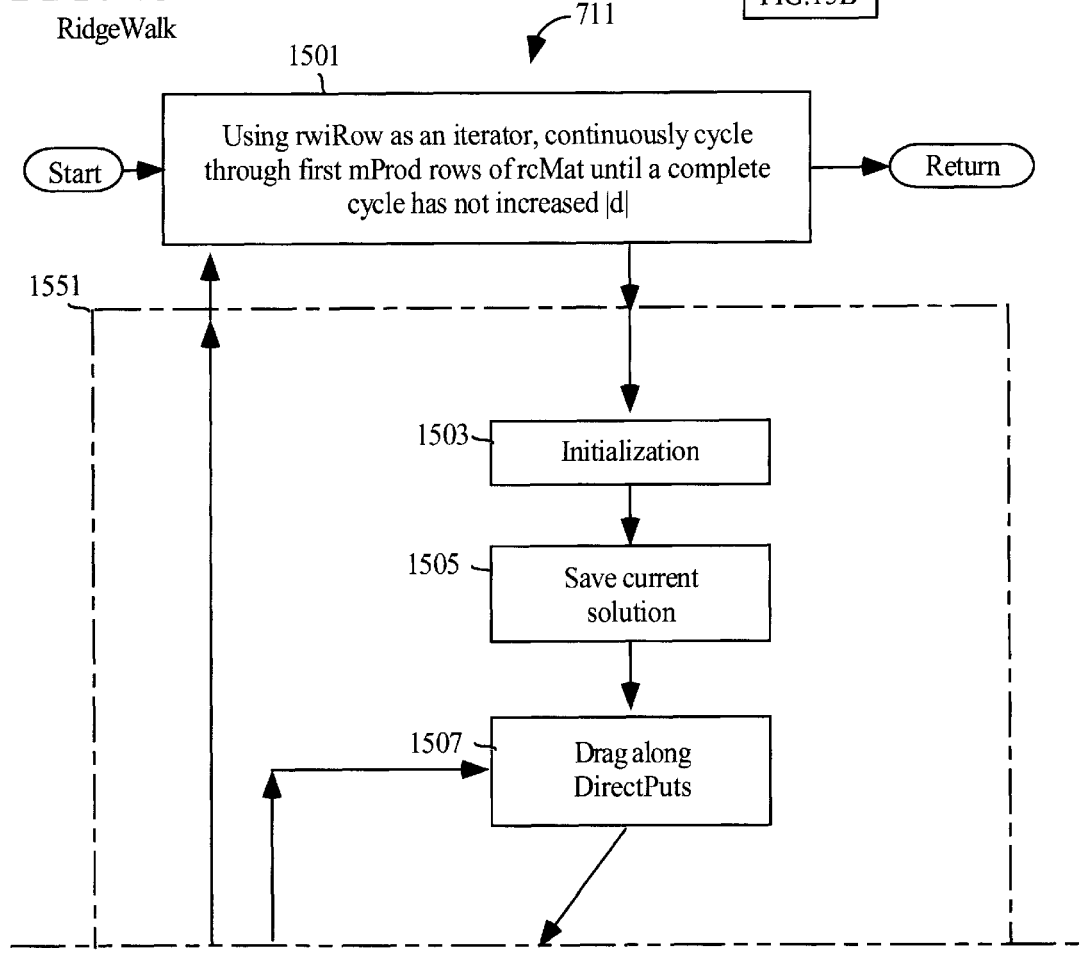
FIG. 15 is a combination of FIGS. 15A and 15B, which shows the Ridge-walk process.
Figure 15B:
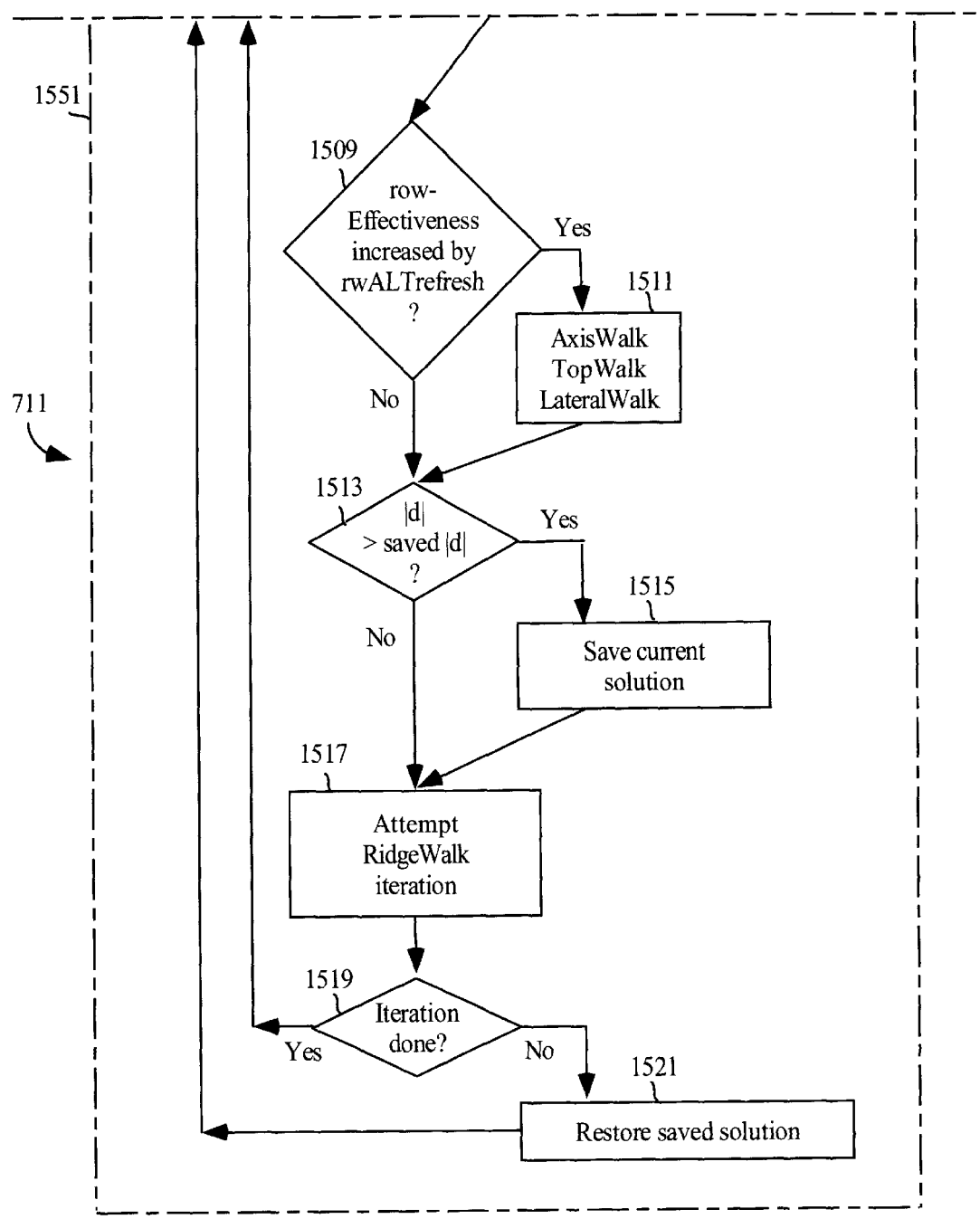

Ridge-walk process 711 is shown in detail in FIGS. 15A and 15B and entails the following steps:

1. In Box 1501, use rwiRow as an iterator to continually cycle through the first mProd rows of rcMat. Continue until a complete cycle has not resulted in any increase in $|d|$. Specifically:

```
set rwiRow = 0
set count = 0
do
   {
   set dHold = |d|
   apply Box 1551
   if (|d| > dHold)
      set count = 1
   else
      set count = count + 1
   set rwiRow = rwiRow + 1
   if (rwiRow = mProd)
      set rwiRow = 0
   }
while (count not = mProd)
set rwiRow = -1
```

2. In Box 1503,

```
set all elements of vector dpTieSubBlk = FALSE
set baseRowEffectiveness = - BIG_M
```

3. In Box 1505, apply Box 1301, but use storage that is specific to this Ridge-walk process.
4. In Box 1507, drag along Direct-puts: shift group allocations between the groups of row rwiRow and its Direct-put groups in order to relieve constraints on product rwiRow.
   Specifically,

```
for (j = 0; j < nRes; j++)
   if (dpTie[rwiRow][j] not = -1)
      if (rcMat[rwiRow][j] is not empty)
         set iRW = row of group head of the group that has an element at
            rcMat[rwiRow][j]
      else
         set iRW = -1
      set iDP = dpTie[rwiRow][j]
      set qtRW = bOrg[rwiRow]
      set qtDP = (bOrg[iDP]) /(the value of a[iDP][m + rwiRow] as
         originally set in Box 913)
      while (qtDP > qtRW)
         apply Box 1001 to all groups in column j of rcMat
         ia = iDP
         is = index of group head in column j of rcMat that has the smallest
            gmcSub but is not equal to iDP
         if (rcMat[is][j].gmcSub = BIG_M)
            break out of while loop
         set awQuant = minimum( rcMat[ia][j].maxAdd,
                                 rcMat[is][j].maxSub,
                                 rwShiftMin)
         apply Boxes 1101, 1105, 1107, 1109, 1111, and 1337
         if (is = iRW)
            set dpTieSubBlk[j] = TRUE
         set qtRW = bOrg[rwiRow]
         set qtDP = bOrg[iDP] / (the value of a[iDP][m + rwiRow] as
            originally set in Box 913)
      if (iRW not = -1)
```

-continued

```
    set is = iDP
    set ia = iRW
    do
        apply Box 1001 to groups rcMat[is][j] and rcMat[ia][j]
        if (Diamond 1005 is TRUE)
            apply Box 1007
    while (Diamond 1005 is TRUE)
```

5. In Diamond 1509, test whether rowEffectiveness [rwiRow] exceeds baseRowEffectiveness plus rwATLrefresh. If the answer is "Yes", proceed to Box 1511; if the answer is "No", proceed to Diamond 1513.
6. In Box 1511,

```
for (j = 0; j < nRes; j++)
    if (rcMat[rwiRow][j] is not empty)
        set rcMat[rwiRow][j].subBlk = TRUE
    if (dpTie[rwiRow][j] not = -1)
        set rcMat[dpTie[rwiRow][j]][j].subBlk = TRUE
apply the following:
    Axis-walk (Box 705)
    Top-walk (Box 707)
    Lateral-walk (Box 709)
for (j = 0; j < nRes; j++)
    if (rcMat[rwiRow][j] is not empty)
        set rcMat[rwiRow][j].subBlk = FALSE
    if (dpTie[rwiRow][j] not = -1)
        set rcMat[dpTie[rwiRow][j]][j].subBlk = FALSE
set baseRowEffectiveness = rowEffectiveness[rwiRow]
```

7. In Diamond 1513, test whether |d| is greater than the last value of |d| stored in Box 1505 or 1515. If the answer is "Yes", proceed to Box 1515; if the answer is "No", proceed to Box 1517.
8. In Box 1515, apply Box 1505.
9. In Box 1517, attempt Ridge-walk iteration, which is explained in detail below.
10. In Diamond 1519, test whether a Ridge-walk iteration was done in Box 1517. If the answer is "Yes", proceed to Box 1507; if the answer is "No", proceed to Box 1521.
11. In Box 1521, restore the solution last saved in Boxes 1505 and 1515.

Ridge-Walk Iteration

Ridge-walk iteration 1517 is shown in detail in FIGS. 16A and 16B.

1. In Box 1601,

```
set applied1007 = FALSE
set all elements of rwpDest and rwpSour equal to NULL
for (j = 0; j < nRes; j++)
    set loopRepeat = TRUE
    while (loopRepeat and exist group element at rcMat[rwiRow][j])
        set loopRepeat = FALSE
        set rwpDest[j] = address of group head of the group having an
            element at rc[rwiRow][j]
        if (rwpDest[j]->ir = rwpDest[j]->nir)
            exit while loop
        apply Box 1001
        Attempt to find group head in column j such that:
            • gmcSub is minimized
            • the group head is not pointed to by rwpDest[j]
            • the group head has an allocation greater than 0
            • if dpTieSubBlk[j] is TRUE, then the group is not
              rcMat[dpTie[rwiRow][j]][j]
        if (group head is found)
        {
            set rwpSour[j] = address of found group head
```

```
            if (rwpSour[j]->gmcSub > rwpDest[j]->gmvAdd)
                set ia = row of group head rwpDest[j]
                set is = row of group head rwpSour[j]
                apply Box 1007
                set applied1007 = TRUE
                set loopRepeat = TRUE
        }
        else
            set rwpSour[j] = NULL
    if (applied1007)
        goto Box 1507, i.e. exit FIG. 16 and assume an iteration
```

2. In Diamond 1603, test whether there exists a jj, such that both rwpDest[jj] and rwpSour[j] are not NULL. If the answer is "Yes", proceed to Box 1605; if the answer is "No", return to calling routine. If such a jj exists, then a Ridge-walk iteration is possible. The iteration will simultaneously apply to each non-null rwpDest[jj]-rwpSour[jj] pair. (To facilitate exposition, all elements of vectors rwpDest and rwpSour will be assumed to be non NULL.)
3. In Box 1605,

```
for (each group head pointed to by vectors rwpDest and rwpDest)
    set allocationHold = allocation
```

4. In Box 1607,

```
set vector bHold = vector b
for (j = 0; j < nRes; j++)
    set rwOldAlloc[j] =
        rwpDest[j]->effectiveness / rwpDest[j]->dedaAdd
    set rwOldMC[j] = rwpSour[j]->gmcSub
```

5. In Box 1609,

```
set rwParaMin = BIG_M
set rwParaMax = BIG_M
for(j = 0; j < nRes; j++)
    set min = minimum (   rwpDest[j]->maxAdd,
                          rwpSour[j]->maxSub,
                          rwShiftMin)
    set min = (min + rwOldAlloc[j]) * rwOldMC[j]
    set rwParaMin = minimum(min, rwParaMin)
    set max = minimum (   rwpDest[j]->maxAdd,
                          rwpSour[j]->maxSub,
                          rwShiftMax)
    set max = (max + rwOldAlloc[j]) * rwOldMC[j]
    set rwParaMax = minimum (max, rwParaMax)
    set rwParameter = rwParaMax
```

6. In Box 1611,

```
for (j = 0; j < nRes; j++)
    set shift = rwParameter/rwOldMC[j]- rwOldAlloc[j]
    if (shift < 0)
        set shift = 0
    set rwpSour[j]->allocation =
        rwpSour[j]->allocationHold - shift
    set rwpDest[j]->allocation =
        rwpDest[j]->allocationHold + shift
apply Box 909 to groups pointed to by vectors rwpSour and rwpDest
```

7. In Box 1613, generate bOrg by applying Box 911.
8. In Box 1621, apply Box 1321.

9. In Diamond 1623, test whether any element of vector b is less than an infinitesimal negative value. If the answer is "Yes", proceed to Box 1625; if the answer is "No", proceed to Box 1627.
10. In Box 1625, use bisection method search to find a new value for rwParameter, so that:
    it is between 0 and rwParaMax
    after applying Boxes 1611 and 1613, and setting b=B*bOrg, the smallest element in vector b is 0 or infinitesimally smaller than 0.
11. In Box 1627,

```
if (rwParameter < rwParaMin)
    set rwParameter = rwParaMin
```

12. In Box 1629, apply Boxes 1611 and 1613 using the current rwParameter and set b=B*bOrg.
13. In Box 1631, as in Box 1337, make the current linear programming solution feasible.

Finalization

Figure 17:
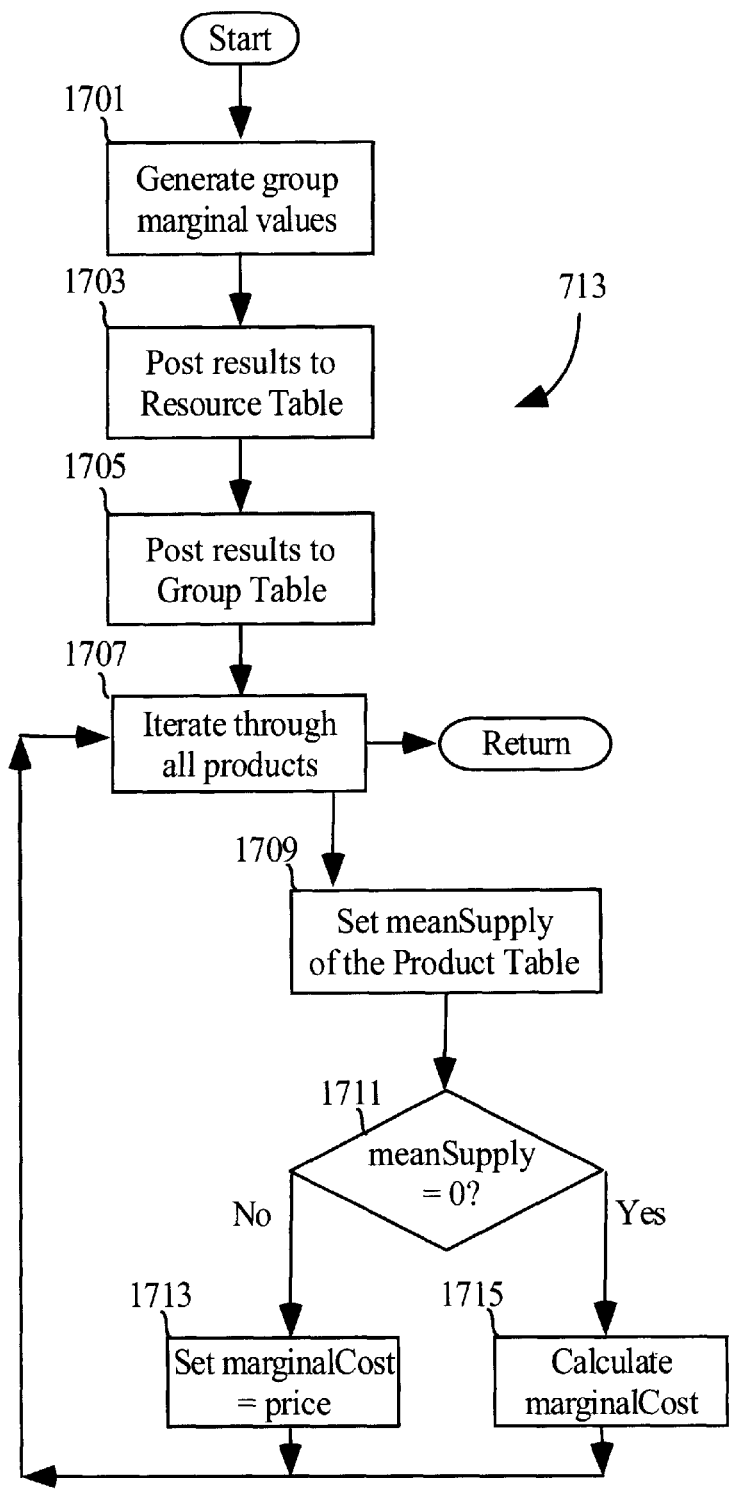
FIG. 17 shows the basic finalization process.

The finalization process of posting the results to the database (process 713) is shown in FIG. 17 and entails:
1. In Box 1701, generate marginal values by applying Box 1001.
2. InBox 1703,

```
for (j = 0; j < nRes; j++)
do
    set is = index of group head in column j of rcMat that has the
        smallest gmcSub, such that is < mProd
    if (rcMat[is][j].gmcSub = 0)
        set ia = mProd + j
        apply Box 1007, then Box 1001
    while (rcMat[is][j].gmcSub = 0)
    set meanUse field in Database 101 Resource Table = (sum of the
        allocations to all the group heads in column j and rows 0 through
        row mProd-1 of rcMat) + (the quantity of the resource in row
        (mProd + j) of matrix a and vector b allocated by the LPP)
    set marginalValue = the minimum value of gmcSub contained in all the
        group heads in column j of rcMat
```

3. In Box 1705,

```
for (each group head in the first mProd rows of rcMat)
    set i = group-head rcMat row
    set j = group-head rcMat column
    Locate the row in the Group Table that corresponds to group head
        rcMat[i][j]; i.e., back trace to the original row used in Box 903
    set the meanAlloc field in the Group Table row =
        rcMat[i][j].allocation
    set the marginalValue field in the Group Table row =
        rcMat[i][j].gmcSub
```

4. In Box 1707,

```
for (iProd = 0; iProd < mProd; iProd++)
    apply Boxes 1709 through 1715 to generate data for the Product Table
```

5. In Box 1709, for row iProd of the Product Table, apply prior-art linear programming methods to set meanSupply equal to quantity of iProd produced.
6. In Diamond 1711, test whether meanSupply as set in Box 1709 equals 0. If the answer is "Yes", proceed to Box 1715; if the answer is "No", proceed to Box 1713.
7. In Box 1713, set marginalCost=price.
8. In Box 1715,

```
set mmc = 0
set rwiRow = iProd
if (bOrg[iProd] < 1.0)
    apply Box 1301, but use storage specific to this Box
    apply Box 1601, but without branching to Box 1507
    apply Diamond 1603
    if (iteration not possible as per Diamond 1603)
        set marginalCost (of row iProd of Product Table) = infinity
        exit this Box
    apply Boxes 1605 and 1607
    set rwParaMin = 0
    set rwParaMax = BIG_M
    set rwParameter = BIG_M
    Use bisection search method to find rwParameter value so that, after
        applying Boxes 1611 and 1613, bOrg[iProd] equals 1. If this is not
        possible, continue with bisection to find rwParameter that
        maximizes bOrg[iProd].
    for (j = 0; j < nRes; j++)
        set mmc = mmc + (rwpDest[j]->allocation -
                rwpDest[j]->allocationHold) *
                (rwOldMC[j]- (rwpDest[j]->gmvAdd -
                rcMat[iProd][j].emvAdd))
                //if rcMat[iProd][j] is empty, assume
                //rcMat[iProd][j].emvAdd = 0
    if (bOrg[iProd = 0)
        set marginalCost (of row iProd of Product Table) = infinity
        exit this Box
    set mmc = mmc / bOrg[iProd]
    apply Box 1341, but use storage specific to the Box
Join the Resource and unitReq Tables using resourceName for the join-key
    and only include rows of the UnitReq Table that correspond to product
    iProd.
for (each row of the joined table)
    set mmc = mmc + marginalValue * reqQt
set marginalCost (of iProd in Product Table) = mmc + sumWICash[iProd]
set rwiRow = -1
```

DETAILED DESCRIPTION PREFERRED EMBODIMENT

The preferred embodiment builds upon the previously described basic embodiment and makes possible all the previously described objects and advantages. It entails enhancements to the database, handling of cash related resources, Monte Carlo simulation, operation under a GUI (Graphical User Interface), optimization controls, and generating supply and demand schedules that facilitate analysis.

When Monte Carlo simulation is done, the following, which is here termed a scenario, is repeated: potentialDemand values are randomly drawn from user-defined statistical distributions, optimized allocations are made, and the results noted. A set of scenarios constitutes what is here termed a simulation. Once a simulation is finished, mean noted-scenario-results are written to the database. Unfulfilled potentialDemand of one scenario is possibly passed on to the next. Each scenario is fundamentally a possibility for the same period of consideration, e.g., the upcoming month. Implicitly, a steady stochastic state is being presumed for the period of consideration. (For purposes of the present invention's making direct allocations as described in the Theory of the Invention Section, a simulation is done with only one scenario; if non-single-point statistical distributions are specified for potentialDemand, then mean values are used for the single scenario.)

A Base simulation is the basic simulation done to allocate resources and determine marginal costs/values. A Supply simulation generates the schedule between product price and optimal mean supply quantity. Similarly, a Demand simulation generates the schedule between external resource price and optimal quantities.

To facilitate exposition, programming objects are utilized. These are the objects of object-oriented programming, and conceptually consists of a self-contained body of data and executable code.

Database

The preferred embodiment database has two additional tables: Distribution and Results Tables. All the previous five tables have additional fields.

Distribution Table

The Distribution Table is in effect a user-defined library of statistical distributions that can be used to express Potential-demand as a statistical distribution. This table has the following fields, one of which is a programming object. Those marked with asterisks (*) are determined by the present invention:

distName—user defined name; table key.

distType—type of distribution, e.g., normal, uniform, Poisson, single-value, etc.

distObject—a programming object that:
1. accepts and displays distribution parameters, (for example, for a normal distribution, the mean and standard deviation).
2. draws a graph of the specified distribution.
3. generates random values drawn from the specified distribution.
4. generates mean expected values (for direct allocations).

meanGen*—the mean of generated random values for the last executed Base simulation.

marginalvalue*—the mean marginal value of the potentialDemand(s) generated by distObject.

Resource Table

The Resource Table has the following additional fields, each of which is set by the user:

unit—e.g., liter, hour, etc.

availability—either "fixed" or "buyable."

WTMD—wear-and-tear market depreciation. This is the market-value depreciation resulting from using the resource. It is different from, and in contrast to, depreciation occurring solely because of the passage of time.

payPrice—the full cash price that needs to be paid to obtain a buyable resource.

demandObject*—an object that shows a demand (marginal value) schedule and associated data.

If availability is "fixed", then WTMD is applicable and payPrice is not applicable. Conversely, if availability is "buyable," then WTMD is not applicable and payPrice is applicable. WI-cash needs to be included as a resource in the Resource Table. Its quantity is the amount of cash that is available to finance buyable resources.

Group Table

The Group Table has two additional fields. The fixedAlloc field indicates whether the user wishes to manually set a group allocation. If "Yes" is specified, then a fixed allocation quantity needs to be specified in the second field, fxAlQt. If such a manual setting is done, then the initialization process sets the allocation to fxAlQt and the allocation is not changed by the Axis-walk, Top-walk, Lateral-walk, or Ridge-walk processes.

Product Table

The Product Table has the following additional fields. Those marked with asterisks (*) are determined by the present invention:

fillValue—the value to the organization above and beyond the price paid for the product:
  For governments and non-profits, it is the estimated societal value of providing a unit of product (service), minus the price, if any, paid. It, plus any paid price, is a monetary, quantitative measurement of a fulfilling an organization's mission by providing a unit of product. It can be estimated subjectively or by using the techniques of welfare economics.
  For commercial concerns, it is the expected value received beyond the paid price. This would be typically used for new products, when initially building market-share and market-size is of predominate importance. It is the value to the organization of getting customers to buy the product, besides and in addition to, the actual price paid.

fill Value can also include the value to the organization of being able to supply a product in order to maintain its reputation as a reliable supplier.

distName—the statistical distribution to be used to generate potentialDemand values. Joins with field of the same name in the Distribution Table.

distPercent—the percent of the generated random value, from the statistical distribution, that should be used as potentialDemand.

carryOver—the percentage of unfulfilled potentialDemand that carries over from one scenario to the next.

meanPotentialDemand*—mean scenario potentialDemand for the most recent Base simulation.

supplyObject*—an object that shows a supply (marginal cost) schedule, an average opportunity cost schedule, and associated data.

The fields distName, distPercent and carryOver replace the earlier potentialDemand field of the Product Table. They are used to generate the previously discussed potentialDemand vector.

UnitReq Table

The UnitReq Table has an additional field named periodsToCash, which is set by the user. This is the number of time periods between purchasing the resource and receiving payment for the product. This field is only applicable for resources whose availability is "buyable."

Results Table

The Results Table has fields for both accepting user-defined parameters and reporting optimization results. The latter type fields are marked below with asterisks (*) and are means of scenario results for Base simulations. Not listed, but following each field marked with an exclamation point (!), is a field that contains the standard errors of the marked field:

Sequence—table key.

Internal Producer's Surplus*!—previously explained.

Change in WI-cash*!—mean of scenario-aggregate change in WI-cash.

WI-cash—start amount for each scenario; same as a availQuant for WI-cash in Resource Table.

Marginal Value of WI-cash*!—mean of scenario-aggregate marginal values of WI-cash; same as a marginal value for WI-cash in Resource Table.

Sum Fill Value*!—mean of scenario-aggregate fillValues.

Sum WTMD*!—mean of scenario-aggregate WTMD.

Allocation—either "Direct" or "Indirect."

Maximization Type—either "IPS" or "WI-cash."

WI-cash Type—either "Spread-out" or "Fold-in." Spread-out signifies that WI-cash need only finance the current period's buyable resources for the current period, i.e., the financing is spread over multiple periods and no concern about future financing is warranted. Fold-in signifies that WI-cash needs to finance the total current period's expenditure for buyable resources, i.e., all current and future financing is folded-into the current period, which WI-cash needs to cover.

Rand Seed—random number generator seed.

N Sample—number of scenarios per simulation.

MC/MV Display—either:
- "Partial"—meaning that simple marginal costs (gmcSub) should be used for reporting.
- "Infinite Series"—meaning that Top-walk marginal costs (twmcSub) should be used for reporting.
- "Quantum"—meaning that the process used to generate supply and demand schedules should be used to determine marginal costs and marginal values used for reporting.

Max Base RW Iterations—times mProd is maximum number of times Basic-Ridge-walk-Iteration 1551 should be executed per base scenario.

Max Base RW Time—maximum time that should be spent in Basic-Ridge-walk-Iteration 1551 per base scenario.

Max S/D RW Iterations—times mProd is maximum number of times Basic-Ridge-walk-Iteration 1551 should be executed per supply and demand scenario.

Max S/D RW Time—maximum time that should be spent in Basic-Ridge-walk-Iteration 1551 per supply and demand scenario.

The Sequence field enumerates the rows of the Results Table, with the first row having a Sequence value of 0. Each time a Base simulation is done, all the positive Sequence values are incremented by 1; the row with a Sequence value of 0 is duplicated, the simulation results are stored in this duplicate row, its Sequence value is set to 1.

Graphical User Interface

The preferred GUI embodiment has four windows: Distributions, Resources, Products, and Results. These windows show all database data, which the user can view and edit. The statistical distributions, allocations-to-effectiveness functions, and supply and demands schedule are shown both tabularly and graphically. The data the user enters and edits is in a foreground/background color combination that differs from the foreground/background color combination of the data determined by the present invention.

These windows have state-of-the-art editing and viewing capabilities, including (without limitation) cutting-and-pasting, hiding and unhiding rows and columns, font and color changing etc. Such generic windows and generic capabilities are common for: 1) a personal computer, such as the Apple Macintosh and the systems running Microsoft Windows, and 2) computer work stations, such as those manufactured by Digital Equipment Corp., Sun Micro Systems, Hewlett-Packard, and the International Business Machines Corp.

The Distribution Table is shown in its own window. An example of such window, with column titles and sample data rows, is shown in FIG. 18. (The small triangle in the figure is to adjust the bottom of the graph.)

Figure 19B:
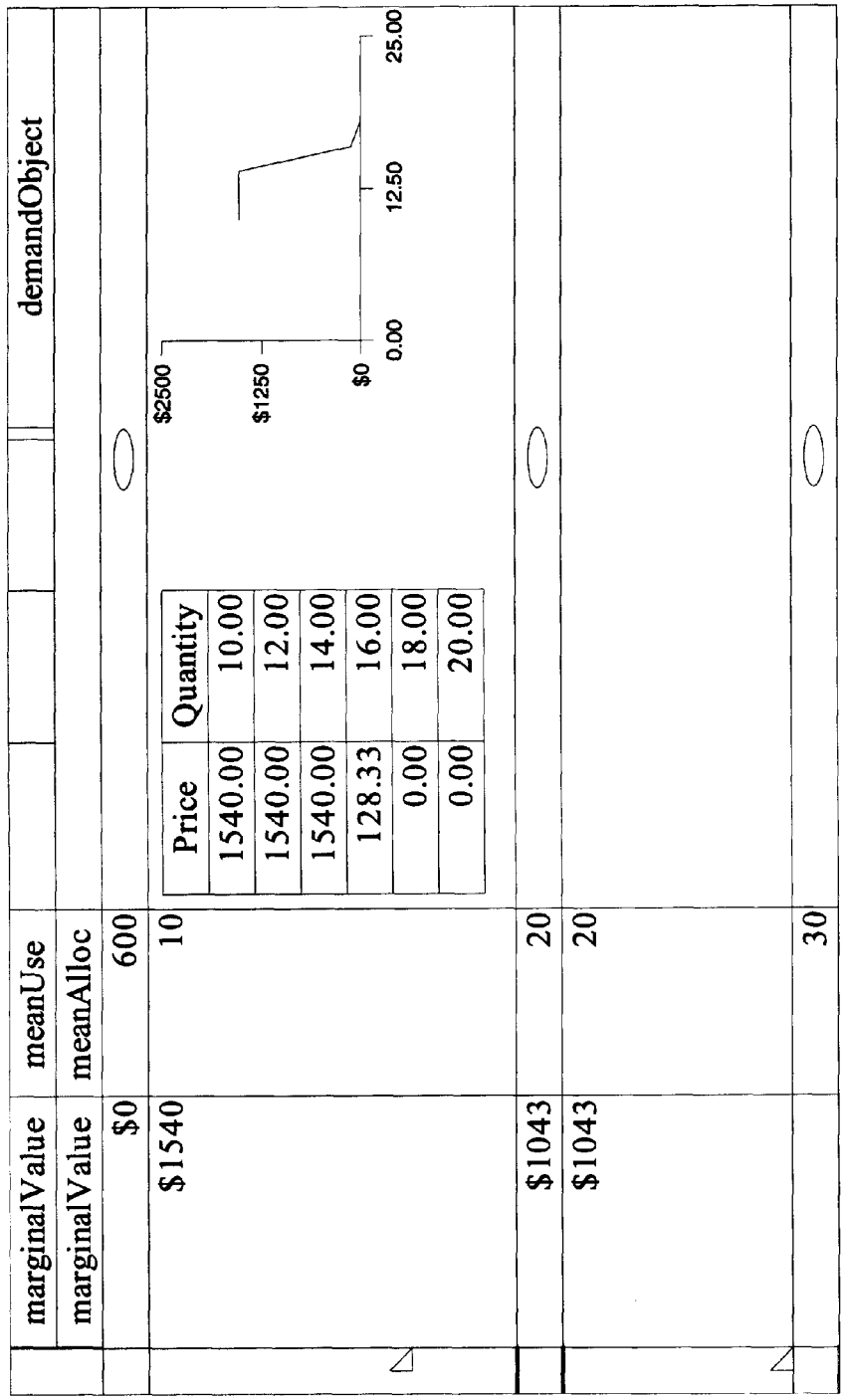
FIG. 19 is a combination of FIGS. 19A and 19B, which shows the top portion of the GUI resources window.

The Resource and Group Tables are shown in their own window, with groups defined below the resources they use. An example of such a window with the first few rows is shown in FIGS. 19A and 19B. (The empty oval signifies the compression of an empty table and graph; a solid oval signifies the compression of a table and graph containing data).

Figures 20, 20A:
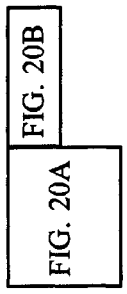
FIG. 20 is a combination of FIGS. 20A and 20B, which shows the top portion of the GUI products window.
Figure 20B:
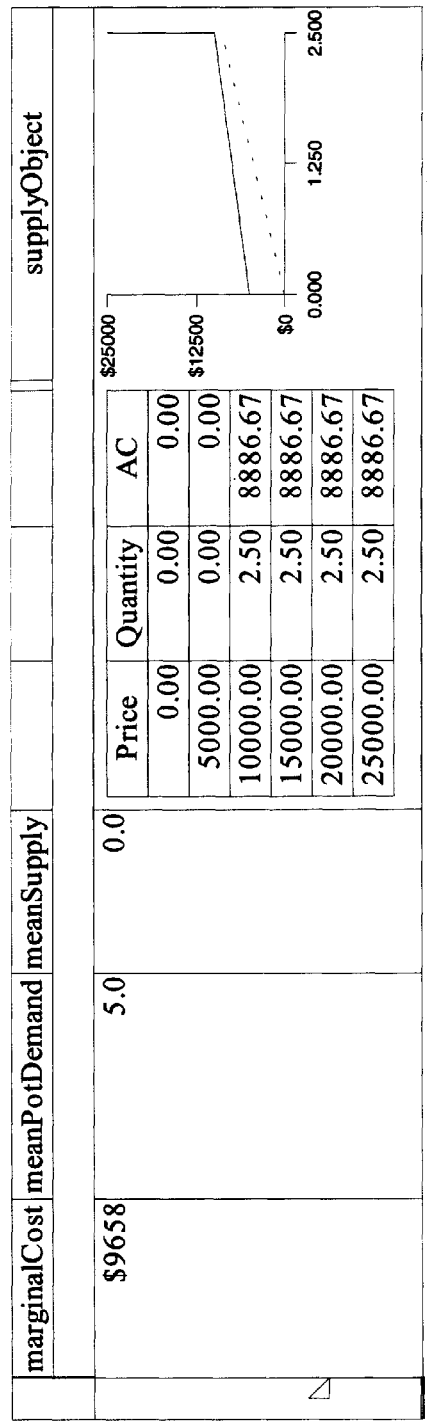

The Product and UnitReq Tables are merged together in their own window. An example of such a window is shown in FIG. 20.

The Results Table is shown in its own window, as shown in FIG. 21. The Next column is for the row of Sequence 0; Current is for Sequence 1; Previous(0) for Sequence 2; etc. Additional table rows are inserted as columns between the Next and Previous(0) columns, with the "oldest" immediately to the right of the Next column.

Base Simulation

Figure 22:
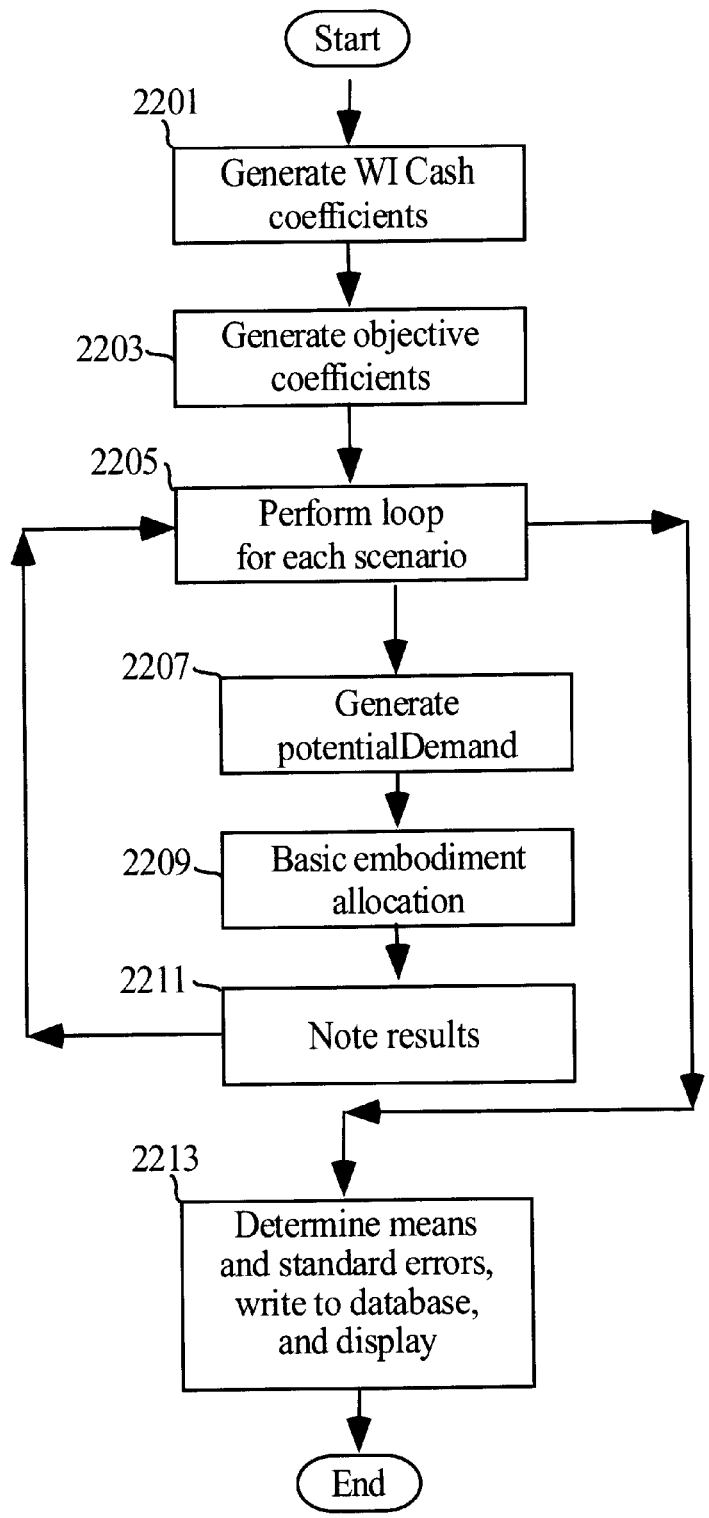
FIG. 22 shows the preferred allocation process.

The procedure of the preferred embodiment allocation is shown in FIG. 22, which builds upon the procedure shown in FIGS. 7, 7A, and 7B entails the following:

1. In Box 2201,

```
for (iProd = 0; iProd < mProd; iProd++)
   set sumWICash[iProd]] = 0
   Join Resource, UnitReq, and Product tables where
      • ProductTable.productName = UnitReqTable.productName
      • ResourceTable.resourceName = UnitReqTable.resourceName
      • ProductTable.productName is product iProd
   for (each row of joined table)
      if (WI-cash Type = Spread-out)
         set sumWICash[iProd] = sumWICash[iProd] + payPrice * reqQt
      else
         set sumWICash[iProd] = sumWICash[iProd] + payPrice * reqQt *
            periodsToCash
```

2. In Box 2203,

```
Clear vector c
set c[m] through c[mn−1] = prices of the mProd products as indicated in
   the Product Table of Database 101
for (iProd = m; iProd < mn; iProd++)
   set c[iProd] = c[iProd] − sumWICash[iProd−m]
   if (Maximization Type = IPS)
      set c[iProd] = c[iProd] + (fillValue for product (iProd − m))
   Join Resource and UnitReq tables where:
      • ResourceTable.resourceName = UnitReqTable.resourceName
      • ResourceTable.availability = "fixed"
      • UnitReqTable.productName is product iProd
   for (each row of joined table)
      set c[iProd] = c[iProd] − WTMD * reqQt
```

3. In Box 2205,

```
for (iScenario = 0; iScenario < N_Sample; iScenario++)
   apply Boxes 2207 through 2211
```

4. In Box 2207,

```
if (iScenario = 0)
   Use randSeed to generate random seeds for each distribution object.
Cause each distribution object to draw a random number from its
   distribution.
for (iProd = 0; iProd < mProd; iProd++)
   set potentialDemand[iProd] =
      (product's distObject's random value) * distPercent + carryOver *
         (unfulfilled potentialDemand for iProd from previous period, if
         it existed)
```

5. In Box 2209, directly apply Boxes 701 through 711, with the following exceptions:
   use the c vector generated in Box 2203
   exclude from matrix and vector loading all buyable resources
   include WI-cash as a fixed availability resource
   load into matrix a sum WICash[iProd] as product iProd's requirement of WI-cash limit the number of times Basic-Ridge-walk-Iteration 1551 is executed to baseMaxRWItertions times mProd
limit the total time spent in Basic-Ridge-walk-Iteration 1551 to baseMaxRWTime seconds
6. In Box 2211, compute and note scenario results.

--- apply Box 713, except note, rather than write, resulting data
if (MC/MV Display = "Infinite Series")
   When applying Box 713, apply Box 1203, rather than Box 1701, and set both gmcSub and gmvAdd equal to twmcSub for each group in rcMat.
if (MC/MV Display = "Quantum")
   for each resource
      set resourceQuant = availQuant
      apply Boxes 2403 thru 2407
      note yielded resource price, in Box 2407, as being marginal value of resource
   for each product
      Use bisection search method to find productPrice so that applying Boxes 2303 through 2309 yields an increment of 1.0 in the number of units produced of the considered product. Note productPrice as being the marginal cost of producing the considered product.
set scenIPS = 0
set scenWICashChange = 0
set scenfillValue = 0
set scenWTMD = 0
for (each distribution object)
   set marginalValue = 0
   for (iProd = 0; iProd < mProd; iProd++)
      set quant = (LPP's determined quantity for product iProd)
      set price = price of product iProd
      set fillValue = fillValue for a unit of product iProd
      set cashOut = 0
      set wtmdOut = 0
      Join Resource, UnitReq, and Product tables where
        • ProductTable.productName = UnitReqTable.productName
        • ResourceTable.resourceName = UnitReqTable.resourceName
        • ProductTable.productName is product iProd
      for (each row of joined table)
        set cashOut = cashOut + payPrice * reqQt
        set wtmdOut = wtmdOut + wtmd * reqQt
      set scenIPS = scenIPS + quant * (price + fillValue − cashOut − wtmdOut)
      set scenWICashChange = scenWICashChange + quant * (price − cashOut)
      set scenfillValue = scenfillValue + quant * fillValue
      set scenWTMD = scenWTMD + quant * wtmdOut
      while found (find ii such that:
        • b[ii] = 0
        • B[ii][iProd] > 0
        • there exists a jj such that:
           c[jj] < 0 and a[ii][jj] < 0)
        if (ii found)
           Pivot row ii as described in Box 1117
      endwhile
      set pDistObject = pointer to distribution object used to generate potentialDemand[iProd]
      set pDistObject->marginalValue = pDistObject->marginalValue + (− c [iProd] * bOrg[iProd]/potentialDemand[iProd])

---

7. In Box 2213, compute means and standard errors of scenIPS, scenfillValue, scenWICashChange, scenWTMD (of Box 2211) and update Results table. For each distribution, compute the mean of scenario marginalValue as calculated in Box 2211 and update distribution table. Compute means of resource and product quantities and marginal values/costs; update appropriate tables. Update GUI database display.

Supply Simulation

Figure 23:
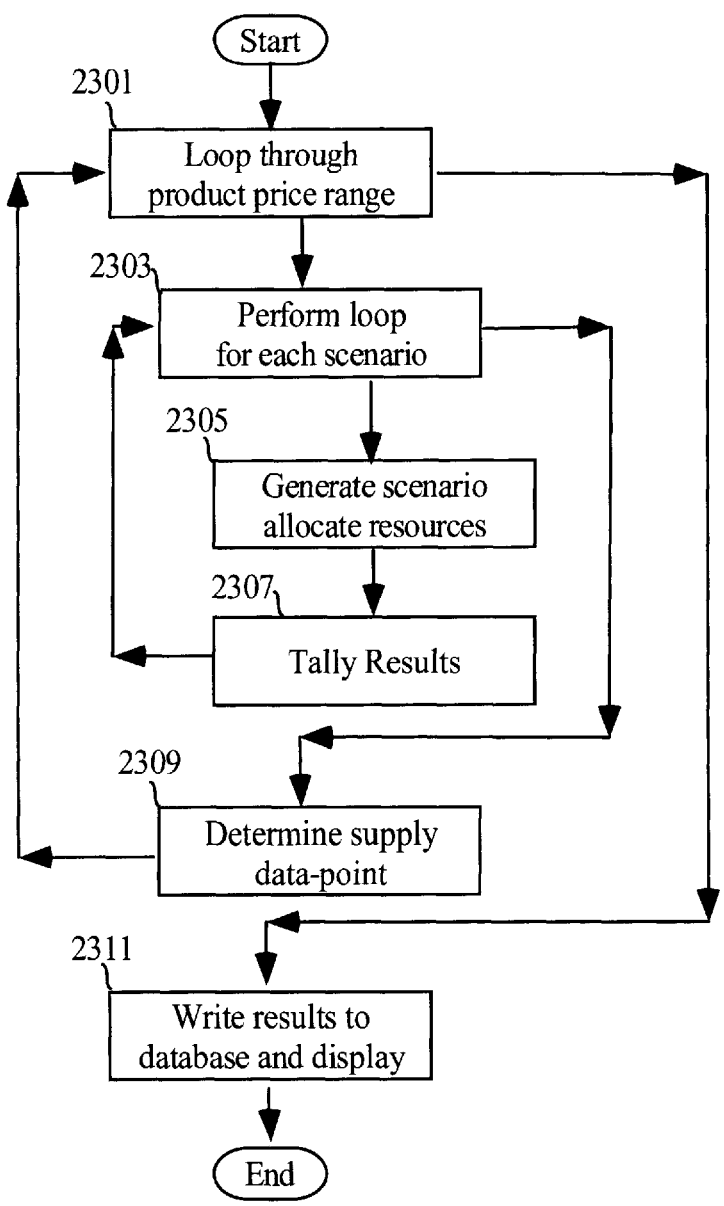
FIG. 23 shows the supply schedule generation process.

The procedure to generate product supply schedules is shown in FIG. 23. For expository purposes, the supply schedule being generated is for a product iProdSup and will have prices between lowPrice and highPrice with fixed increments. This entails, 1. In Box 2301,

--- for (productPrice = lowValue; productPrice > highPrice; productPrice = productPrice + increment)
   apply Boxes 2303 through 2309

---

2. In Box 2303,

--- apply Box 2201
apply Box 2203, but use productPrice as the price for product iProdSup
for (iScenario = 0; iScenario < N_Sample; iScenario++)
   apply Boxes 2305 and 2307

---

3. In Box 2305, apply Boxes 2207 and 2209, except in Box 2209:
   Limit the number of times Basic-Ridge-walk-Iteration is executed to S/D_MaxRWItertions times mProd
   Limit the total time spent in Basic-Ridge-walk-Iteration 1551 to S/D_MaxRWTime seconds
4. In Box 2307, note produced quantity of product iProdSup.
5. In Box 2309, compute mean of noted produced quantity of Box 2307. This mean and productPrice determine a point of the supply schedule.
6. In Box 2311, write supply-schedule-data points to database. Update GUI database display.

To also generate the average opportunity cost curve for iProdSup, the following is required:

At the start of Box 2301,

--- set productPrice = 0
set dSumBase = 0
apply Boxes 2303, 2305, and 2307
immediately after Box 2307, set dSumBase = dSumBase + |d|

---

At the start of Box 2303,

--- dSumCase = 0
qtSumCase = 0

---

At the end of Box 2307,

--- set dSumCase = dSumCase + |d| − productPrice * (quantity of product iProdSup supplied)
qtSumCase = qtSumCase + (quantity of product iProdSup supplied)

---

At the end of Box 2309, compute the average cost as being:

---

(dSumBase − dSumCase)/ qtSumCase

---

Demand Simulation

Figure 24:
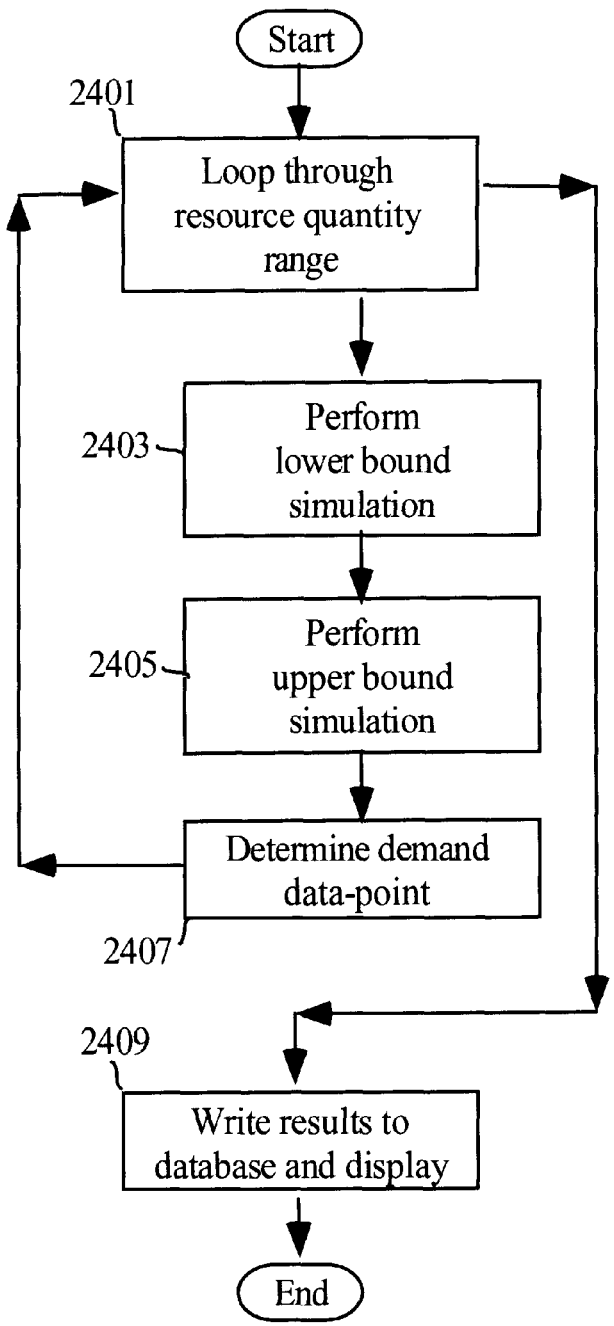
FIG. 24 shows the demand schedule generation process.

The procedure to generate product demand schedules is shown in FIG. 24. For expository purposes, the demand schedule generated is for a resource iResDem and will have quantities between lowQuant and highQuant. An offset, of JSetQuant, needs to be a positive value. This procedure entails, 1. In Box 2401,

```
for (resourceQuant = lowQuant; resourceQuant < highQuant;
    resourceQuant = resourceQuant + increment)
        apply Boxes 2403 through 2407
```

2. In Box 2403, apply Boxes 2201 through 2211, except:
   use resourceQuant minus offSetQuant as the quantity for resQuant[iResDem]
   in Box 2211, only note the value of |d|
   limit the number of times the loop defined by Basic-Ridge-walk-Iteration 1551 is executed to S/D MaxRWItertions times mProd
   limit the total time spent in Basic-Ridge-walk-Iteration 1551 to S/D_MaxRWTime seconds
3. In Box 2405, apply Box 2403, except:
   use resourceQuant plus offSetQuant as the quantity for resQuant[iResDem]
4. In Box 2407, note the demand schedule point as having a price of:
   ((mean value of |d| in Box 2405)−
   (mean value of |d| in Box 2403))/2*offSetQuant
   and a quantity of resourceQuant.
5. In Box 2409, write demand-schedule-data points to database. Update GUI database display.

Use

This preferred embodiment envisions—almost requires—interaction with the present invention's user for two reasons:

- The best use of the present invention results from the interaction between the user and the invention. After reviewing simulation results, the user applies his or her knowledge to consider organizational resource, product, and marketing changes. Data changes are made to reflect these considered changes, which are evaluated by the invention in subsequent simulations.
- The Resource-conduit process implicitly assumes that allocations can be shifted as Potential-demand changes. If such an assumption is not appropriate for the case at hand, then the user needs to experiment with different fixed-group allocations: fixedAlloc fields need to be set to "yes" and fxAlQt values specified; after a Base simulation, the resulting marginal value data suggests which fixed allocations the user should experimentally decrease and increase. The process of the user's setting fixed allocations and Base simulations being performed repeats until the user is satisfied with the resulting allocation.

The main purpose of the supply and demand schedules, and a major purpose of the marginal cost/value data, is to facilitate the user's considering and evaluating resource, product, and marketing changes. Many people responsible for allocating organizational resources—almost all MBAs—understand and know how to use supply schedules, demand schedules, and marginal costs/values.

Indirect Allocation

In order to apply indirect allocation, estimates of product demand distributions, resource requirements, and resource availabilities are used in a Base simulation with multiple scenarios. The resulting resource marginal values are then used as resource cost/price/value. If the value to be received is greater than or equal to the sum of component marginal costs, then the considered action should proceed.

For example, suppose that a Base simulation yielded the following marginal values for the following resources:

| WI-cash | $0.01 |
|---|---|
| rxa1 | $5.00 |
| rxb2 | $2.50 |
| rxc3 | $3.00 |

And suppose that an opportunity (which may or may not have been anticipated in the Base simulation) becomes available and requires the following resource quantities:

| rxa1 | 1 |
|---|---|
| rxb2 | 3 |
| rxc3 | 4 |

Further suppose that this opportunity requires $30.00 for buyable resources and has a Fill-value of $10.00. The opportunity cost of executing this opportunity is $44.80 (5*1+3*2.50+4* 3.00−10+30*(1.00+0.01)). If the price to be received by the organization exceeds or equals $44.80, it is in the organization's interest to execute the opportunity. Conversely, if the value to be received is less than $44.80, it is not in the organization's interest to execute the opportunity.

The basis for this approach is two-fold. First, the Base simulation is a sampling of opportunities, optimal allocations, and marginal costs/values. Second, such marginal costs are opportunity marginal costs. Were a Base simulation rerun with a small resource quantity change, then the change in the object function value would be roughly equal to marginal cost times the resource change quantity.

Besides costing products, resource marginal values can be used to evaluate acquiring and divesting resources: if additional resource quantities become available at a price less than marginal value, it would be desirable to acquire the additional quantities; conversely, if an opportunity to sell a resource at a price greater than its marginal value manifests, it would be desirable to divest at least some of the resource.

Similarly to the way that an economy uses the free-market pricing mechanism to optimally allocate resources, an organization uses this invention's indirect pricing allocation method to optimally allocate resources. The yielded marginal values determine where, when, and for what purpose a resource is used: a low value suggests a resource has a low value and consequently results in relatively casual use; conversely, a high marginal value suggests that a resource is precious and results in use only when the compensating payback is sufficiently high.

Indirect allocation is not as good as direct allocation, nor as good as comparing two base simulations—one with the resource quantities removed, the other with the resource quantities included. This is because approximations are being used to anticipate net results. However, because many organizations are in constant flux, there is never a moment when all allocations can definitively be optimized. For those organizations, and at such times, indirect allocation is the best alternative.

Conclusion, Ramifications, and Scope

Thus, as the reader who is familiar with the domain of the present invention can see, the invention leads to optimized or near-optimized allocations of organizational resources. With such optimization, organizations can better reach their goals.

While the above description contains many particulars, these should not be construed as limitations on the scope of the present invention, but rather, as an exemplification of one preferred embodiment thereof. As the reader who is skilled in the invention's domain will appreciate, the invention's description here is oriented towards facilitating ease of comprehension; such a reader will also appreciate that the invention's computational performance can easily be improved by applying both prior-art techniques and readily apparent improvements.

Many variations and add-ons to the preferred embodiment are possible. For example, without limitation:

1. When generating random potentialDemand values for each scenario, generate other random values for other data, such as for prices (elements in vector c), available resource quantities (vector resQuant), and product unit requirements (reqQt values placed in matrix a). Such may require adjusting rcMat column group allocations so that they sum to resQuant (see Variation #22 for how this is done) and applying prior-art techniques to update linear programming memory.
2. When implementing the above Variation #1, generate correlated random numbers. For example, have the generated random prices be partly or completely correlated with the generated random potentialDemand values.
3. Allow buyable resources to be allocated to groups in the first mProd rows of rcMat. This requires the introduction of a pseudo product that has an infinite Potential-demand, that has a price of one currency unit, and that has a unit fulfillment requirement of one WI-cash unit. (This pseudo product assures that the marginal return of WI-cash allocations to groups in the first mProd rows of rcMat is non-negative.) (See variation #20 on how to have multiple rcMat columns handle WI-cash.)
4. Allow multiple types or categories of WI-cash.
5. Generate rowEffectivenesses using other functional forms, besides the multiplicative form that is the focus of the present description. A function of the following form can be considered to generate rowEffectivenesses:

$$\text{rowEffectiveness}_i = AG_i(ef_{i,0}, ef_{i,1}, ef_{1,2}, \ldots ef_{i,nRes-1})$$

where:

$AG_i$ uses the effectivenesses of the elements in row i of rcMat to generate rowEffectiveness$_i$ $ef_{i,j}$ is the piecewise linear allocation-to-effectiveness function for the group having an element at rcMat$_{i,j}$.

The AG function can in turn be considered to generate rowEffectiveness by using a hierarchy of cluster functions: Cluster functions pool group-element effectivenesses and possibly other cluster effectivenesses to generate cluster effectivenesses, which are in turn used to generate other cluster effectivenesses, etc.—until a final cluster effectiveness, which is rowEffectiveness, is obtained.

What is desirable, but not necessary, is for $AG_i$ to be directionally differentiable with respect to each $ef_{i,j}$ and associated allocation. When this is the case for a particular $ef_{i,j}$, then:

$emcSub_{i,j}$=((maximized $|c_i|$ value as generated in Box 1001)*$bOrg_i/AG_i$)* $(\partial AG_i/\partial ef_{i,j}^-)*(\partial ef_{i,j}/\partial$(allocation to group head)$^-$)

$emvAdd_{i,j}$=((minimized $|c_i|$ value as generated in Box 1001)*$bOrg_i/AG_i$)* $(\partial AG_i/\partial ef_{i,j}^+)*(\partial ef_{i,j}/\partial$(allocation to group head)$^+$)

If $AG_i$ is not directionally differentiable, then $emcSub_{i,j}$ and $emvAdd_{i,j}$ can be determined by numerical methods or, alternatively, ignored by setting $emcSub_{i,j}$=BIG_M and $emvAdd_{i,j}$=0

Group-head maxSub and maxAdd quantities need to be bounded by the maximum decrease and increase in the group allocation that can be made without changing $emcSub_{i,j}$ and $emvAdd_{i,j}$ respectively, holding $|c[i]|$ constant.

Irrespective of how $emcSub_{i,j}$ and $emvAdd_{i,j}$ are generated, the Axis-walk, Ridge-walk, and Lateral-walk processes can proceed as described. The Top-walk process could ignore uv-group pairs that are not part of a multiplicative cluster. Alternatively, Top-walk could perform special handling: the $AG_i$ function needs to be algebraically converted to a function with a domain as the increment to the allocation of the group containing an element at rcMat$_{i,u}$ and a range as the amount by which the allocation to the head of the group containing an element at rcMat$_{i,v}$ can be reduced, while holding $AG_i$ constant. This function defines the TWvfu routine that should be used for the rcMat$_{i,u}$ and rcMat$_{i,v}$ pair; the derivative defines the TWvfuEpsilon routine for the same pair. (TWufv and TWufvEpsilon are the inverse functions of TWvfu and TWvfuEpsilon respectively.)

Two particularly useful non-multiplicative cluster forms are, what are termed here, the sufficiency and complementary clusters. The sufficiency cluster has the following form:

$$\text{clusterEffectiveness} = 1 - \Pi(1 - ef_{i_k})$$

where k iterates through all cluster group elements. This type of cluster is appropriate when more than one resource can accomplish the same fundamental conversion from Potential-demand to Realized-demand. For example, developing product awareness through advertising can be accomplished through television and radio. Once awareness (for a unit of Potential-demand) is obtain in one medium, awareness development activity in the other medium is not needed. This can be handled by separately estimating the allocation-to-effectiveness (awareness) function for one medium, assuming a zero effectiveness (awareness) for the other medium. Then the two media are aggregated using the sufficiency cluster.

The complementary cluster has the following form:

clusterEffectiveness=minimum effectiveness of group elements $ef_{i_k} \ldots$ where k iterates through all cluster group elements. This type of cluster is appropriate when more than one resource must be used jointly to accomplish the same fundamental conversion from Potential-demand to Realized-demand. For example, design of a product could require that design and engineering resources work closely together and, as a consequence, could be of a nature that the allocation of each resource determines an upper bound on overall design effectiveness.

The allocation-to-effectiveness functions for the groups of the sufficiency, complementary, and other types of clusters can be determined in a manner similar to that described for the multiplicative cluster. In particular, by asking the following question: Presuming that a group's allocation is the only factor governing whether 0% to 100% of Potential-demand is converted to Realized-demand, how does the percentage vary as the allocation varies?

6. Use multiple parallel processors to share the processing burden.
7. Allow multiple users to simultaneously edit the database and run simulations.
8. Subtract committed resources and committed product quantities prior to the allocation process starting.
9. Eliminate the linear programming process when no fulfillment allocations are made or needed. This can be accomplished by using the above Resource-conduit process without linear programming processing and:

always using the negative value of c[m+i] set in Box 2203 for the value of c[i] used in Box 1001 presuming that if b vector values were to be generated, they would always be positive.

calculating |d| by summing each product's working price (c[m+i]) times the bOrg[i] quantity.

10. Ignore optimizations and determine resource marginal costs/values and product marginal costs for an allocation plan not formulated by this invention. This entails fixing allocations, including the linear programming allocations, to reflect the allocation plan and then computing gmcSub, gmvAdd, twmcSub, etc.

11. Incorporate prior-art linear programming techniques, such as (without limitation), sparse matrix, ellipsoid, and integer (programming) techniques.

12. Correct for accumulated rounding errors: Reapportion resQuant and regenerate Resource-conduit data as follows:

```
for (j = 0; j < nRes; j++)
    set sum = sum of allocations in column j of rcMat
    for (each group head in column)
        set allocation = (allocation/sum) * resQuant[j]
    regenerate group effectiveness
regenerate bOrg
```

Then apply prior-art linear-programming techniques to re-invert B and freshly generate the simplex tableau.

13. Allow the user to specify a group's allocation-to-effectiveness function as a formula. This would require: immediately each time after the group's allocation is changed,

```
set maxSub and maxAdd such that
  • both are non-negative
    • group allocation − maxSub is in the domain of the specified
      formula
    • group allocation + maxAdd is in the domain of the specified
      formula
(The smaller the values for maxSub and maxAdd, the more numerically
accurate the final allocation, but the more processing time
required.)
set atoeFnPt[0].allocation = allocation − maxSub
set atoeFnPt[0].effectiveness = functional value of (allocation −
  maxSub)
set atoeFnPt[1].allocation = allocation
set atoeFnPt[1].effectiveness = functional value of (allocation)
set atoeFnPt[2].allocation = allocation + maxAdd
set atoeFnPt[2].effectiveness = functional value of (allocation +
  maxAdd)
set dedaSub = slope of line between points atoeFnPt[0]and
  atoeFnPt[1]
set dedaAdd = slope of line between points atoeFnPt[1] and
  atoeFnPt[2]
set ir = 1
``` as in the Top-walk and Lateral-walk processes, include in the Axis-walk process block clearing, pair blocking, shift evaluation, and shift reversal.

14. Allow nonlinear fulfillment allocations. To do this, during initialization, below the first mProd rows of matrixes rcMat and a, insert an empty row. Afterwards, place one or more group heads in the inserted row. In matrix a, place a 1.0 in the inserted row and column corresponding to the product for which the nonlinear fulfillment allocation is to be allowed. Also place a 1.0 in the corresponding element of potentialDemand. Analogously to before, allocations to the group(s) of the inserted row determine group effectiveness, which in turn determines a rowEffectiveness value, which in turn determines a bOrg value, which in turn sets an upper bound to the number of units that can be made, given the resources allocated to the group(s) of the inserted row.

When increasing the rowEffectiveness for the product with nonlinear fulfillment allocations in the Ridge-walk process, allocations need to be shifted into and out of the groups of the inserted row. This is the same as what was done in Box 1507 vis-à-vis individual Direct-put groups. If there is more than one group element in the inserted row and the inserted row has a tighter bound (i.e. bOrg[inserted row]<bOrg[rwiRow]), then a separate, independent, parallel Ridge-walk process needs to increase the allocations to the groups of the inserted row until the bound is relieved.

15. Capitalize on congruent Top-walk cycles. When generating twmcSub values, cycles can develop where each group in a cycle alternatively entertains compensatory allocations from other groups in the cycle and the twmcSub values decrease to 0. Performance can be improved by testing for such cycles, and upon discovery, directly setting all cycle twmcSub values to 0.

Similarly, a Top-walk chain can end in a cycle where costless allocation-shifting-out of a cycle can occur because, in essence, an arbitrage opportunity is being exploited. When this occurs, it is preferable to extract what can be extracted from the cycle, shift the extract through the remainder of the chain, update bOrg, make feasible the linear programming problem, and avoid matrix multiplication to determine twQuant.

16. When doing the Top-walk process, generate a twmvAdd (marginal value add) value, in place of, or in addition to, twmcSub. The Top-walk process as described has a subtraction orientation: the allocation in one group decreases, a compensatory allocation increase is made, which in turn requires another allocation decrease, etc. The orientation could, just as well, be reversed: the allocation in one group increases, which makes possible the allocation decrease in another group, which in turn triggers another possible allocation increase, etc.

17. Use gmvAdd (rather than, or in addition to, gmcSub) when generating for display and database-storage resource marginal values, distribution marginal values, and/or product marginal costs.

18. Include other data in the database, in particular, data that would facilitate comparison between marginal costs and open-market resource prices.

19. During the initialization process, if two or more resources are perfect complements, meaning they are always used jointly in the same proportions, then merge the complementary resources into a single combined resource.

20. Allow a single resource to span multiple rcMat matrix columns. Processing can proceed as described above for the preferred embodiment, except that the multiple columns need to be handled as if they were a single column when searching for the minimum gmcSub and twmcSub. This would allow the allocation of a resource type which, in effect, is transformed or specialized upon allocation. For instance, if the resource were cash, then implicitly a conversion to, for example, engineering or design resources might be taking place upon allocation.

21. Allow allocations to genuinely span multiple time periods. Initially load data that is specific to each time period into its own version of the memory shown in FIGS. 4 and 5. When doing this loading, vector c values should be appropriately discounted. Then merge the time-period formulations into a master version of the memory shown in FIGS. 4 and 5. Initially, this master version has no inter-period ties: the allocations of one period are independent of the allocation of another period, and the layout of utilized memory is highly "rectangular."

Then use standard linear programming techniques to perform inter-period ties, to, for instance, handle WI-cash being increased, decreased, and passed to subsequent periods. WI-cash payouts and receipts should be time-phased so that WI-cash for each period is accurately determined and available for subsequent periods' buyable resources. Payouts and receipts that belong to beyond the last time period should be consolidated into the last time period (when WI-cash Type=Fold-in) or ignored (when WI-cash Type=Spread-out). Where appropriate, consolidate and duplicate rcMat columns and group elements; where appropriate, introduce AG clustering (see Variation #5). For instance, an allocation to a design group in one period might complement a design group of another period. In this case, duplicate a group element from the earlier time period into the latter period. Then add a sufficiency cluster in the latter time period to aggregate the design effectivenesses of both the earlier and the latter groups. (This sufficiency cluster might want to discount the earlier period's effectiveness.)

Each scenario would comprise several sequential time periods. Potential-demands for all time periods would be generated simultaneously, and the allocation process would simultaneously apply to all periods. As before, a simulation could entail one or more scenarios, and could have unfulfilled Potential-demand being passed on to subsequent time periods and scenarios. For instance, unfulfilled Potential-demand of period 2 scenario 7 would be passed onto period 3 of scenario 8.

22. Reuse Base scenario solutions for Supply and Demand and subsequent Base simulations. When doing a first Base simulation, save the linear programming and Resource-conduit solution after each scenario. When doing a subsequent simulation, prior to each scenario, restore the saved solution and use it as a starting point. If in an rcMat column the sum of group allocations is greater than resQuant, then subtract group allocations from the groups having the smallest gmcSubs until the sum of group allocations equals resQuant. Conversely, if the sum is less than resQuant, add to groups with the largest gmvAdd. Use prior-art techniques to make the linear programming solution both feasible and optimized. Afterwards, optimize the totality, as described.
23. Relax the thoroughness of the optimization in order to reduce the required number of CPU cycles. For instance, without limitation, skip any combination of the following:

Box 705 (Axis-walk)
    Box 707 (Top-walk)
    Box 709 (Lateral-walk)
    Box 711 (Ridge-walk)
    Boxes 1305 through 1331, inclusive
    Boxes 1307 through 1317, inclusive
    Boxes 1329 through 1331, inclusive
    Boxes 1611 through 1627, inclusive
    Basic-Ridge-walk-Iteration 1551 for some or all rows of rcMat
    Box 1511
    The top-walk and/or the Lateral-walk processes in Box 1511.
    The top-walk portion of Box 1407, i.e., attempt only an Axis-walk iteration—which is implicitly included in Top-walk.
24. Include capability for the user to integrate, i.e. find the area beneath, the generated supply and demand schedules.
25. Use user-friendly column titles. FIGS. 18, 19, 19A, 19B, 20, 20A, 20B, & 21 are oriented towards the technical discussion. The titles listed below are oriented towards the user and are the preferred titles for actual use. Specifically,

| Row | Column | Title |
| --- | --- | --- |
| For the Distributions Window: | | |
| 0 | 1 | Name |
| 0 | 2 | Type |
| 0 | 7 | Distribution |
| For the Resources Window: | | |
| 0 | 1 | Name |
| 0 | 4 | Quantity |
| 0 | 14 | Demand |
| 1 | 2 | Group Name |
| 1 | 3 | Fixed Alloc |
| 1 | 4 | Allocation |
| 1 | 9 | Effectiveness |
| For the Products Window: | | |
| 0 | 1 | Name |
| 0 | 2 | Price |
| 0 | 3 | Fill-value |
| 0 | 4 | Dist Pot |
| 0 | 5 | DP % |
| 0 | 14 | Supply |
| 1 | 2 | Resource |
| 1 | 3 | Quantity |
| 1 | 4 | Periods to Cash |

26. Use several different values for facReduce in the Lateral-walk process.
27. Use a modified Lateral-walk process. This process could be used in addition to the normal Lateral-walk process and entails:

```
for (i = 0; i < mProd; i++)
    if exist a group element in row i of rcMat such that in its group
        head there exists an irx such that the slope of line segment irx is
        less than the slope of line segment irx+1 (as defined in Box 909)
            Apply Box 709, except replace Box 1405 with:
                set potentialDemand[i] = potentialDemand[i] * facReduce
                apply Box 911
                set b = B * bOrg
                apply box 1337
```

Ideally, different values between 0 and 1 should be used for facReduce in this modified version of lateral-walk. This modified version might be termed Explode-walk.

28. Include fixbuy as a hybrid between the fixed and buyable resource types. An example of such a resource would be office space obtained under a long term contract. It entails a fixed periodic payment and its availability is fixed. Processing would proceed as follows: the fixed periodic payment would be subtracted from WI-cash as the resQuant array is initially populated; in all other regards, it would be handled as a fixed resource.
29. Experiment with rcMat initializations and Monte Carlo search. Specifically, repeat the following several times (each time constituting an instance): initially randomly allocate resQuant to groups (instead of using the proportional method of Box 701), generate effectivenesses, generate rowEffectiveness, generate bOrg, . . . , and compute |d|. Next, randomly do or not do each of the following any number of times and in any order:
  a) Apply some or all of the Walk processes to some or all of the instances.
  b) Discard instances with low |d|.
  c) Within individual instances, randomly shift allocations between groups of the same rcMat column.
Then accept, as a final allocation, the instance that yields the highest |d|. This Variation #29 might be called a Rand-mode process.

30. Enhance Variation #29 by combining allocations from different instances to form additional instances. For instance, suppose there are nGroup groups and currently nStance instances. Create an additional instance by:

--- for (i = 0; i < nGroup; i++)
  Randomly select an instance that yields one of the higher |d|s.
  Set group i allocation = allocation of group i in randomly selected instance.
Randomly increase or decrease group allocations so that for each column of rcMat, the sum of group allocations equals resQuant.

---

This variation #30 is arguably a genetic algorithm, and might be called a Genetic-mode process.

A C++ source-code listing to help further teach some of aspects of the present invention follows:

©Copyright Joel Jameson 1997–1998. All Rights Reserved.

I claim:

1. A computer system having a memory for storing data for access by an application program being executed on said computer system for allocating organizational resources, comprising:
  (a) a rcMat matrix data structure stored in said memory, said rcMat matrix data structure used by said application program and including: organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; at least some of said organization resource-utilizing groups containing resource allocations; and
  (b) said application program including code segments for accessing said rcMat matrix to retrieve said resource allocations of said organization resource-utilizing groups to allocate at least some organizational resources.

2. The computer system according to claim 1, wherein said application program further comprises at least one of the following, a result therefrom being used for allocating organizational resources:
  (a) a code segment for calculating effectiveness for said organization resource-utilizing groups;
  (b) a code segment for calculating rowEffectiveness for at least some of said rows of said rcMat matrix;
  (c) a code segment for calculating Realized-demand for at least some of said rows of said rcMat matrix;
  (d) a code segment for valuing allocations contained in said organization resource-utilizing groups;
  (e) a code segment for determining group-marginal-cost-subtract for said organization resource-utilizing groups;
  (f) a code segment for determining group-marginal-value-add for said organization resource-utilizing groups;
  (g) a code segment for performing a linear programming process.

3. A computer system comprising
  (a) means for storing a rcMat matrix of organization resource-utilizing groups; said organization resource-utilizing groups utilizing at least some of the resources available to an organization; said rcMat matrix of or ation resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; and
  (b) means for performing a Resource-conduit process, said Resource-conduit process accessing said rcMat matrix, for allocating at least some of said resources available to said organization to said organization resource-utilizing groups.

4. A computer system comprising:
  (a) means for storing a rcMat matrix of organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; and
  (b) means for performing a Resource-conduit process, said Resource-conduit process accessing said rcMat matrix, for allocating at least some of said resources available to said organization to said organization resource-utilizing groups; said Resource-conduit process comprising at least one of the following:
    (i) means for initializing said rcMat matrix and said organization resource-utilizing groups of said rcMat matrix;
    (ii) means for valuing allocations contained in said organization resource-utilizing groups of said rcMat matrix;
    (iii) means for generating a bOrg vector;
    (iv) means for performing a linear programming process.

5. The computer system according to claim 4, wherein said means for storing said rcMat matrix further stores at least one of the following:
  (a) a potential demand vector;
  (b) a sumWICash vector,
  (c) a resQuant vector,
  (d) a twpGroupSub and a twpGroupAdd vector;
  (e) a rwpDest, rwpSour, rwOldAlloc, and a rwOldMC vector.
  (f) a dpTie matrix and a dpTieSubBlk vector.

6. The computer system according to claim 4, wherein said means for performing a Resource-conduit process for allocating at least some of said resources available to said organization to said organization resource-utilizing groups comprises at least one of the following:

(a) means for performing an Axis-walk process;
(b) means for performing a Top-walk process;
(c) means for performing a Lateral-walk process;
(d) means for performing a Ridge-walk process;
(e) means for performing an Explode-walk process;
(f) means for performing a Rand-mode process;
(g) means for performing a Genetic-mode process;
(h) means for performing a Finalitzation process;
(i) means for determining updated values for said bOrg vector.

7. A computer system for optimally making Fulfillment-allocations, comprising:

(a) means for storing a rcMat matrix of organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups;
(b) means for performing a linear programming process for making at least some of said Fulfillment-allocations; and
(c) means for performing a Resource-conduit process, said Resource-conduit process accessing both said rcMat matrix and calculations of said linear programmed process, for making at least some of said Fulfillment-allocations.

8. A computer system having thereon an application program for determining the marginal value of a resource, wherein said resource is potentially used in each of a plurality of scenarios, and said marginal value is used in allocating said resource, said application program comprising:

(a) a code segment for accessing said plurality of scenarios;
(b) a code segment for performing a linear programming process to optimize resource allocations in each said scenario;
(c) a code segment for determining the marginal value of said resource;
(d) a code segment to pass said determined marginal value of said resource to a subsequent computer program routine for allocating said resource available to said organization.

9. A computer system for indirectly allocating organizational resources, comprising:

(a) means for accessing a plurality of scenarios;
(b) means for performing a linear programming process to optimize resource allocations of each said scenario;
(c) means for determining at least one marginal value of at least one resource in each optimized scenario;
(d) means for calculating a mathematical-mean of said at least one marginal value of said at least one resource in each said optimized scenario;
(e) means for calculating a mathematical-product of a quantity corresponding to said at least one resource by said mathematical-mean; and
(f) means for comparing said mathematical-product to a value to be received and, based upon a result of said comparing means, indirectly allocating organizational resources.

10. A computer-implemented method for allocating organizational resources comprising code segments for:

(a) creating and storing a rcMat matrix data structure that includes organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; at least some of said organization resource-utilizing groups containing resource allocations; and
(b) retrieving said resource allocations of said organization resource-utilizing groups to allocate at least some organizational resources.

11. The computer-implemented method for allocating organizational resources according to claim 10, further comprising code segments for performing at least one of the following, and for using a result therefrom to allocate at least some organizational resources:

(a) calculating effectiveness for said organization resource-utilizing groups;
(b) calculating rowEffectiveness for at least some of said rows of said rcMat matrix;
(c) calculating Realized-demand for at least some of said rows of said rcMat matrix;
(d) valuing allocations contained in said organization resource-utilizing groups;
(e) determining group-marginal-cost-subtract for said organization resource-utilizing groups;
(f) determining group-marginal-value-add for said organization resource-utilizing groups;
(g) performing a linear programming process.

12. A method comprising:

(a) storing a rcMat matrix of organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; and
(b) performing a Resource-conduit process, said Resource-conduit process accessing said rcMat matrix, for allocating at least some of said resources available to said organization to said organization resource-utilizing groups.

13. A method comprising:

(a) storing a rcMat matrix of organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups; and (b) performing a Resource-conduit process, said Resource-conduit process accessing said rcMat matrix, for allocating at least some of said resources available to said organization to said organization resource utilizing groups; said Resource-conduit process comprising at least one of the following:

(i) initializing said rcMat matrix and said organization resource-utilizing groups of said rcMat matrix;

(ii) valuing allocations contained in said organization resource-utilizing groups of said rcMat matrix;

(iii) generating a bOrg vector;

(iv) performing a linear programming process.

14. The method according to claim 13, wherein said act of storing said rcMat matrix fisher includes storing at least one of the following:

(a) a potentialDemand vector;

(b) a sumWICash vector;

(c) a resQuant vector;

(d) a twpGroupSub and a twpGroupAdd vector;

(e) a rwpDest, rwpSour, rwOldAlloc, and a rwOldMC vector;

(f) a dpTie matrix and a dpTieSubBlk vector.

15. The method according to claim 13, wherein said step for performing a Resource-conduit process for allocating at least some of said resources available to said organization to said organization resource-utilizing groups comprises at least one of the following:

(a) performing an Axis-walk process;

(b) performing a Top-walk process;

(c) performing a Lateral-walk process;

(d) performing a Ridge-walk process;

(e) performing an Explode-walk process;

(f) performing a Rand-mode process;

(g) performing a Genetic-mode process;

(h) performing a Finalization process;

(i) determining updated values for said bOrg vector.

16. A method for optimally making Fulfillment-allocations, comprising:

(a) storing a rcMat matrix of organization resource-utilizing groups; said organization resource-utilizing groups utilizing at least some of the resources available to an organization; said rcMat matrix of organization resource-utilizing groups comprising m rows and nRes columns; said number m is at least two; said number nRes is at least one; said nRes columns of said rcMat matrix containing a plurality of organization resource-utilizing groups; said rows of said rcMat matrix containing a plurality of said organization resource-utilizing groups;

(b) performing a linear programming process for making at least some of said Fulfillment-allocations; and (c) performing a Resource-conduit process, said Resource-conduit process accessing both said rcMat matrix and calculations of said linear programming process, for making at least some of said Fulfillment-allocations.

17. A computer-implemented method for determining the marginal value of a resource, wherein said resource is potentially used in each of a plurality of scenarios, and said marginal value is used in allocating said resource, said computer-implemented embodied on a computer system and comprising code segments for:

(a) accessing said plurality of scenarios;

(b) performing a linear programming process to optimize resource allocations in each said scenario;

(c) determining the marginal value of said resource;

(d) passing said determined marginal value of said resource to a subsequent computer program routine for allocating said resource available to said organization.

18. A computer-implemented method for indirectly allocating organizational resources, said computer-implemented method comprising code segments for:

(a) accessing a plurality of scenarios;

(b) performing a linear programming process to optimize resource allocations of each said scenario;

(c) determining at least one marginal value of at least one resource in each optimized scenario;

(d) calculating a mathematical-mean of said at least one marginal value of said at least one resource in each said optimized scenario;

(e) calculating a mathematical-product of a quantity corresponding to said at least one resource by said mathematical-mean; and (f) comparing said mathematical-product to a value to be received and, based upon a result of said comparison, indirectly allocating organizational resources.

19. A computer-readable medium having stored thereon a rcMat matrix data structure comprising:

m rows and nRes columns of data, wherein said m is a number having a value of at least two and said nRes is a number having a value of at least one;

the nRes columns of said rcMat matrix data structure including data representing a plurality of organization resource-utilizing groups;

the m rows of said rcMat matrix data structure including data representing a plurality of organization resource-utilizing groups;

wherein at least some of said organization resource-utilizing groups contain resource allocations, and wherein said organization resource-utilizing groups utilizing at least some of the resources available to an organization; and a computer-readable executable program stored on said computer-readable medium to utilize said rcMat matrix to allocate organizational resources available to said organization stored within said rcMat matrix to said organization resource-utilizing groups.

* * * * *